United States Patent
Kidd et al.

(10) Patent No.: US 9,712,098 B2
(45) Date of Patent: Jul. 18, 2017

(54) SAFETY SYSTEM AND METHOD FOR PUMP AND MOTOR

(71) Applicants: Pentair Flow Technologies, LLC, Delavan, WI (US); Danfoss Drives A/S, Graasten (DK)

(72) Inventors: Melissa Drechsel Kidd, Plymouth, MA (US); William James Genaw, New Berlin, WI (US); Micheal Robert Pasche, Sharon, WI (US); Gary Thomas Baase, II, Kenosha, WI (US); Lars Hoffmann Berthelsen, Kolding (DK); Rasmus Fink, Soenderborg (DK); Martin Skov Holm, Egersund (DK)

(73) Assignees: Pentair Flow Technologies, LLC, Delavan, WI (US); Danfoss Drives A/S, Graasten (DK)

( * ) Notice: Subject to any disclaimer, the term of this patent is extended or adjusted under 35 U.S.C. 154(b) by 0 days.

(21) Appl. No.: 14/056,625

(22) Filed: Oct. 17, 2013

(65) Prior Publication Data

US 2014/0042955 A1    Feb. 13, 2014

Related U.S. Application Data

(62) Division of application No. 12/481,455, filed on Jun. 9, 2009, now Pat. No. 8,564,233.

(51) Int. Cl.
*H02P 1/24*    (2006.01)
*H02P 25/04*    (2006.01)
(Continued)

(52) U.S. Cl.
CPC .......... *H02P 25/04* (2013.01); *F04D 15/0066* (2013.01); *H02H 1/04* (2013.01); *H02H 7/0822* (2013.01)

(58) Field of Classification Search
CPC ............ H02P 25/04; H02P 1/44; H02K 17/08
(Continued)

(56) References Cited

U.S. PATENT DOCUMENTS

| 981,213 A | 1/1911 | Mollitor |
| 1,061,919 A | 5/1913 | Miller |

(Continued)

FOREIGN PATENT DOCUMENTS

| CN | 1821574 A | 8/2006 |
| CN | 101165352 | 4/2008 |

(Continued)

OTHER PUBLICATIONS

Docket Report for Case No. 5:11-cv-00459-D; Nov. 2012.
(Continued)

*Primary Examiner* — Rina Duda
(74) *Attorney, Agent, or Firm* — Quarles & Brady LLP

(57) ABSTRACT

Embodiments of the invention provide a variable frequency drive system and a method of controlling a pump driven by a motor with the pump in fluid communication with a fluid system. The drive system and method can provide one or more of the following: a sleep mode, pipe break detection, a line fill mode, an automatic start mode, dry run protection, an electromagnetic interference filter compatible with a ground fault circuit interrupter, two-wire and three-wire and three-phase motor compatibility, a simple start-up process, automatic password protection, a pump out mode, digital input/output terminals, and removable input and output power terminal blocks.

6 Claims, 63 Drawing Sheets

(51) Int. Cl.
*F04D 15/00* (2006.01)
*H02H 7/08* (2006.01)
*H02H 1/04* (2006.01)

(58) Field of Classification Search
USPC .................. 318/727, 751, 752, 772, 774
See application file for complete search history.

(56) References Cited

U.S. PATENT DOCUMENTS

| | | | |
|---|---|---|---|
| 1,993,267 A | 3/1935 | Hiram | |
| 2,238,597 A | 4/1941 | Charles | |
| 2,458,006 A | 1/1949 | Kilgore | |
| 2,488,365 A | 11/1949 | Abbott | |
| 2,494,200 A | 1/1950 | Allan | |
| 2,615,937 A | 10/1952 | Ludwig | |
| 2,716,195 A | 8/1955 | Anderson | |
| 2,767,277 A | 10/1956 | Wirth | |
| 2,778,958 A | 1/1957 | Hamm | |
| 2,881,337 A | 4/1959 | Wall | |
| 3,191,935 A | 6/1965 | Uecker | |
| 3,204,423 A | 9/1965 | Resh, Jr. | |
| 3,213,304 A | 10/1965 | Landberg | |
| 3,227,808 A | 1/1966 | Morris | |
| 3,291,058 A | 12/1966 | McFarlin | |
| 3,316,843 A | 5/1967 | Vaughan | |
| 3,481,973 A | 12/1969 | Wygant | |
| 3,558,910 A | 1/1971 | Dale | |
| 3,559,731 A | 2/1971 | Stafford | |
| 3,581,895 A | 6/1971 | Howard | |
| 3,613,805 A | 10/1971 | Lindstad | |
| 3,634,842 A | 1/1972 | Niedermeyer | |
| 3,726,606 A | 4/1973 | Peters | |
| 3,735,233 A | 5/1973 | Ringle | |
| 3,737,749 A | 6/1973 | Schmit | |
| 3,753,072 A | 8/1973 | Jurgens | |
| 3,761,750 A * | 9/1973 | Green | 310/87 |
| 3,778,804 A | 12/1973 | Adair | |
| 3,787,882 A | 1/1974 | Fillmore | |
| 3,814,544 A | 6/1974 | Roberts et al. | |
| 3,838,597 A | 10/1974 | Montgomery | |
| 3,867,071 A | 2/1975 | Hartley | |
| 3,902,369 A | 9/1975 | Metz | |
| 3,910,725 A | 10/1975 | Rule | |
| 3,941,507 A | 3/1976 | Niedermeyer | |
| 3,949,782 A | 4/1976 | Athey | |
| 3,953,777 A | 4/1976 | McKee | |
| 3,963,375 A | 6/1976 | Curtis | |
| 3,972,647 A | 8/1976 | Niedermeyer | |
| 3,987,240 A | 10/1976 | Schultz | |
| 4,021,700 A | 5/1977 | Ellis Anwyl | |
| 4,041,470 A | 8/1977 | Slane | |
| 4,087,204 A | 5/1978 | Niedermeyer | |
| 4,108,574 A | 8/1978 | Bartley et al. | |
| 4,123,792 A | 10/1978 | Gephart | |
| 4,133,058 A | 1/1979 | Baker | |
| 4,151,080 A | 4/1979 | Zuckerman | |
| 4,168,413 A | 9/1979 | Halpine | |
| 4,169,377 A | 10/1979 | Scheib | |
| 4,185,187 A | 1/1980 | Rogers | |
| 4,187,503 A | 2/1980 | Walton | |
| 4,206,634 A | 6/1980 | Taylor | |
| 4,215,975 A | 8/1980 | Niedermeyer | |
| 4,222,711 A | 9/1980 | Mayer | |
| 4,225,290 A | 9/1980 | Allington | |
| 4,228,427 A | 10/1980 | Niedermeyer | |
| 4,233,553 A | 11/1980 | Prince | |
| 4,241,299 A | 12/1980 | Bertone | |
| 4,255,747 A | 3/1981 | Bunia | |
| 4,263,535 A | 4/1981 | Jones | |
| 4,286,303 A | 8/1981 | Genheimer | |
| 4,309,157 A | 1/1982 | Niedermeyer | |
| 4,319,712 A | 3/1982 | Bar | |
| 4,322,297 A | 3/1982 | Bajka | |
| 4,353,220 A | 10/1982 | Curwen | |
| 4,369,438 A | 1/1983 | Wilhelmi | |
| 4,370,098 A | 1/1983 | McClain | |
| 4,384,825 A | 5/1983 | Thomas | |
| 4,402,094 A | 9/1983 | Sanders | |
| 4,419,625 A | 12/1983 | Bejot | |
| 4,420,787 A | 12/1983 | Tibbits | |
| 4,421,643 A | 12/1983 | Frederick | |
| 4,425,836 A * | 1/1984 | Pickrell | 91/405 |
| 4,427,545 A | 1/1984 | Arguilez | |
| 4,449,260 A | 5/1984 | Whitaker | |
| 4,456,432 A | 6/1984 | Mannino | |
| 4,462,758 A | 7/1984 | Speed | |
| 4,470,092 A | 9/1984 | Lombardi | |
| 4,473,338 A | 9/1984 | Garmong | |
| 4,494,180 A | 1/1985 | Streater | |
| 4,504,773 A | 3/1985 | Suzuki | |
| 4,505,643 A | 3/1985 | Millis | |
| D278,529 S | 4/1985 | Hoogner | |
| 4,529,359 A | 7/1985 | Sloan | |
| 4,541,029 A | 9/1985 | Ohyama | |
| 4,545,906 A | 10/1985 | Frederick | |
| 4,552,512 A | 11/1985 | Gallup et al. | |
| 4,564,041 A | 1/1986 | Kramer | |
| 4,610,605 A | 9/1986 | Hartley | |
| 4,620,835 A | 11/1986 | Bell | |
| 4,635,441 A | 1/1987 | Ebbing | |
| 4,647,825 A | 3/1987 | Profio | |
| 4,652,802 A | 3/1987 | Johnston | |
| 4,668,902 A | 5/1987 | Zeller, Jr. | |
| 4,676,914 A | 6/1987 | Mills | |
| 4,678,404 A | 7/1987 | Lorett | |
| 4,678,409 A | 7/1987 | Kurokawa | |
| 4,686,439 A | 8/1987 | Cunningham | |
| 4,695,779 A | 9/1987 | Yates | |
| 4,703,387 A | 10/1987 | Miller | |
| 4,705,629 A | 11/1987 | Weir | |
| 4,758,697 A | 7/1988 | Jeuneu | |
| 4,766,329 A | 8/1988 | Santiago | |
| 4,767,280 A | 8/1988 | Markuson | |
| 4,780,050 A | 10/1988 | Caine | |
| 4,789,307 A | 12/1988 | Sloan | |
| 4,795,314 A | 1/1989 | Prybella | |
| 4,806,457 A | 2/1989 | Yanagisawa | |
| 4,827,197 A | 5/1989 | Giebeler | |
| 4,834,624 A | 5/1989 | Jensen | |
| 4,837,656 A | 6/1989 | Barnes | |
| 4,841,404 A | 6/1989 | Marshall | |
| 4,864,287 A | 9/1989 | Kierstead | |
| 4,885,655 A | 12/1989 | Springer | |
| 4,891,569 A | 1/1990 | Light | |
| 4,907,610 A | 3/1990 | Meincke | |
| 4,912,936 A | 4/1990 | Denpou | |
| 4,913,625 A | 4/1990 | Gerlowski | |
| 4,963,778 A | 10/1990 | Jensen | |
| 4,971,522 A | 11/1990 | Butlin | |
| 4,977,394 A | 12/1990 | Manson | |
| 4,985,181 A | 1/1991 | Strada et al. | |
| 4,986,919 A | 1/1991 | Allington | |
| 4,996,646 A | 2/1991 | Farrington | |
| D315,315 S | 3/1991 | Stairs, Jr. | |
| 4,998,097 A | 3/1991 | Noth | |
| 5,015,151 A | 5/1991 | Snyder, Jr. et al. | |
| 5,015,152 A | 5/1991 | Greene | |
| 5,026,256 A | 6/1991 | Kuwabara | |
| 5,051,068 A | 9/1991 | Wong | |
| 5,076,761 A | 12/1991 | Krohn | |
| 5,076,763 A | 12/1991 | Anastos | |
| 5,079,784 A | 1/1992 | Rist | |
| 5,098,023 A | 3/1992 | Burke | |
| 5,099,181 A | 3/1992 | Canon | |
| 5,100,298 A | 3/1992 | Shibata | |
| RE33,874 E | 4/1992 | Miller | |
| 5,117,233 A | 5/1992 | Hamos | |
| 5,123,080 A | 6/1992 | Gillett | |
| 5,129,264 A | 7/1992 | Lorenc | |
| 5,135,359 A | 8/1992 | Dufresne | |
| 5,151,017 A | 9/1992 | Sears | |
| 5,154,821 A | 10/1992 | Reid | |
| 5,156,535 A | 10/1992 | Budris | |
| 5,158,436 A | 10/1992 | Jensen | |

(56) References Cited

U.S. PATENT DOCUMENTS

| | | | |
|---|---|---|---|
| 5,159,713 A | 10/1992 | Gaskill | |
| 5,166,595 A | 11/1992 | Leverich | |
| 5,167,041 A | 12/1992 | Burkitt, III | |
| 5,172,089 A | 12/1992 | Wright | |
| D334,542 S | 4/1993 | Lowe | |
| 5,222,867 A | 6/1993 | Walker, Sr. et al. | |
| 5,234,319 A | 8/1993 | Wilder | |
| 5,238,369 A | 8/1993 | Farr | |
| 5,240,380 A | 8/1993 | Mabe | |
| 5,272,933 A | 12/1993 | Collier | |
| 5,295,790 A | 3/1994 | Bossart | |
| 5,295,857 A | 3/1994 | Toly | |
| 5,319,298 A | 6/1994 | Wanzong et al. | |
| 5,324,170 A | 6/1994 | Anastos | |
| 5,327,036 A | 7/1994 | Carey | |
| 5,342,176 A | 8/1994 | Redlich | |
| 5,349,281 A | 9/1994 | Bugaj | |
| 5,352,969 A | 10/1994 | Gilmore et al. | |
| 5,363,912 A * | 11/1994 | Wolcott | 166/72 |
| 5,418,984 A | 5/1995 | Livingston, Jr. | |
| D359,458 S | 6/1995 | Pierret | |
| 5,425,624 A | 6/1995 | Williams | |
| 5,443,368 A * | 8/1995 | Weeks et al. | 417/27 |
| 5,449,274 A | 9/1995 | Kochan, Jr. | |
| 5,449,997 A | 9/1995 | Gilmore et al. | |
| 5,450,316 A | 9/1995 | Gaudet et al. | |
| D363,060 S | 10/1995 | Hunger | |
| 5,457,373 A * | 10/1995 | Heppe et al. | 318/772 |
| 5,471,125 A | 11/1995 | Wu | |
| 5,473,497 A | 12/1995 | Beatty | |
| 5,483,229 A * | 1/1996 | Tamura et al. | 340/691.7 |
| 5,499,902 A | 3/1996 | Rockwood | |
| 5,510,945 A * | 4/1996 | Taylor | H02H 3/33 361/18 |
| 5,511,397 A | 4/1996 | Makino | |
| 5,512,883 A | 4/1996 | Lane, Jr. | |
| 5,518,371 A | 5/1996 | Wellstein | |
| 5,519,848 A | 5/1996 | Wloka | |
| 5,520,517 A | 5/1996 | Sipin | |
| 5,522,707 A | 6/1996 | Potter | |
| 5,529,462 A | 6/1996 | Hawes | |
| 5,540,555 A | 7/1996 | Corso | |
| D372,719 S | 8/1996 | Jensen | |
| 5,545,012 A | 8/1996 | Anastos | |
| 5,548,854 A | 8/1996 | Bloemer | |
| 5,550,753 A | 8/1996 | Tompkins | |
| 5,559,762 A | 9/1996 | Sakamoto | |
| 5,562,422 A | 10/1996 | Ganzon et al. | |
| D375,908 S | 11/1996 | Schumaker | |
| 5,570,481 A | 11/1996 | Mathis | |
| 5,571,000 A | 11/1996 | Zimmermann | |
| 5,577,890 A | 11/1996 | Nielsen | |
| 5,580,221 A * | 12/1996 | Triezenberg | 417/44.2 |
| 5,582,017 A | 12/1996 | Noji et al. | |
| 5,598,080 A | 1/1997 | Jensen | |
| 5,604,491 A | 2/1997 | Coonley | |
| 5,614,812 A | 3/1997 | Wagoner | |
| 5,622,223 A * | 4/1997 | Vasquez | 166/264 |
| 5,626,464 A | 5/1997 | Schoenmeyr | |
| 5,628,896 A | 5/1997 | Klingenberger | |
| 5,629,601 A | 5/1997 | Feldstein | |
| 5,633,540 A | 5/1997 | Moan | |
| 5,640,078 A | 6/1997 | Kou et al. | |
| 5,654,504 A | 8/1997 | Smith | |
| 5,666,255 A * | 9/1997 | Muelleman | H02H 9/005 361/111 |
| 5,669,323 A | 9/1997 | Pritchard | |
| 5,672,050 A | 9/1997 | Webber et al. | |
| 5,682,624 A | 11/1997 | Ciochetti | |
| 5,690,476 A | 11/1997 | Miller | |
| 5,708,348 A | 1/1998 | Frey et al. | |
| 5,711,483 A | 1/1998 | Hays | |
| 5,712,795 A | 1/1998 | Layman et al. | |
| 5,713,320 A | 2/1998 | Pfaff | |
| 5,727,933 A | 3/1998 | Laskaris | |
| 5,730,861 A | 3/1998 | Sterghos | |
| 5,731,673 A | 3/1998 | Gilmore | |
| 5,739,648 A | 4/1998 | Ellis | |
| 5,742,500 A * | 4/1998 | Irvin | F04D 15/0066 417/2 |
| 5,744,921 A | 4/1998 | Makaran | |
| 5,754,421 A | 5/1998 | Nystrom | |
| 5,767,606 A | 6/1998 | Bresolin | |
| 5,777,833 A | 7/1998 | Romillon | |
| 5,780,992 A | 7/1998 | Beard | |
| 5,791,882 A | 8/1998 | Stucker | |
| 5,796,234 A * | 8/1998 | Vrionis | 318/751 |
| 5,802,910 A | 9/1998 | Krahn et al. | |
| 5,804,080 A | 9/1998 | Klingenberger | |
| 5,818,714 A | 10/1998 | Zou | |
| 5,819,848 A | 10/1998 | Rasmuson | |
| 5,820,350 A | 10/1998 | Mantey | |
| 5,828,200 A | 10/1998 | Ligman | |
| 5,833,437 A | 11/1998 | Kurth | |
| 5,836,271 A | 11/1998 | Sasaki | |
| 5,845,225 A | 12/1998 | Mosher | |
| 5,863,185 A | 1/1999 | Cochimin et al. | |
| 5,883,489 A | 3/1999 | Konrad | |
| 5,894,609 A | 4/1999 | Barnett | |
| 5,898,958 A | 5/1999 | Hall | |
| 5,906,479 A | 5/1999 | Hawes | |
| 5,907,281 A | 5/1999 | Miller, Jr. | |
| 5,909,352 A | 6/1999 | Klabunde | |
| 5,909,372 A | 6/1999 | Thybo | |
| 5,914,881 A | 6/1999 | Trachier | |
| 5,920,264 A | 7/1999 | Kim | |
| 5,930,092 A | 7/1999 | Nystrom | |
| 5,941,690 A | 8/1999 | Lin | |
| 5,944,444 A | 8/1999 | Motz et al. | |
| 5,945,802 A | 8/1999 | Konrad | |
| 5,946,469 A * | 8/1999 | Chidester | 703/24 |
| 5,947,689 A | 9/1999 | Schick | |
| 5,947,700 A | 9/1999 | McKain | |
| 5,959,534 A | 9/1999 | Campbell | |
| 5,961,291 A | 10/1999 | Sakagami | |
| 5,969,958 A | 10/1999 | Nielsen | |
| 5,973,465 A | 10/1999 | Rayner | |
| 5,983,146 A | 11/1999 | Sarbach | |
| 5,986,433 A | 11/1999 | Peele et al. | |
| 5,987,105 A | 11/1999 | Jenkins et al. | |
| 5,991,939 A | 11/1999 | Mulvey | |
| 6,030,180 A | 2/2000 | Clarey | |
| 6,037,742 A | 3/2000 | Rasmussen | |
| 6,043,461 A | 3/2000 | Holling | |
| 6,045,331 A | 4/2000 | Gehm | |
| 6,045,333 A | 4/2000 | Breit | |
| 6,046,492 A | 4/2000 | Machida | |
| 6,048,183 A | 4/2000 | Meza | |
| 6,056,008 A | 5/2000 | Adams et al. | |
| 6,059,536 A | 5/2000 | Stingl | |
| 6,060,876 A * | 5/2000 | Glasband | H01F 19/04 323/355 |
| 6,065,946 A | 5/2000 | Lathrop | |
| 6,072,291 A | 6/2000 | Pedersen | |
| 6,081,751 A | 6/2000 | Luo | |
| 6,091,604 A | 7/2000 | Plougsgaard | |
| D429,699 S | 8/2000 | Davis | |
| D429,700 S | 8/2000 | Liebig | |
| 6,094,764 A | 8/2000 | Veloskey et al. | |
| 6,098,654 A | 8/2000 | Cohen | |
| 6,102,665 A | 8/2000 | Centers | |
| 6,110,322 A | 8/2000 | Teoh | |
| 6,116,040 A | 9/2000 | Stark | |
| 6,121,746 A | 9/2000 | Fisher | |
| 6,121,749 A * | 9/2000 | Wills et al. | 318/811 |
| 6,125,481 A | 10/2000 | Sicilano | |
| 6,125,883 A | 10/2000 | Creps et al. | |
| 6,142,741 A | 11/2000 | Nishihata | |
| 6,146,108 A | 11/2000 | Mullendore | |
| 6,150,776 A | 11/2000 | Potter et al. | |
| 6,157,304 A | 12/2000 | Bennett | |
| 6,171,073 B1 | 1/2001 | McKain | |
| 6,178,393 B1 * | 1/2001 | Irvin | F04D 15/0066 700/282 |

(56) References Cited

U.S. PATENT DOCUMENTS

| | | |
|---|---|---|
| 6,184,650 B1 | 2/2001 | Gelbman |
| 6,188,200 B1 | 2/2001 | Maiorano |
| 6,198,257 B1 | 3/2001 | Belehradek et al. |
| 6,199,224 B1 | 3/2001 | Versland |
| 6,203,282 B1 | 3/2001 | Morin |
| 6,208,112 B1 | 3/2001 | Jensen |
| 6,227,808 B1 | 5/2001 | McDonough |
| 6,238,188 B1 | 5/2001 | Lifson |
| 6,246,558 B1 * | 6/2001 | DiSalvo .......... H01H 83/04 361/42 |
| 6,249,435 B1 | 6/2001 | Vicente |
| 6,253,227 B1 | 6/2001 | Tompkins |
| D445,405 S | 7/2001 | Schneider |
| 6,254,353 B1 | 7/2001 | Polo |
| 6,257,304 B1 | 7/2001 | Jacobs |
| 6,257,833 B1 | 7/2001 | Bates |
| 6,259,617 B1 | 7/2001 | Wu |
| 6,264,431 B1 | 7/2001 | Triezenberg |
| 6,264,432 B1 | 7/2001 | Kilayko |
| 6,280,611 B1 | 8/2001 | Henkin |
| 6,282,370 B1 | 8/2001 | Cline et al. |
| 6,298,721 B1 | 10/2001 | Schuppe et al. |
| 6,299,414 B1 | 10/2001 | Schoenmeyr |
| 6,299,699 B1 | 10/2001 | Porat |
| 6,318,093 B2 | 11/2001 | Gaudet et al. |
| 6,326,752 B1 | 12/2001 | Jensen |
| 6,330,525 B1 | 12/2001 | Hays |
| 6,342,841 B1 | 1/2002 | Stingl |
| 6,349,268 B1 | 2/2002 | Ketonen |
| 6,350,105 B1 | 2/2002 | Kobayashi et al. |
| 6,351,359 B1 | 2/2002 | Jæger |
| 6,354,805 B1 | 3/2002 | Møller |
| 6,356,853 B1 | 3/2002 | Sullivan |
| 6,362,591 B1 | 3/2002 | Moberg |
| 6,364,620 B1 | 4/2002 | Fletcher et al. |
| 6,364,621 B1 | 4/2002 | Yamauchi |
| 6,366,053 B1 | 4/2002 | Belehradek |
| 6,369,463 B1 | 4/2002 | Maiorano |
| 6,373,204 B1 | 4/2002 | Peterson |
| 6,373,728 B1 | 4/2002 | Aarestrup |
| 6,375,430 B1 | 4/2002 | Eckert et al. |
| 6,380,707 B1 | 4/2002 | Rosholm |
| 6,388,642 B1 | 5/2002 | Cotis |
| 6,390,781 B1 | 5/2002 | McDonough |
| 6,406,265 B1 | 6/2002 | Hahn |
| 6,415,808 B2 | 7/2002 | Joshi |
| 6,416,295 B1 | 7/2002 | Nagai |
| 6,426,633 B1 | 7/2002 | Thybo |
| 6,443,715 B1 | 9/2002 | Mayleben et al. |
| 6,447,446 B1 | 9/2002 | Smith |
| 6,450,771 B1 | 9/2002 | Centers |
| 6,464,464 B2 | 10/2002 | Sabini |
| 6,468,042 B2 | 10/2002 | Møller |
| 6,468,052 B2 | 10/2002 | McKain |
| 6,474,949 B1 | 11/2002 | Arai |
| 6,481,973 B1 | 11/2002 | Struthers |
| 6,483,278 B2 | 11/2002 | Harvest |
| 6,483,378 B2 | 11/2002 | Blodgett |
| 6,493,227 B2 | 12/2002 | Nielsen |
| 6,501,629 B1 | 12/2002 | Marriott |
| 6,503,063 B1 | 1/2003 | Brunell |
| 6,504,338 B1 | 1/2003 | Eichorn |
| 6,522,034 B1 | 2/2003 | Nakayama |
| 6,523,091 B2 | 2/2003 | Tirumala et al. |
| 6,527,518 B2 | 3/2003 | Ostrowski |
| 6,534,940 B2 | 3/2003 | Bell |
| 6,534,947 B2 | 3/2003 | Johnson |
| 6,537,032 B1 | 3/2003 | Horiuchi |
| 6,548,976 B2 | 4/2003 | Jensen |
| 6,570,778 B2 * | 5/2003 | Lipo et al. .......... 363/41 |
| 6,571,807 B2 | 6/2003 | Jones |
| 6,591,697 B2 | 7/2003 | Henyan |
| 6,595,051 B1 | 7/2003 | Chandler, Jr. |
| 6,604,909 B2 | 8/2003 | Schoenmeyr |
| 6,607,360 B2 | 8/2003 | Fong |
| 6,623,245 B2 | 9/2003 | Meza |
| 6,628,840 B1 | 9/2003 | Aschenbrenner |
| 6,632,072 B2 | 10/2003 | Lipscomb et al. |
| 6,636,135 B1 | 10/2003 | Vetter |
| 6,638,023 B2 | 10/2003 | Scott |
| D482,664 S | 11/2003 | Hunt |
| 6,651,900 B1 | 11/2003 | Yoshida |
| 6,663,349 B1 * | 12/2003 | Discenzo et al. .......... 417/44.1 |
| 6,672,147 B1 | 1/2004 | Mazet |
| 6,676,382 B2 | 1/2004 | Leighton et al. |
| 6,676,831 B2 | 1/2004 | Wolfe |
| 6,690,250 B2 | 2/2004 | Møller |
| 6,696,676 B1 | 2/2004 | Graves |
| 6,709,240 B1 | 3/2004 | Schmalz |
| 6,709,241 B2 | 3/2004 | Sabini |
| 6,709,575 B1 | 3/2004 | Verdegan |
| 6,715,996 B2 | 4/2004 | Moeller |
| 6,717,318 B1 | 4/2004 | Mathiassen |
| 6,732,387 B1 | 5/2004 | Waldron |
| D490,726 S | 6/2004 | Eungprabhanth |
| 6,747,367 B2 | 6/2004 | Cline |
| 6,770,043 B1 | 8/2004 | Kahn |
| 6,774,664 B2 | 8/2004 | Godbersen |
| 6,776,038 B1 | 8/2004 | Horton et al. |
| 6,776,584 B2 | 8/2004 | Sabini et al. |
| 6,778,868 B2 | 8/2004 | Imamura et al. |
| 6,782,309 B2 | 8/2004 | Laflamme et al. |
| 6,783,328 B2 | 8/2004 | Lucke et al. |
| 6,789,024 B1 | 9/2004 | Kochan, Jr. et al. |
| 6,797,164 B2 | 9/2004 | Leaverton |
| 6,799,950 B2 | 10/2004 | Meier et al. |
| 6,806,677 B2 * | 10/2004 | Kelly et al. .......... 318/767 |
| 6,837,688 B2 | 1/2005 | Kimberlin |
| 6,842,117 B2 | 1/2005 | Keown |
| 6,847,130 B1 | 1/2005 | Belehradek et al. |
| 6,847,854 B2 | 1/2005 | Discenzo |
| 6,854,479 B2 | 2/2005 | Harwood |
| 6,863,502 B2 | 3/2005 | Bishop |
| 6,867,383 B1 | 3/2005 | Currier |
| 6,875,961 B1 | 4/2005 | Collins |
| 6,884,022 B2 | 4/2005 | Albright |
| D504,900 S | 5/2005 | Wang |
| D505,429 S | 5/2005 | Wang |
| 6,888,537 B2 | 5/2005 | Benson |
| 6,900,736 B2 | 5/2005 | Crumb |
| D507,243 S | 7/2005 | Miller |
| 6,922,348 B2 | 7/2005 | Nakajima et al. |
| 6,925,823 B2 | 8/2005 | Lifson |
| 6,933,693 B2 | 8/2005 | Schuchmann |
| 6,941,785 B2 | 9/2005 | Haynes |
| 6,943,325 B2 | 9/2005 | Pittman et al. |
| D511,530 S | 11/2005 | Wang |
| D512,026 S | 11/2005 | Nurmi |
| 6,965,815 B1 | 11/2005 | Tompkins |
| 6,966,967 B2 | 11/2005 | Curry et al. |
| D512,440 S | 12/2005 | Wang |
| 6,973,794 B2 | 12/2005 | Street et al. |
| 6,973,974 B2 | 12/2005 | McLoughlin et al. |
| 6,976,052 B2 | 12/2005 | Tompkins |
| D513,737 S | 1/2006 | Riley |
| 6,981,399 B1 | 1/2006 | Nybo |
| 6,981,402 B2 | 1/2006 | Bristol |
| 6,984,158 B2 | 1/2006 | Satoh |
| 6,989,649 B2 | 1/2006 | Mehlhorn |
| 6,993,414 B2 | 1/2006 | Shah |
| 7,112,037 B2 | 1/2006 | Nybo |
| 6,998,807 B2 | 2/2006 | Phillips et al. |
| 6,998,977 B2 | 2/2006 | Gregori et al. |
| 7,005,818 B2 | 2/2006 | Jensen |
| 7,012,394 B2 | 3/2006 | Moore et al. |
| 7,015,599 B2 | 3/2006 | Gull et al. |
| 7,040,107 B2 | 5/2006 | Lee |
| 7,050,278 B2 | 5/2006 | Poulsen |
| 7,080,508 B2 | 7/2006 | Stavale |
| 7,081,728 B2 * | 7/2006 | Kemp .......... 318/437 |
| 7,083,392 B2 | 8/2006 | Meza et al. |
| 7,100,632 B2 | 9/2006 | Harwood |
| 7,102,505 B2 | 9/2006 | Kates |
| 7,114,926 B2 | 10/2006 | Oshita |

(56) References Cited

U.S. PATENT DOCUMENTS

| | | |
|---|---|---|
| 7,117,120 B2 | 10/2006 | Beck |
| 7,142,932 B2 | 11/2006 | Spira et al. |
| D533,512 S | 12/2006 | Nakashima |
| 7,172,366 B1 | 2/2007 | Bishop, Jr. |
| 7,183,741 B2 | 2/2007 | Mehlhorn |
| 7,195,462 B2 | 3/2007 | Nybo et al. |
| 7,201,563 B2 | 4/2007 | Studebaker |
| 7,221,121 B2 | 5/2007 | Skaug |
| 7,244,106 B2 | 7/2007 | Kallman |
| 7,259,533 B2 | 8/2007 | Yang et al. |
| 7,264,449 B1 | 9/2007 | Harned et al. |
| 7,281,958 B2 | 10/2007 | Schuttler et al. |
| 7,307,538 B2 | 12/2007 | Kochan, Jr. |
| 7,309,216 B1 | 12/2007 | Spadola et al. |
| D562,349 S | 2/2008 | Bülter |
| 7,339,126 B1 | 3/2008 | Niedermeyer |
| D567,189 S | 4/2008 | Stiles, Jr. |
| 7,375,940 B1 | 5/2008 | Bertrand |
| 7,388,348 B2 | 6/2008 | Mattichak |
| 7,407,371 B2 | 8/2008 | Leone et al. |
| 7,427,844 B2 | 9/2008 | Mehlhorn |
| 7,429,842 B2 | 9/2008 | Schulman et al. |
| D582,797 S | 12/2008 | Fraser |
| D583,828 S | 12/2008 | Li |
| 7,458,782 B1 | 12/2008 | Spadola et al. |
| 7,459,886 B1 | 12/2008 | Potanin et al. |
| 7,484,938 B2 | 2/2009 | Allen |
| 7,516,106 B2 | 4/2009 | Ehlers et al. |
| 7,525,280 B2 | 4/2009 | Fagan et al. |
| 7,528,579 B2 | 5/2009 | Pacholok et al. |
| 7,542,251 B2 | 6/2009 | Ivankovic |
| 7,542,252 B2 | 6/2009 | Chan et al. |
| 7,612,510 B2 | 11/2009 | Koehl |
| 7,612,529 B2 | 11/2009 | Kochan, Jr. |
| 7,623,986 B2 | 11/2009 | Miller |
| 7,641,449 B2 | 1/2010 | Iimura et al. |
| 7,652,441 B2 | 1/2010 | Ho |
| 7,686,589 B2 | 3/2010 | Stiles, Jr. et al. |
| 7,690,897 B2 | 4/2010 | Branecky |
| 7,700,887 B2 | 4/2010 | Niedermeyer |
| 7,704,051 B2 | 4/2010 | Koehl |
| 7,727,181 B2 | 6/2010 | Rush |
| 7,739,733 B2 | 6/2010 | Szydlo |
| 7,746,063 B2 | 6/2010 | Sabini et al. |
| 7,755,318 B1 | 7/2010 | Panosh |
| 7,775,327 B2 | 8/2010 | Abraham et al. |
| 7,777,435 B2 | 8/2010 | Aguilar |
| 7,788,877 B2 | 9/2010 | Andras |
| 7,795,824 B2 | 9/2010 | Shen et al. |
| 7,808,211 B2 | 10/2010 | Pacholok et al. |
| 7,821,215 B2 | 10/2010 | Koehl |
| 7,845,913 B2 | 12/2010 | Stiles, Jr. et al. |
| 7,854,597 B2 | 12/2010 | Stiles, Jr. et al. |
| 7,857,600 B2 | 12/2010 | Koehl |
| 7,874,808 B2 | 1/2011 | Stiles |
| 7,925,385 B2 | 4/2011 | Stavale et al. |
| 7,931,447 B2 | 4/2011 | Levin et al. |
| 7,945,411 B2 | 5/2011 | Kernan et al. |
| 7,976,284 B2 | 7/2011 | Koehl |
| 7,983,877 B2 | 7/2011 | Koehl |
| 7,990,091 B2 | 8/2011 | Koehl |
| 8,011,895 B2 | 9/2011 | Ruffo |
| 8,019,479 B2 | 9/2011 | Stiles, Jr. et al. |
| 8,032,256 B1 | 10/2011 | Wolf et al. |
| 8,043,070 B2 | 10/2011 | Stiles, Jr. et al. |
| 8,049,464 B2 | 11/2011 | Muntermann |
| 8,098,048 B2 | 1/2012 | Hoff |
| 8,104,110 B2 | 1/2012 | Caudill et al. |
| 8,126,574 B2 | 2/2012 | Discenzo et al. |
| 8,133,034 B2 | 3/2012 | Mehlhorn et al. |
| 8,134,336 B2 | 3/2012 | Michalske et al. |
| 8,177,520 B2 | 5/2012 | Mehlhorn |
| 8,281,425 B2 | 10/2012 | Cohen |
| 8,303,260 B2 | 11/2012 | Stavale et al. |
| 8,313,306 B2 | 11/2012 | Stiles et al. |
| 8,316,152 B2 | 11/2012 | Geltner et al. |
| 8,317,485 B2 | 11/2012 | Meza et al. |
| 8,337,166 B2 | 12/2012 | Meza et al. |
| 8,380,355 B2 | 2/2013 | Mayleben et al. |
| 8,405,346 B2 | 3/2013 | Trigiani |
| 8,405,361 B2 | 3/2013 | Richards et al. |
| 8,444,394 B2 | 5/2013 | Koehl |
| 8,465,262 B2 | 6/2013 | Stiles, Jr. et al. |
| 8,469,675 B2 | 6/2013 | Stiles, Jr. et al. |
| 8,480,373 B2 | 7/2013 | Stiles, Jr. et al. |
| 8,540,493 B2 | 9/2013 | Koehl |
| 8,547,065 B2 | 10/2013 | Trigiani |
| 8,573,952 B2 | 11/2013 | Stiles, Jr. et al. |
| 8,579,600 B2 | 11/2013 | Vijayakumar |
| 8,602,745 B2 | 12/2013 | Stiles, Jr. et al. |
| 8,641,383 B2 | 2/2014 | Meza et al. |
| 8,756,991 B2 | 6/2014 | Edwards |
| 2001/0002238 A1 | 5/2001 | McKain |
| 2001/0041139 A1 | 11/2001 | Sabini |
| 2002/0000789 A1 | 1/2002 | Haba |
| 2002/0002989 A1 | 1/2002 | Jones |
| 2002/0010839 A1 | 1/2002 | Tirumala et al. |
| 2002/0018721 A1 | 2/2002 | Kobayashi et al. |
| 2002/0032491 A1 | 3/2002 | Imamura et al. |
| 2002/0050490 A1 | 5/2002 | Pittman et al. |
| 2002/0070611 A1 | 6/2002 | Cline et al. |
| 2002/0070875 A1 | 6/2002 | Crumb |
| 2002/0082727 A1 | 6/2002 | Laflamme et al. |
| 2002/0089236 A1 | 7/2002 | Cline |
| 2002/0093306 A1 | 7/2002 | Johnson |
| 2002/0111554 A1 | 8/2002 | Drzewiecki et al. |
| 2002/0131866 A1 | 9/2002 | Phillips |
| 2002/0136642 A1 | 9/2002 | Moller |
| 2002/0150476 A1 | 10/2002 | Lucke et al. |
| 2002/0176783 A1 | 11/2002 | Moeller |
| 2002/0190687 A1 | 12/2002 | Bell |
| 2003/0017055 A1 | 1/2003 | Fong |
| 2003/0030954 A1 | 2/2003 | Bax et al. |
| 2003/0034284 A1 | 2/2003 | Wolfe |
| 2003/0061004 A1 | 3/2003 | Discenzo |
| 2003/0063900 A1 | 4/2003 | Wang |
| 2003/0099548 A1 | 5/2003 | Meza |
| 2003/0106147 A1 | 6/2003 | Cohen |
| 2003/0174450 A1 | 9/2003 | Nakajima et al. |
| 2003/0196942 A1 | 10/2003 | Jones |
| 2004/0000525 A1 | 1/2004 | Hornsby |
| 2004/0006486 A1 | 1/2004 | Schmidt |
| 2004/0009075 A1 | 1/2004 | Meza |
| 2004/0013531 A1 | 1/2004 | Curry |
| 2004/0025244 A1 | 2/2004 | Loyd |
| 2004/0055363 A1 | 3/2004 | Bristol |
| 2004/0062658 A1 | 4/2004 | Beck |
| 2004/0090197 A1 | 5/2004 | Schuchmann |
| 2004/0116241 A1 | 6/2004 | Ishikawa |
| 2004/0117330 A1 | 6/2004 | Ehlers et al. |
| 2004/0149666 A1 | 8/2004 | Leaverton |
| 2004/0213676 A1 | 10/2004 | Phillips |
| 2004/0265134 A1 | 12/2004 | Iimura et al. |
| 2005/0050908 A1 | 3/2005 | Lee |
| 2005/0086957 A1 | 4/2005 | Lifson |
| 2005/0095150 A1 | 5/2005 | Leone et al. |
| 2005/0123408 A1* | 6/2005 | Koehl ............... F04D 15/0088 417/53 |
| 2005/0137720 A1 | 6/2005 | Spira et al. |
| 2005/0156568 A1 | 7/2005 | Yueh |
| 2005/0170936 A1 | 8/2005 | Quinn |
| 2005/0180868 A1 | 8/2005 | Miller |
| 2005/0190094 A1 | 9/2005 | Andersen |
| 2005/0193485 A1 | 9/2005 | Wolfe |
| 2005/0195545 A1 | 9/2005 | Mladenik |
| 2005/0226731 A1 | 10/2005 | Mehlhorn |
| 2005/0235732 A1 | 10/2005 | Rush |
| 2005/0248310 A1 | 11/2005 | Fagan et al. |
| 2005/0281679 A1 | 12/2005 | Niedermeyer |
| 2006/0045750 A1 | 3/2006 | Stiles |
| 2006/0045751 A1 | 3/2006 | Beckman |
| 2006/0078435 A1 | 4/2006 | Burza |
| 2006/0078444 A1 | 4/2006 | Sacher |
| 2006/0090255 A1 | 5/2006 | Cohen |

(56) References Cited

U.S. PATENT DOCUMENTS

| | | |
|---|---|---|
| 2006/0093492 A1 | 5/2006 | Janesky |
| 2006/0127227 A1 | 6/2006 | Mehlhorn et al. |
| 2006/0138033 A1 | 6/2006 | Hoal |
| 2006/0146462 A1 | 7/2006 | McMillian |
| 2006/0169322 A1 | 8/2006 | Torkelson |
| 2006/0204367 A1 | 9/2006 | Meza et al. |
| 2006/0226997 A1 | 10/2006 | Kochan, Jr. |
| 2006/0235573 A1 | 10/2006 | Guion |
| 2006/0269426 A1 | 11/2006 | Llewellyn |
| 2007/0001635 A1 | 1/2007 | Ho |
| 2007/0041845 A1 | 2/2007 | Freudenberger |
| 2007/0061051 A1 | 3/2007 | Maddox |
| 2007/0080660 A1 | 4/2007 | Fagan et al. |
| 2007/0113647 A1 | 5/2007 | Mehlhorn |
| 2007/0114162 A1 | 5/2007 | Stiles et al. |
| 2007/0124321 A1 | 5/2007 | Szydlo |
| 2007/0154319 A1 | 7/2007 | Stiles et al. |
| 2007/0154320 A1 | 7/2007 | Stiles et al. |
| 2007/0154321 A1 | 7/2007 | Stiles et al. |
| 2007/0154322 A1 | 7/2007 | Stiles et al. |
| 2007/0154323 A1 | 7/2007 | Stiles et al. |
| 2007/0160480 A1 | 7/2007 | Ruffo |
| 2007/0163929 A1 | 7/2007 | Stiles et al. |
| 2007/0183902 A1 | 8/2007 | Stiles et al. |
| 2007/0187185 A1 | 8/2007 | Abraham et al. |
| 2007/0188129 A1 | 8/2007 | Kochan, Jr. |
| 2007/0212210 A1 | 9/2007 | Kernan et al. |
| 2007/0212229 A1 | 9/2007 | Stavale et al. |
| 2007/0212230 A1 | 9/2007 | Stavale et al. |
| 2007/0258827 A1 | 11/2007 | Gierke |
| 2007/0265134 A1 | 11/2007 | Robuck |
| 2008/0003114 A1 | 1/2008 | Levin et al. |
| 2008/0031751 A1 | 2/2008 | Littwin et al. |
| 2008/0031752 A1 | 2/2008 | Littwin et al. |
| 2008/0039977 A1 | 2/2008 | Clark |
| 2008/0041839 A1 | 2/2008 | Tran |
| 2008/0063535 A1 | 3/2008 | Koehl |
| 2008/0095638 A1 | 4/2008 | Branecky |
| 2008/0095639 A1 | 4/2008 | Bartos |
| 2008/0131286 A1 | 6/2008 | Koehl |
| 2008/0131289 A1 | 6/2008 | Koehl |
| 2008/0131291 A1 | 6/2008 | Koehl |
| 2008/0131294 A1 | 6/2008 | Koehl |
| 2008/0131295 A1 | 6/2008 | Koehl |
| 2008/0131296 A1 | 6/2008 | Koehl |
| 2008/0140353 A1 | 6/2008 | Koehl |
| 2008/0152508 A1 | 6/2008 | Meza |
| 2008/0168599 A1 | 7/2008 | Caudill et al. |
| 2008/0181785 A1 | 7/2008 | Koehl |
| 2008/0181786 A1 | 7/2008 | Meza |
| 2008/0181787 A1 | 7/2008 | Koehl |
| 2008/0181788 A1 | 7/2008 | Meza et al. |
| 2008/0181789 A1 | 7/2008 | Koehl |
| 2008/0181790 A1 | 7/2008 | Meza et al. |
| 2008/0189885 A1 | 8/2008 | Erlich |
| 2008/0229819 A1 | 9/2008 | Mayleben et al. |
| 2008/0260540 A1 | 10/2008 | Koehl |
| 2008/0288115 A1 | 11/2008 | Rusnak |
| 2008/0298978 A1 | 12/2008 | Schulman et al. |
| 2009/0014044 A1 | 1/2009 | Hartman |
| 2009/0052281 A1 | 2/2009 | Nybo |
| 2009/0151801 A1* | 6/2009 | Gorman ............... F04D 13/14 137/565.11 |
| 2009/0204237 A1 | 8/2009 | Sustaeta |
| 2009/0204267 A1 | 8/2009 | Sustaeta |
| 2009/0208345 A1 | 8/2009 | Moore et al. |
| 2009/0210081 A1 | 8/2009 | Sustaeta |
| 2009/0269217 A1 | 10/2009 | Vijayakumar |
| 2010/0154534 A1 | 6/2010 | Hampton |
| 2010/0166570 A1 | 7/2010 | Hampton |
| 2010/0197364 A1 | 8/2010 | Lee |
| 2010/0303654 A1 | 12/2010 | Petersen et al. |
| 2010/0306001 A1 | 12/2010 | Discenzo et al. |
| 2010/0312398 A1 | 12/2010 | Kidd et al. |
| 2011/0036164 A1 | 2/2011 | Burdi |
| 2011/0044823 A1 | 2/2011 | Stiles |
| 2011/0052416 A1 | 3/2011 | Stiles |
| 2011/0077875 A1 | 3/2011 | Tran |
| 2011/0084650 A1 | 4/2011 | Kaiser et al. |
| 2011/0110794 A1 | 5/2011 | Mayleben et al. |
| 2011/0311370 A1 | 12/2011 | Sloss et al. |
| 2012/0020810 A1 | 1/2012 | Stiles, Jr. et al. |
| 2012/0100010 A1 | 4/2012 | Stiles, Jr. et al. |

FOREIGN PATENT DOCUMENTS

| | | |
|---|---|---|
| DE | 3023463 | 2/1981 |
| DE | 29612980U1 U1 | 10/1996 |
| DE | 19736079 | 8/1997 |
| DE | 19645129 | 5/1998 |
| DE | 10231773 | 2/2004 |
| DE | 19938490 | 4/2005 |
| EP | 246769 | 5/1986 |
| EP | 0306814 | 3/1989 |
| EP | 314249 | 5/1989 |
| EP | 709575 | 5/1996 |
| EP | 833436 | 9/1996 |
| EP | 735273 | 10/1996 |
| EP | 0831188 | 2/1999 |
| EP | 978657 | 2/2000 |
| EP | 1134421 | 3/2009 |
| FR | 2529965 | 6/1983 |
| FR | 2703409 | 10/1994 |
| GB | 2124304 | 6/1983 |
| JP | 5010270 | 1/1993 |
| WO | 1998004835 | 2/1998 |
| WO | 2000042339 | 7/2000 |
| WO | 2001047099 | 6/2001 |
| WO | 2003099705 | 12/2003 |
| WO | 2004006416 | 1/2004 |
| WO | 2004073772 | 9/2004 |
| WO | 2004088694 | 10/2004 |
| WO | 2006069568 | 7/2006 |
| WO | 2011/100067 A1 | 8/2011 |

OTHER PUBLICATIONS

1—Complaint Filed by Pentair Water Pool & Spa, Inc. And Danfoss Drives A/S with respect to Civil Action No. 5:11-cv-00459-D; Aug. 31, 2011.

7—Motion for Preliminary Injunction by Danfoss Drives A/S & Pentair Water Pool & Spa, Inc. with respect to Civil Action No. 5:11-cv-00459-D; Sep. 30, 2011.

22—Memorandum in Support of Motion for Preliminary Injunction by Plaintiffs with respect to Civil Action 5:11-cv-00459-D; Sep. 2, 2011.

23—Declaration of E. Randolph Collins, Jr. in Support of Motion for Preliminary Injunction with respect to Civil Action 5:11-cv-00459-D; Sep. 30, 2011.

24—Declaration of Zack Picard in Support of Motion for Preliminary Injunction with respect to Civil Action 5:11-cv-00459-D; Sep. 30, 2011.

32—Answer to Complaint with Jury Demand & Counterclaim Against Plaintiffs by Hayward Pool Products & Hayward Industries for Civil Action 5:11-cv-00459D; Oct. 12, 2011.

45—Plaintiffs' Reply to Defendants' Answer to Complaint & Counterclaim for Civil Action 5:11-cv-00459D; Nov. 2, 2011.

50—Amended Answer to Complaint & Counterclaim by Defendants for Civil Action 5:11-cv-00459D; Nov. 23, 2011.

51—Response by Defendants in Opposition to Motion for Preliminary Injunction for Civil Action 5:11-cv-00459D; Dec. 2, 2011.

53—Declaration of Douglas C. Hopkins & Exhibits re Response Opposing Motion for Preliminary Injunction for Civil Action 5:11-cv-00459D; Dec. 2, 2011.

89—Reply to Response to Motion for Preliminary Injunction Filed by Danfoss Drives A/S & Pentair Water Pool & Spa, Inc. For Civil Action 5:11-cv-00459D; Jan. 3, 2012.

105—Declaration re Memorandum in Opposition, Declaration of Lars Hoffmann Berthelsen for Civil Action 5:11-cv-00459D; Jan. 11, 2012,.

(56) References Cited

OTHER PUBLICATIONS

112—Amended Complaint Against All Defendants, with Exhibits for Civil Action 5:11-cv-00459D; Jan. 17, 2012.
119—Order Denying Motion for Preliminary Injunction for Civil Action 5:11-cv-00459D; Jan. 23, 2012.
123—Answer to Amended Complaint, Counterclaim Against Danfoss Drives A/S, Pentair Water Pool & Spa, Inc. For Civil Action 5:11-cv-004590; Jan. 27, 2012.
152—Order Denying Motion for Reconsideration for Civil Action 5:11-cv-00459D; Apr. 4, 2012.
168—Amended Motion to Stay Action Pending Reexamination of Asserted Patents by Defendants for Civil Action 5:11-cv-004590; Jun. 13, 2012.
174—Notice and Attachments re Joint Claim Construction Statement for Civil Action 5:11-cv-00459D; Jun. 5, 2012.
186—Order Setting Hearings—Notice of Markman Hearing Set for Oct. 17, 2012 for Civil Action 5:11-ov-00459D; Jul. 12, 2012.
204—Response by Plaintiffs Opposing Amended Motion to Stay Action Pending Reexamination of Asserted Patents for Civil Action 5:11-cv-00459D; Jul. 2012.
210—Order Granting Joint Motion for Leave to Enlarge Page Limit for Civil Action 5:11-cv-00459D; Jul. 2012.
218—Notice re Plaintiffs re Order on Motion for Leave to File Excess Pages re Amended Joint Claim Construction Statement for Civil Action 5:11-cv-00459D; Aug. 2012.
Hayward EcoStar Technical Guide (Version2); 2011; pp. 1-51; cited in Civil Action 5:11-cv-00459D.
Hayward ProLogic Automation & Chlorination Operation Manual (Rev. F); pp. 1-27; Elizabeth, NJ; cited in Civil Action 5:11-cv-00459D; Dec. 2, 2011.
Stmicroelectronics; "AN1946—Sensorless BLDC Motor Control & Bemf Sampling Methods with ST7MC;" 2007; pp. 1-35; Civil Action 5:11-cv-00459D.
Stmicroelectronics; "AN1276 BLDC Motor Start Routine for ST72141 Microcontroller;" 2000; pp. 1-18; cited in Civil Action 5:11-cv-00459D.
Danfoss; "VLT 8000 Aqua Instruction Manual;" Apr. 2004; 1-210; Cited in Civil Action 5:11-cv-00459D.
Danfoss; "VLT 8000 Aqua Instruction Manual;" pp. 1-35; cited in Civil Action 5:11-cv-00459D; Dec. 2, 2011.
Commander; "Commander Se Advanced User Guide;" Nov. 2002; pp. 1-190; cited in Civil Action 5:11-cv-004590.
Sabbagh et al.; "A Model for Optimal . . . Control of Pumping Stations in Irrigation Systems;" Jul. 1988; NL pp. 119-133; Civil Action 5:11-cv-00459D.
Danfoss; "VLT 5000 FLUX Aqua DeviceNet Instruction Manual;" Apr. 28, 2003; pp. 1-39; cited in Civil Action 5:11-cv-00459D.
Danfoss; "VLT 5000 FLUX Aqua Profibus Operating Instructions;" May 22, 2003; 1-64; cited in Civil Action 5:11-cv-00459D.
Pentair; "IntelliTouch Owner's Manual Set-Up 8, Programming;" May 22, 2003; Sanford, NC; pp. 1-61; cited in Civil Action 5:11-cv-00459D.
Pentair; "Compool 3800 Pool-Spa Control System Installation & Operating Instructions;" Nov. 7, 1997; pp. 1-45; cited in Civil Action 5:11-cv-00459D.
Pentair Advertisement in "Pool & Spa News;" Mar. 22, 2002; pp. 1-3; cited in Civil Action 5:11-cv-00459D.
Hayward; "Pro-Series High-Rate Sand Filter Owner's Guide;" 2002; Elizabeth, NJ; pp. 1-5; cited in Civil Action 5:11-cv-00459D.
Danfoss; "VLT 8000 Aqua Fact Sheet;" Jan. 2002; pp. 1-3; cited in Civil Action 5:11-cv-00459D.
Danfoss; "VLT 6000 Series Installation, Operation & Maintenance Manual;" Mar. 2000; pp. 1-118; cited in Civil Action 5:11-cv-00459D.
Hopkins; "Synthesis of New Class of Converters that Utilize Energy Recirculation;" pp. 1-7; cited in Civil Action 5:11-cv-00459D; 1994.
Hopkins; "High-Temperature, High-Density . . . Embedded Operation;" pp. 1-8; cited in Civil Action 5:11-cv-00459D; Mar. 2006.
Hopkins; "Optimally Selecting Packaging Technologies . . . Cost & Performance;" pp. 1-9; cited in Civil Action 5:11-cv-00459D; Jun. 1999.
Hopkins; "Partitioning Digitally . . . Applications to Ballasts;" pp. 1-6; cited in Civil Action 5:11-cv-00459D; Mar. 2002.
Pentair; Selected Website Pages; pp. 1-29; cited in Civil Action 5:11-cv-00459D; Sep. 2011.
Pentair; "IntelliFlo Variable Speed Pump" Brochure; 2011; pp. 1-9; cited in Civil Action 5:11-cv-00459D.
Pentair; "IntelliFlo VF Intelligent Variable Flow Pump;" 2011; pp. 1-9; cited in Civil Action 5:11-cv-00459D.
Pentair; "IntelliFlo VS+SVRS Intelligent Variable Speed Pump;" 2011; pp. 1-9; cited in Civil Action 5:11-cv-00459D.
Sta-Rite; "IntelliPro Variable Speed Pump;" 2011; pp. 1-9; cited in Civil Action 5:11-cv-00459D.
"Understanding Constant Pressure Control;" pp. 1-3; Nov. 1, 1999.
"Water Pressure Problems" Published Article; The American Well Owner; No. 2, Jul. 2000.
Pentair; "IntelliFlo Installation and User's Guide;" pp. 1-53; Jul. 26, 2011; Sanford, NC; cited in Civil Action 5:11-cv-00459D.
Hayward Pool Products; "EcoStar Owner's Manual (Rev. B);" pp. 1-32; Elizabeth, NJ; cited in Civil Action 5:11-cv-00459D; 2010.
Hayward Pool Products; "EcoStar & EcoStar SVRS Brochure;" pp. 1-7; Elizabeth, NJ; cited in Civil Action 5:11-cv-00459D; Sep. 30, 2011.
Hayward Pool Products; "Hayward Energy Solutions Brochure ;" pp. 1-3; www.haywardnet.com; cited in Civil Action 5:11-cv-00459D; Sep. 2011.
Hayward Pool Products; "ProLogic Installation Manual (Rev. G);" pp. 1-25; Elizabeth, NJ; cited in Civil Action 5:11-cv-00459D; Sep. 2011.
Hayward Pool Products; "ProLogic Operation Manual (Rev. F);" pp. 1-27; Elizabeth, NJ; cited in Civil Action 5:11-cv-00459D; Sep. 2011.
Hayward Pool Products; "Wireless & Wired Remote Controls Brochure;" pp. 1-5; 2010; Elizabeth, NJ; cited in Civil Action 5:11-cv-00459D.
Hayward Pool Products; Selected Pages from Hayward's Website:/ www.hayward-pool.com; pp. 1-27; cited in Civil Action 5:11-cv-00459D; Sep. 2011.
Hayward Pool Products; "Selected Page from Hayward's Website Relating to EcoStar Pumps;" p. 1; cited in Civil Action 5:11-cv-00459D; Sep. 2011.
Hayward Pool Products; "Selected Page from Hayward's Website Relating to EcoStar SVRS Pumps;" cited in Civil Action 5:11-cv-00459; Sep. 2011.
Hayward Pool Systems; "Selected Pages from Hayward's Website Relating to ProLogic Controllers;" pp. 1-5; Civil Action 5:11-cv-00459D; Sep. 2011.
Hayward Pool Systems; "Hayward EcoStar & EcoStar SVRS Variable Speed Pumps Brochure;" Civil Action 5:11-cv-00459D; 2010.
Plaintiff's Preliminary Disclosure of Asserted Claims and Preliminary Infringement Contentions; cited in Civil Action 5:11-cv-00459; Feb. 21, 2012.
Pentair; "IntelliTouch Pool & Spa Control System User's Guide"; pp. 1-129; 2011; cited in Civil Action 5:11-cv-00459; 2011.
Deposition of Dr. Douglas C. Hopkins; pp. 1-391; 2011; taken in Civil Action 10-cv-1662.
Danfoss; "Whitepaper Automatic Energy Optimization;" pp. 1-4; 2011; cited in Civil Action 5:11-cv-00459.
Pentair; "IntelliPro VS+SVRS Intelligent Variable Speed Pump;" 2011; pp. 1-6; cited in Civil Action 5:11-cv-00459D.
Pentair; "IntelliTouch Pool & Spa Control Control Systems;" 2011; pp. 1-5; cited in Civil Action 5:11-cv-00459D.
Robert S. Carrow; "Electrician's Technical Reference-Variable Frequency Drives;" 2001; pp. 1-194.
Baldor; "Baldor Motors and Drives Series 14 Vector Drive Control Operating & Technical Manual;" Mar. 22, 1992; pp. 1-92.
Commander; "Commander SE Advanced User Guide;" Nov. 2002; pp. 1-118.
Baldor; "Balelor Series 10 Inverter Control: Installation and Operating Manual"; Feb. 2000; pp. 1-74.

(56) References Cited

OTHER PUBLICATIONS

Dinverter; "Dinverter 2B User Guide;" Nov. 1998; pp. 1-94.
Amtrol Inc.; "Amtrol Unearths the Facts About Variable Speed Pumps and Constant Pressure Valves;" pp. 1-5; Aug. 2002; West Warwick, RI USA.
Bjarke Soerensen; "Have You Chatted With Your Pump Today?" Undated Article Reprinted with Permission of Grundfos Pump University; pp. 1-2; USA.
Compool; "Compool CP3800 Pool-Spa Control System Installation and Operating Instructions;" Nov. 7, 1997; pp. 1-45.
"Constant Pressure is the Name of the Game;" Published Article from National Driller; Mar. 2001.
Danfoss; "Danfoss VLT 6000 Series Adjustable Frequency Drive Installation, Operation and Maintenance Manual;" Mar. 2000; pp. 1-118.
Danfoss; "VLT8000 Aqua Instruction Manual;" Apr. 16, 2004; pp. 1-71.
Email Regarding Grundfos' Price Increases/SQ/SQE Curves; pp. 1-7; Dec 19, 2001.
F.E. Myers; "Featured Product: F.E. Myers Introduces Revolutionary Constant Pressure Water System;" pp. 1-8; Jun. 28, 2000; Ashland, OH USA.
Franklin Electric; "CP Water-Subdrive 75 Constant Pressure Controller" Product Data Sheet; May 2001; Bluffton, IN USA.
Franklin Electric; "Franklin Aid, Subdrive 75: You Made It Better;" vol. 20, No. 1; pp. 1-2; Jan/Feb 2002; www.franklin-electric.com.
Franklin Electric; Constant Pressure in Just the Right Size; Aug. 2006; pp. 1-4; Bluffton, IN USA.
Franklin Electric; "Franklin Application Installation Data;" vol. 21, No. 5, Sep./Oct. 2003; pp. 1-2; www.franklin-electric.com.
Franklin Electric; "Monodrive MonodriveXT Single-Phase Constant Pressure;" Sep. 2008; pp. 1-2; Bluffton, IN USA.
Goulds Pumps; Advertisement from "Pumps & Systems Magazine;" Jan. 2002; Seneca Falls, NY.
Goulds Pumps; "Balanced Flow System Brochure;" pp. 1-4; 2001.
Goulds Pumps; "Balanced Flow Submersible System Installation, Operation & Trouble-Shooting Manual;" pp. 1-9; 2000; USA.
Goulds Pumps; "Balanced Flow Submersible System Informational Seminar;" pp. 1-22; Undated.
Goulds Pumps; "Balanced Flow System Variable Speed Submersible Pump" Specification Sheet; pp. 1-2; Jan. 2000; USA.
Goulds Pumps; "Hydro-Pro Water System Tank Installation, Operation & Maintenance Instructions;" pp. 1-30; Mar. 31, 2001; Seneca Falls, NY USA.
Goulds Pumps; "Pumpsmart Control Solutions" Advertisement from Industrial Equipment News; Aug. 2002; New York, NY USA.
Goulds Pumps; "Model BFSS List Price Sheet;" Feb. 5, 2001.
Goulds Pumps; "Balanced Flow System Model BFSS Variable Speed Submersible Pump System" Brochure; pp. 1-4; Jan 2001; USA.
Goulds Pumps; "Balanced Flow System Model BFSS Variable Speed Submersible Pump" Brochure; pp. 1-3; Jan. 2000; USA.
Goulds Pumps; "Balanced Flow System . . . The Future of Constant Pressure Has Arrived;" Undated Advertisement.
Grundfos; "CU301 Installation & Operation Manual;" Apr. 2009; pp. 1-2; Undated; www.grundfos,com.
Grundfos; "CU301 Installation & Operating Instructions;" Sep. 2005; pp. 1-30; Olathe, KS USA.
Grundfos; "Grundfos SmartFlo SQE Constant Pressure System;" Mar. 2003; pp. 1-2; USA.
Grundfos; "JetPaq—The Complete Pumping System;" Undated Brochure; pp. 1-4; Clovis, CA USA.
Grundfos; "SmartFlo SQE Constant Pressure System;" Mar. 2002; pp. 1-4; Olathe, KS USA.
Grundfos; "SQ/SQE—A New Standard in Submersiblé Pumps;" Undated Brochure; pp. 1-14; Denmark.
Grundfos; "Uncomplicated Electronics . . . Advanced Design;" pp. 1-10; Undated.
Grundfos Pumps Corporation; "Grundfos SQ/SQE Data Book;" pp. 1-39; Jun. 1999; Fresno, CA USA.
Grundfos Pumps Corporation; "The New Standard in Submersible Pumps;" Brochure; pp. 1-8; Jun. 1999; Fresno, CA USA.
Hayward; "Hayward Pro-Series High-Rate Sand Filter Owner's Guide;" 2002; pp. 1-4.
ITT Corporation; "Goulds Pumps Balanced Flow;" Jul. 2006; pp. 1-8.
ITT Corporation; "Goulds Pumps Balanced Flow Submersible Pump Controller;" Jul. 2007; pp. 1-12.
ITT Corporation; "Goulds Pumps Balanced Flow Constant Pressure Controller for 3 HP Submersible Pumps;" Jun. 2005; pp. 1-4; USA.
ITT Corporation; "Goulds Pumps Balanced Flow Constant Pressure Controller for 2 HP Submersible Pumps;" Jun. 2005; pp. 1-4 USA.
Pentair; "Pentair IntelliTouch Operating Manual;" May 22, 2003; pp. 1-60.
Pentair; "Pentair RS-485 Pool Controller Adapter" Published Advertisement; Mar. 22, 2002; pp. 1-2.
Pentair Pool Products; "IntelliFlo 4X160 a Breathrough in Energy-Efficiency and Service Life;" pp. 1-4; Nov. 2005; www/pentairpool.com.
Pentair Water Pool and Spa, Inc.; "The Pool Pro's Guide to Breakthrough Efficiency, Convenience & Profitability;" pp, 1-8; Mar. 2006; wwwpentairpool.com.
"Product Focus—New AC Drive Series Targets Water, Wastewater Applications;" WaterWorld Articles; Jul. 2002; pp. 1-2.
Shabnam Mogharabi; "Better, Stronger, Faster;" Pool and Spa News; pp. 1-5; Sep. 3, 2004; www/poolspanews.com.
SJE-Rhombus; "Constant Pressure Controller for Submersible Well Pumps;" Jan. 2009; pp. 1-4; Detroit Lakes, MN USA.
SJE-Rhombus; "SubCon Variable Frequency Drive;" Dec. 2008; pp. 1-2; Detroit Lakes, MN USA.
SJE-Rhombus; "Variable Frequency Drives for Constant Pressure Control;" Aug. 2008; pp. 1-4; Detroit Lakes, MN USA.
USPTO Patent Trial and Appeal Board, Paper 43—Final Written Decision, Case IPR2013-00287, U.S. Pat. No. 7,704,051 B2, Nov. 19, 2014, 28 pages.
Danfoss, VLT 8000 AQUA Operating Instructions, coded MG.80.A2.02 in the footer, 181 pages.
Per Brath—Danfoss Drives A/S, Towards Autonomous Control of HVAC Systems, thesis with translation of Introduction, Sep. 1999, 216 pages.
Karl Johan Åström and Björn Wittenmark—Lund Institute of Technology, Adaptive Control—Second Edition, book, Copyright 1995, 589 pages, Addison-Wesley Publishing Company, United States and Canada.
Bimal K. Bose—The University of Tennessee, Knoxville, Modem Power Electronics and AC Drives, book, Copyright 2002, 728 pages, Prentice-Hall, Inc., Upper Saddle River, New Jersey.
Waterworld, New AC Drive Series Targets Water, Wastewater Applications, magazine, Jul. 2002, 5 pages, vol. 18, Issue 7.
Texas Instruments, TMS320F/C240 DSP Controllers Peripheral Library and Specific Devices, Reference Guide, Nov. 2002, 485 pages, printed in U.S.A.
Microchip Technology Inc., PICmicro® Advanced Analog Microcontrollers for 12-Bit ADC on 8-Bit MCUs, Convert to Microchip, brochure, Dec. 2000, 6 pages, Chandler, Arizona.
W.K. Ho, S.K. Panda, K.W. Lim, F.S. Huang—Department of Electrical Engineering, National University of Singapore, Gain-scheduling control of the Switched Reluctance Motor, Control Engineering Practice 6, copyright 1998, pp. 181-189, Elsevier Science Ltd.
Jan Eric Thorsen—Danfoss, Technical Paper—Dynamic simulation of DH House Stations, presented by 7. Dresdner Fernwärme-Kolloquium Sep. 2002, 10 pages, published in Euro Heat & Power Jun. 2003.
Texas Instruments, TMS320F/C240 DSP Controllers Reference Guide, Peripheral Library and Specific Devices, Jun. 1999, 474 pages.
Rajwardhan Patil, et al., A Multi-Disciplinary Mechatronics Course with Assessment—Integrating Theory and Application through Laboratory Activities, International Journal of Engineering Education, copyright 2012, pp. 1141-1149, vol. 28, No. 5, Tempus Publications, Great Britain.

(56) References Cited

OTHER PUBLICATIONS

James Shirley, et al., A mechatronics and material handling systems laboratory: experiments and case studies, International Journal of Electrical Engineering Education 48/1, pp. 92-103.
Flotec Owners Manual, dated 2004. 44 pages.
Glentronics Home Page, dated 2007. 2 pages.
Goulds Pumps SPBB Battery Back-Up Pump Brochure, dated 2008. 2 pages.
Goulds Pumps SPBB/SPBB2 Battery Backup Sump Pumps, dated 2007.
ITT Red Jacket Water Products Installation, Operation and Parts Manual, dated 2009. 8 pages.
Liberty Pumps PC-Series Brochure, dated 2010. 2 pages.
"Lift Station Level Control" by Joe Evans PhD, www.pumped101.com, dated Sep. 2007. 5 pages.
The Basement Watchdog A/C—D/C Battery Backup Sump Pump System Instruction Manual and Safety Warnings, dated 2010. 20 pages.
The Basement Watchdog Computer Controlled Nc—D/C Sump Pump System Instruction Manual, dated 2010. 17 pages.
Pentair Water Ace Pump Catalog, dated 2007, 44 pages.
ITT Red Jacket Water Products RJBB/RJBB2 Battery Backup Sump Pumps; May 2007, 2 pages.
Allen-Bradley; "1336 Plus II Adjustable Frequency AC Drive with Sensorless Vector User Manual;" Sep. 2005; pp. 1-212.
U.S. Appl. No. 12/869,570 Appeal Decision dated May 24, 2016.

\* cited by examiner

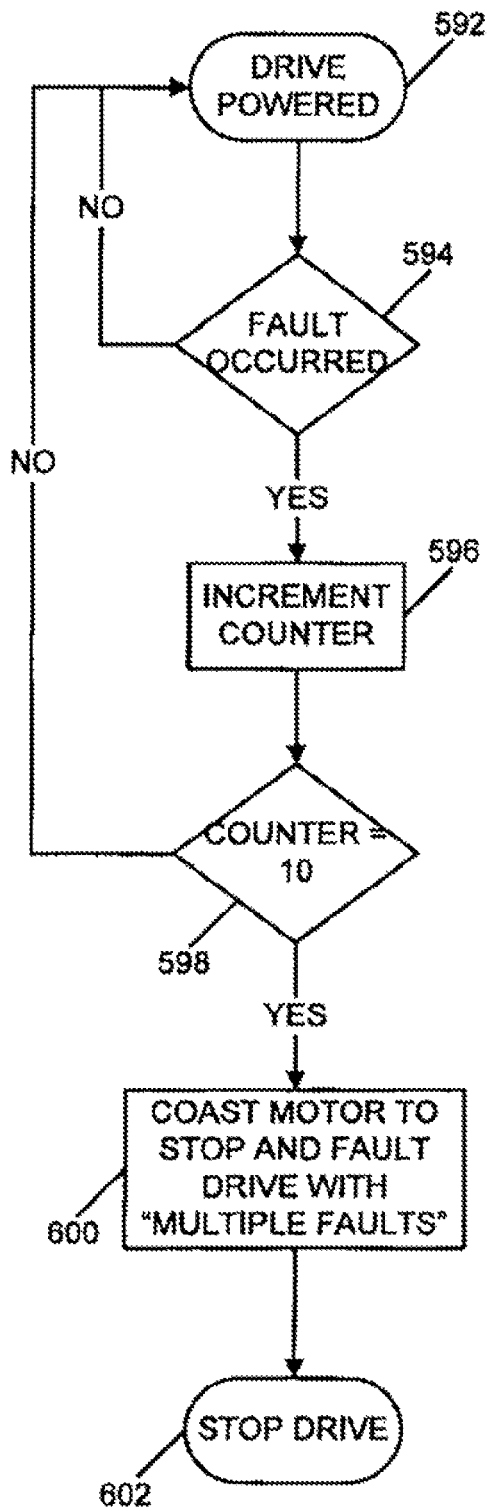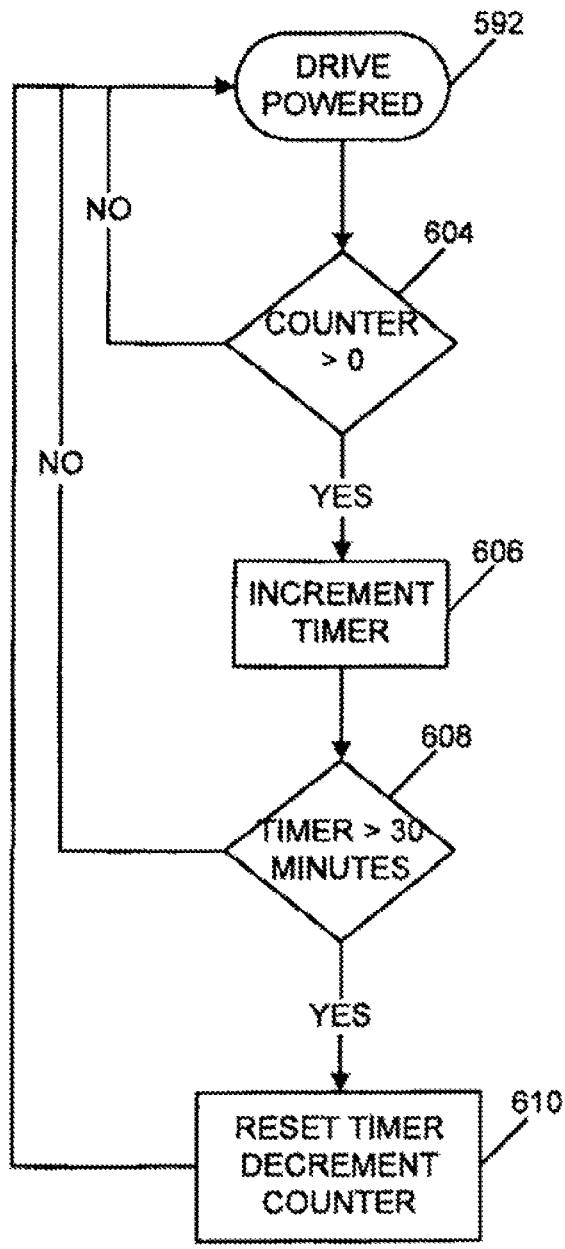
FIGURE 44B
FIGURE 44A

SAFETY SYSTEM AND METHOD FOR PUMP AND MOTOR

RELATED APPLICATIONS

This application is a divisional of co-pending U.S. application Ser. No. 12/481,455 filed on Jun. 9, 2009, the entire contents of which are incorporated herein by reference.

BACKGROUND

Submersible well pumps are connected to above-ground drive systems that control the operation of the pump. Some conventional pump controllers include only start capacitors and relays to turn the pump on and off based on system pressure. These pump controllers have limited capabilities with respect to pump control, safety, and customization. Variable frequency drives (VFDs) have also been used to control submersible well pumps but with limited capabilities regarding user-friendly control and customization. Conventional drives have also generally been designed for use with particular types of motors and often cannot be used to retrofit motors that are already installed in the well, especially two-wire, single-phase motors.

SUMMARY

Some embodiments of the invention can provide a method including sensing a current between the drive, the motor, and a ground and determining whether there has been a loss of current indicating a ground fault. The method can include simultaneously operating an electromagnetic interference filter while sensing the current and removing power from the drive and the motor substantially immediately when there has been a loss of current.

Some embodiments provide a method including connecting the drive to a previously-installed motor in order to retrofit the motor and determining whether the motor is a two-wire, single-phase motor or a three-wire, single-phase motor. The method can also include connecting the drive to the three-wire, single-phase motor and generating with the drive a first waveform and a second waveform. The second waveform can have a phase angle of about 90 degrees offset from the first waveform in order to control the three-wire, single-phase motor.

In some embodiments, a method of installing a drive including a control pad is provided. The method can include entering a service factor current value using the control pad and selecting a two-wire, single-phase motor; a three-wire, single-phase motor; or a three-phase motor. The method can also include entering a current time using the control pad, entering a current date using the control pad, and engaging a pump-out button or an automatic start button on the control pad.

DESCRIPTION OF THE DRAWINGS

FIGS. 44A-44B are flow charts illustrating a multiple faults operation.

DETAILED DESCRIPTION

Figure 1:
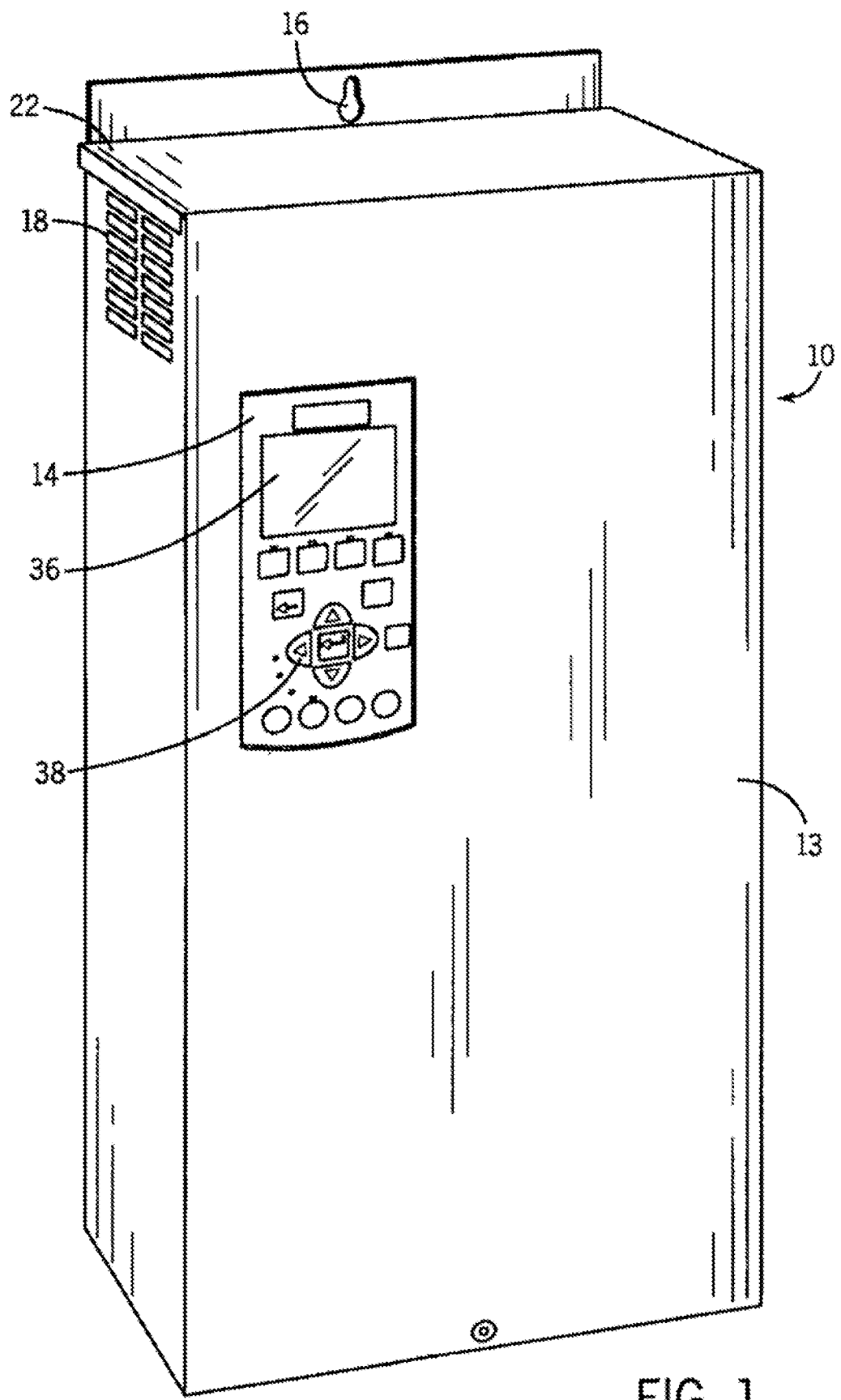
FIG. 1 is a perspective view of a variable frequency drive according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 5:
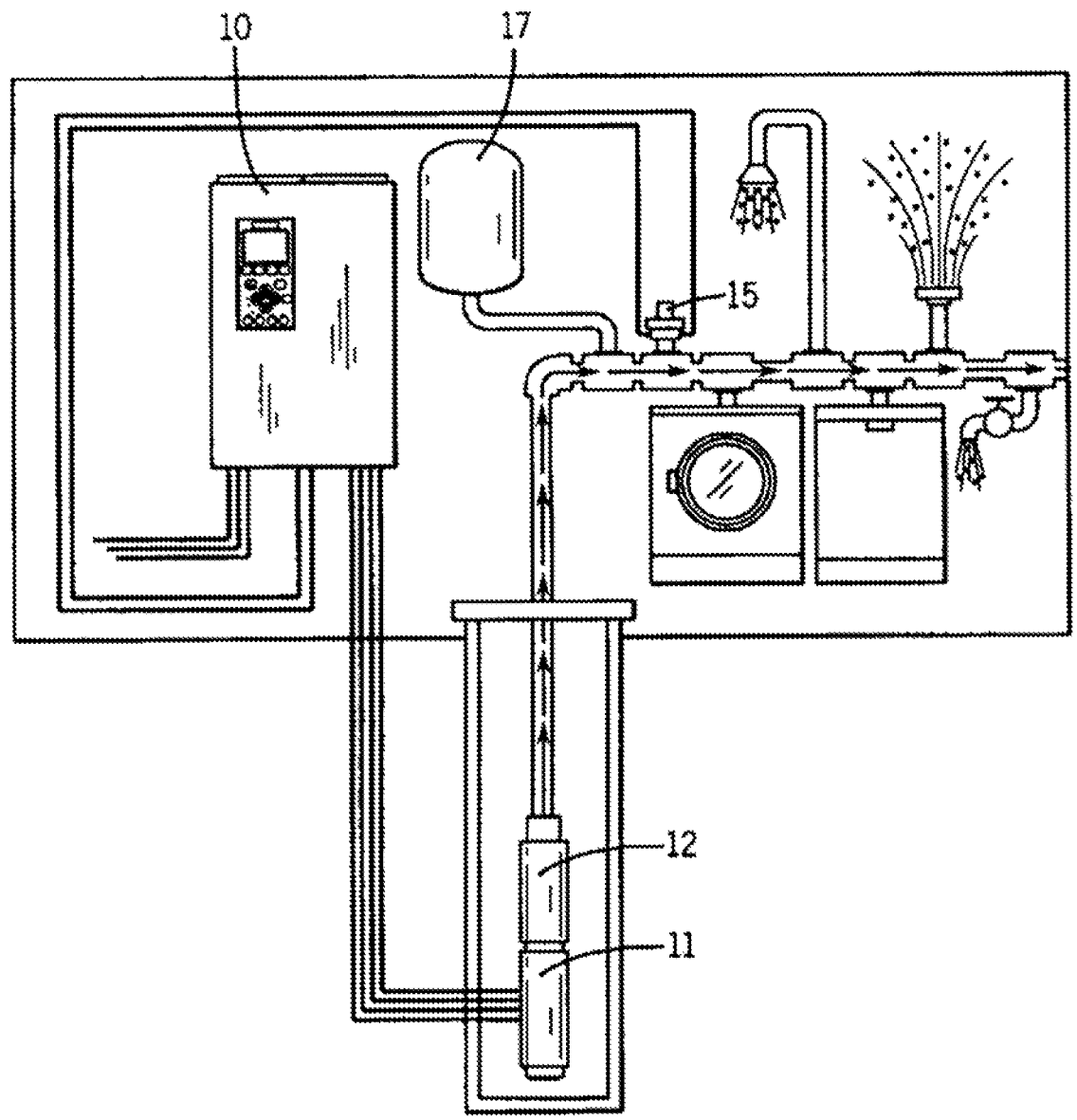
FIG. 5 is a schematic view of the variable frequency drive of FIG. 1 installed in a fluid system.

FIG. 1 illustrates a variable frequency drive (VFD, hereinafter "the drive") 10 according to one embodiment of the invention. In some embodiments, the drive 10 can be used to control the operation of an AC induction motor 11 that drives a water pump 12 (as shown in FIG. 5). The drive 10 can be used in a residential, commercial, or industrial pump system to maintain a substantially constant pressure. The motor 11 and pump 12 can be a submersible type or an above-ground type. The drive 10 can monitor certain operating parameters and control the operation of the motor 11 in response to the sensed conditions.

Figure 2:
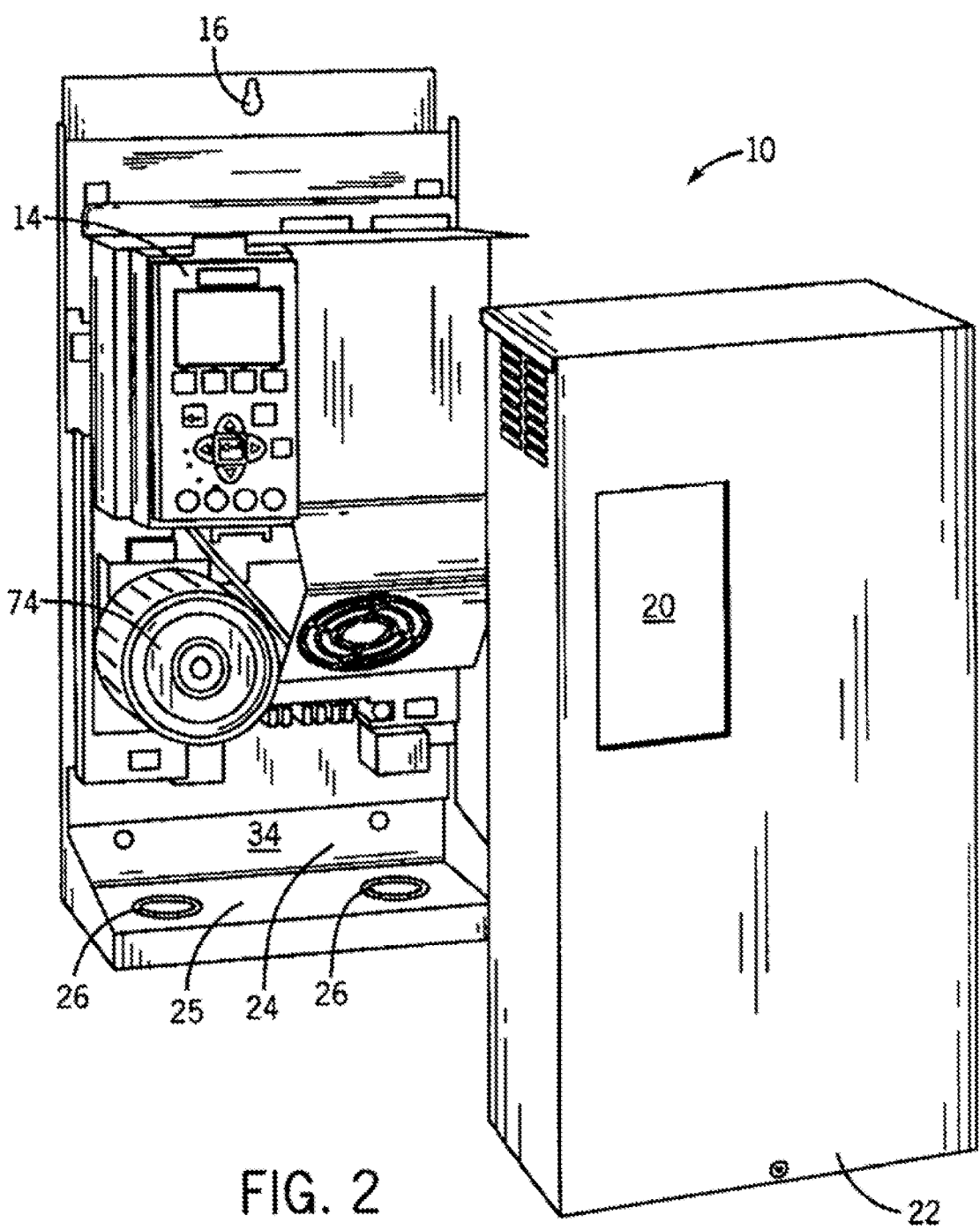
FIG. 2 is a perspective view of the variable frequency drive of FIG. 1 with a cover removed.

As shown in FIGS. 1 and 2, the drive 10 can include an enclosure 13 and a control pad 14. The enclosure 13 can be a NEMA 1 indoor enclosure or a NEMA 3R outdoor enclosure. In one embodiment, the enclosure 13 can have a width of about 9.25 inches, a height of about 17.5 inches, and a depth of about 6.0 inches. The enclosure 13 can include a keyhole mount 16 for fast and easy installation onto a wall, such as a basement wall. The enclosure 13 can include slots 18 through which air that cools the drive 10 can pass out of the enclosure 13. The control pad 14 can be positioned within the enclosure 13 for access through a rectangular aperture 20.

Figure 3:
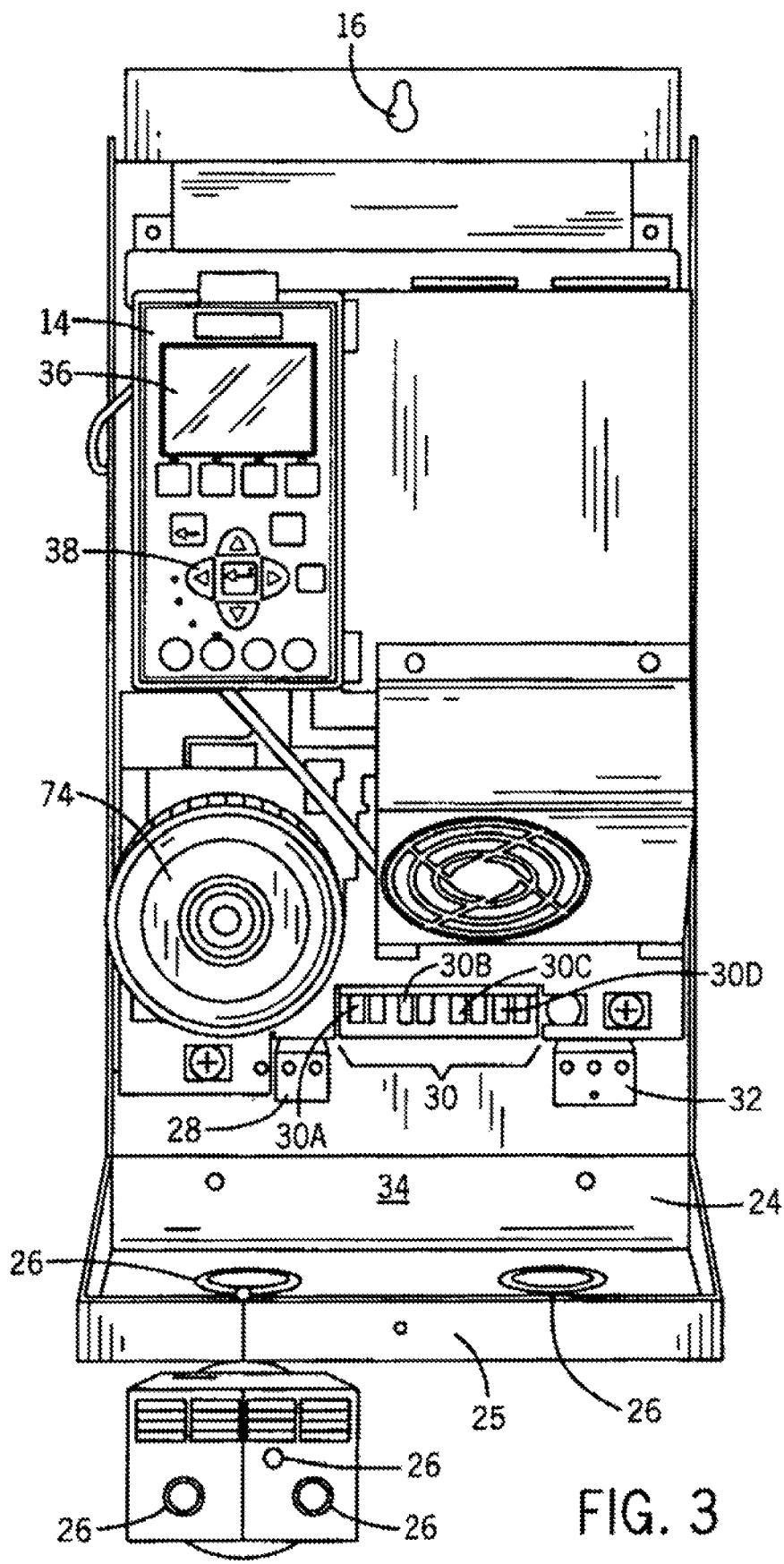
FIG. 3 is an interior view of the variable frequency drive of FIG. 1.

As shown in FIG. 2, the enclosure 13 can include a removable cover 22 with attached side panels. Removing the cover 22 allows access to a wiring area 24, which is located adjacent to a bottom panel 25 of the enclosure 13 with several conduit holes 26. As shown in FIGS. 2 and 3, the wiring area 24 is free of any electrical components or printed circuit board material that may impede any wiring. The wiring area 24 can provide access to an input power terminal block 28, input/output (I/O) spring terminals 30, and an output power terminal block 32. Each one of the conduit holes 26 can be aligned with one of the input power terminal block 28, the I/O spring terminals 30, and the output power terminal block 32. In addition, in some embodiments, the I/O spring terminals 30 can include digital output terminals 30A, digital input terminals 30B, I/O power supply terminals 30C, and analog input terminals 30D.

The wiring area 24 can include a wiring space 34 between the bottom panel 25 and the input power terminal block 28, the I/O spring terminals 30, and the output power terminal block 32. The wiring space 34 can be between about three inches and about six inches in height in order to allow enough room for an installer to access the input power terminal block 28, the I/O spring terminals 30, and the output power terminal block 32.

The input power terminal block 28, I/O spring terminals 30, and the output power terminal block 32 can be used to control the motor 11 and to provide output information in any number of configurations and applications. Various types of inputs can be provided to the drive 10 to be processed and used to control the motor 11. The analog input terminals 30D can receive analog inputs and the digital input terminals 30B can receive digital inputs. For example, any suitable type of run/enable switch can be provided as an input to the drive 10 (e.g., via the digital input terminals 30B). The run/enable switch can be part of a lawn irrigation system, a spa pump controller, a pool pump controller, a float switch, or a clock/timer. In some embodiments, the digital input terminals 30B can accept a variety of input voltages, such as voltages ranging from about 12 volts to about 240 volts, direct current (DC) or alternating current (AC).

Figure 6:
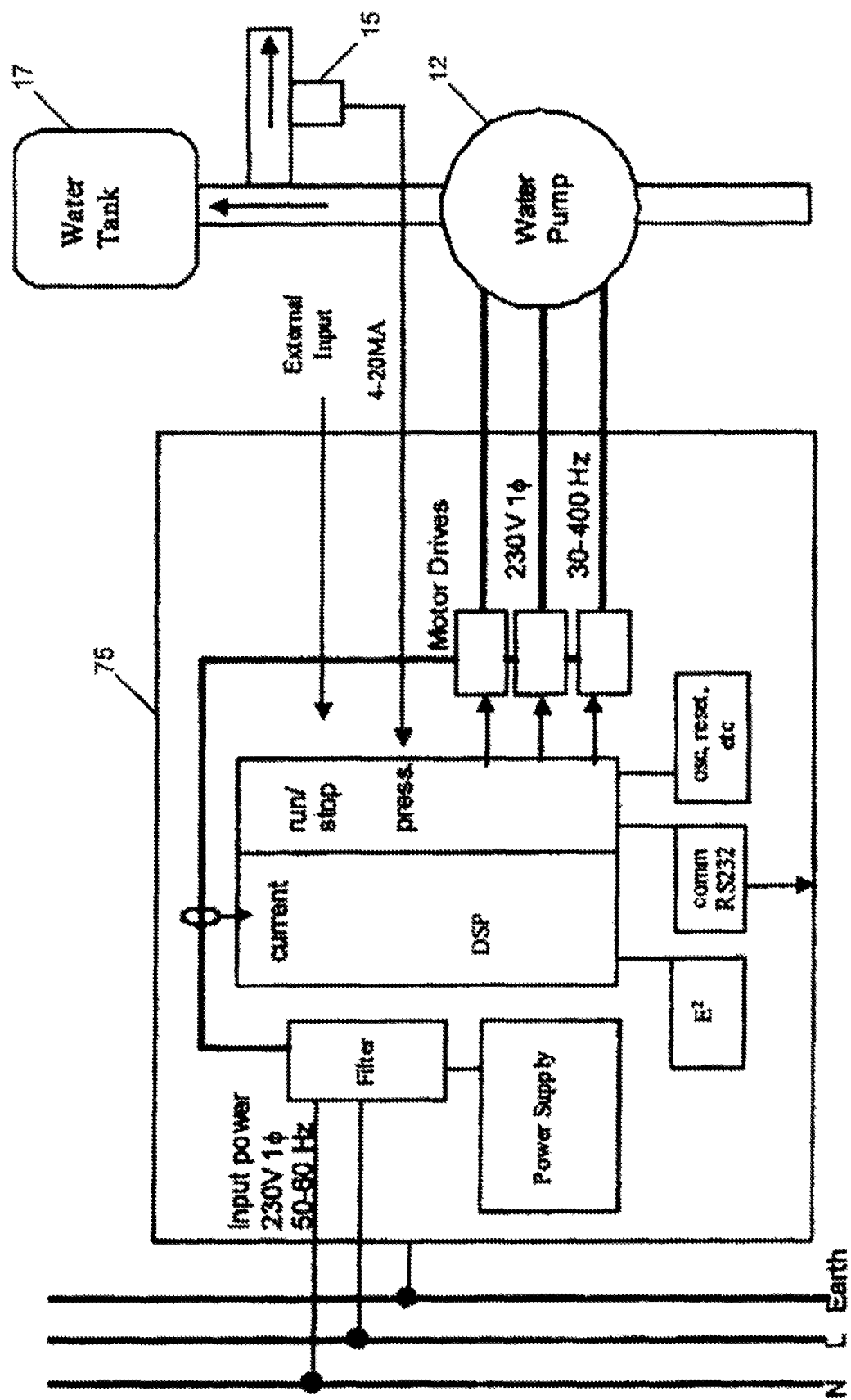
FIG. 6 is a schematic illustration of the variable frequency drive of FIG. 1.

The digital output terminals 30A can connect to digital outputs, such as relay outputs. Any suitable type of indicator device, status output, or fault alarm output can serve as a digital, or relay, output (e.g., be connected to the digital output terminals 30A). A status output can be used to control a second pump, for example, to run the second pump when the pump 12 is running. A fault alarm output can, for example, place a call using a pre-defined phone number, signal a residential alarm system, and/or shut down the pump 12 when a fault is determined. For example, when there is a pipe break fault (as described below with reference to FIG. 33), the digital output terminals 30A can energize a relay output, causing the pre-defined phone number to be automatically dialed. The input power terminal block 28, the I/O spring terminals 30, and the output power terminal block 32 can all be coupled to a drive circuit board (not shown), for connection to a controller 75 (as shown in FIG. 6) of the drive 10. Further, the input power terminal block 28 and/or the output power terminal block 32 can be removable and replaceable without replacing the drive circuit board or the entire drive 10.

Figure 4:
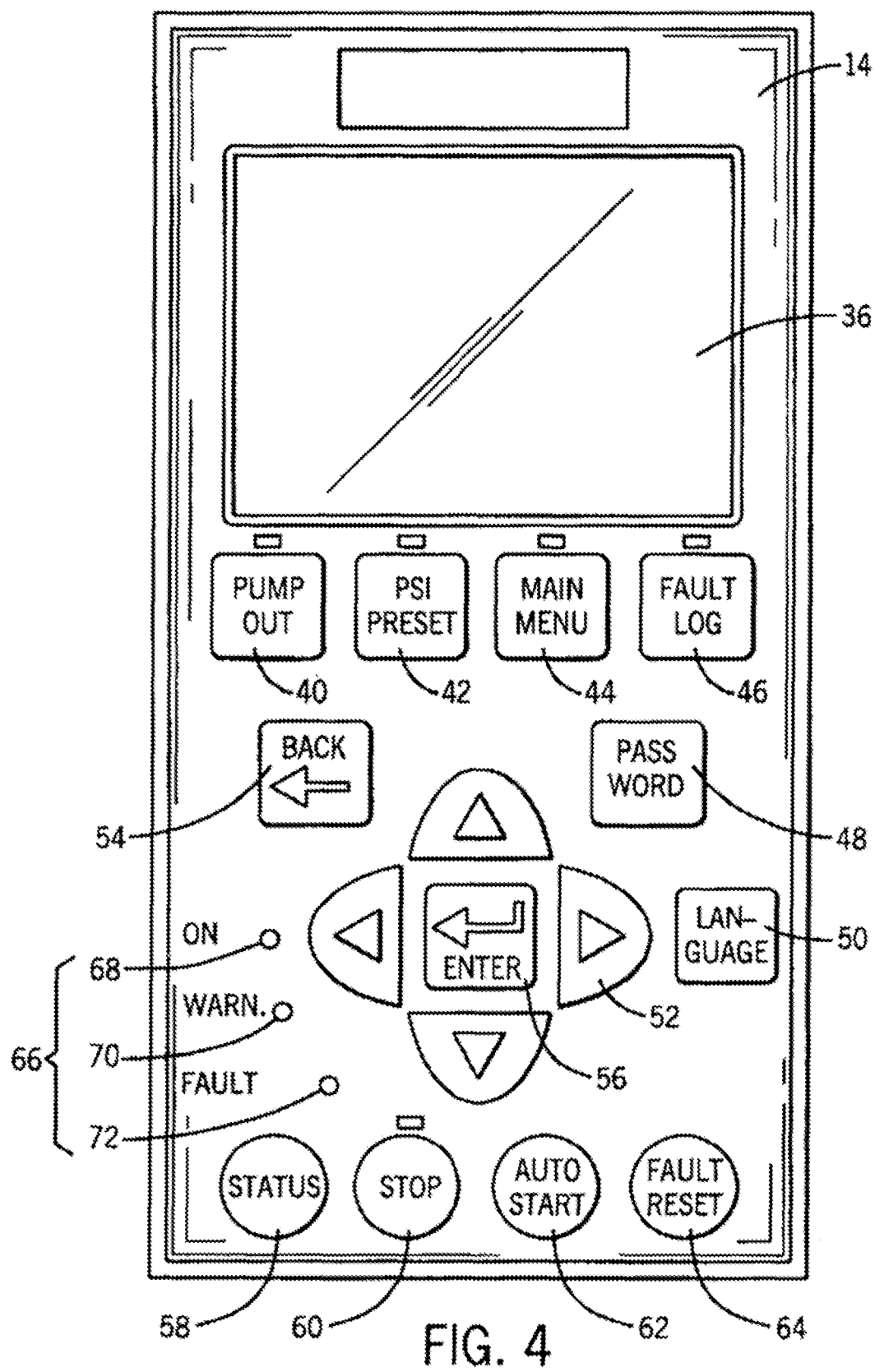
FIG. 4 is a front view of a control pad of the variable frequency drive of FIG. 1.

As shown in FIGS. 1-4, a control pad 14 of the drive 10 can include a backlit liquid crystal display 36 and several control buttons 38. As shown in FIG. 4, the control buttons 38 can include a pump-out button 40, a pressure preset button 42, a main menu button 44, and a fault log button 46. The control buttons 38 can also include a keypad lockout button 48 and a language button 50. The control pad 14 can include several directional buttons 52, a back button 54, and an enter button 56. The control pad 14 can further include a status button 58, a stop button 60, an automatic start button 62, and a fault reset button 64. Finally, the control pad 14 can include light emitting diode (LED) indicators 66, to indicate a status of the drive 10, such as an ON LED 68, a Warning LED 70, and a Fault LED 72.

As shown in FIGS. 2 and 3, the drive 10 can include an electromagnetic interference (EMI) filter 74. The EMI filter 74 can reduce electrical noise generated by the motor 11, especially noise that interferes with AM radio stations. The drive 10 can reduce electrical noise while simultaneously being compatible with a Ground Fault Circuit Interrupter (GFCI). An unintentional electric path between a source of current and a grounded surface is generally referred to as a "ground fault." Ground faults occur when current is leaking somewhere, and in effect, electricity is escaping to the ground.

The drive 10 can be compatible with a number of different types of motors 11, including, but not limited to, AC induction motors that are two-wire permanent split capacitor (PSC) single-phase motors; three-wire single-phase motors; or three-phase motors. The drive 10 can be connected to a previously-installed motor 11 in order to retrofit the controls for the motor 11. If the motor is a single-phase motor, the installer can use the control pad 14 to select either two-wire or three-wire. For a three-wire motor 11, the drive 10 can automatically generate a first waveform and a second waveform with the second waveform having a phase angle of about 90 degrees offset from the first waveform. In addition, the controller 75 (as shown in FIG. 6) can automatically set a minimum and maximum frequency allowance for the motor 11 depending on the selection.

The drive 10 can be programmed to operate after a simple start-up process by a user using the control pad 14. The start-up process can be a five-step process for a single-phase motor 11 and a four-step process for a three-phase motor 11. The start-up process for a single-phase motor 11 can include (1) entering a service factor current value, (2) selecting either a two-wire motor or a three-wire motor, (3) entering a current time, (4) entering a current date, and (5) engaging the pump-out button 40 or the automatic start button 62. The start-up process for a three-phase motor 11 can include (1) entering a service factor current value, (2) entering a current time, (3) entering a current date, and (4) engaging the pump-out button 40 or the automatic start button 62.

The pump-out button 40 can be used to enter the drive 10 in a pump out mode to clean out sand and dirt from a newly-dug well. The pump-out button 40 can be engaged once the pump 12 is installed in the new well and once the drive 10 is connected to the motor 11. The pump-out mode can provide an open discharge of sand and dirt from the well, for example, onto a lawn. In one embodiment, the drive 10 can operate the pump 12 in the pump out mode at about 45 Hertz (Hz). The pump out mode operation is further described below with respect to FIG. 7, and a pump-out button control operation is further described below with respect to FIG. 48.

The controller 75 can include software executed by a digital signal processor (DSP, as shown in FIG. 6) or a microprocessor and can perform real-time control including soft-start, speed regulation, and motor protection. The drive 10 can be controlled to maintain substantially constant water pressure in a water system that may or may not utilize a tank. To achieve this, the controller 75 can implement a classical Proportional/Integral/Derivative (PID) method using pressure error as an input. Pressure error can be calculated by subtracting an actual water pressure from the desired water pressure (i.e., a pressure set point). An updated speed control command can then be generated by multiplying the pressure error by a proportional gain, multiplying the integral of the pressure error by an integral gain, multiplying the derivative of the pressure error by a derivative gain, and summing the results. Thus, the controller 75 can increase or decrease the speed of the motor 11 to maintain a constant pressure set point. The PID mode is further described below with respect to FIG. 11.

The controller 75 can determine the actual water pressure value from an electronic pressure transducer 15 (e.g., in communication with the controller 75 via the analog input terminals 30D). In some embodiments, as shown in FIG. 5, the pressure transducer 15 can be located near a pressure tank 17 fluidly coupled to the pump 12.

If motor 11 is off (i.e., not being driven), water pressure can still be monitored, but no actions are taken until the pressure falls below a certain value (e.g., a low band pressure value). If the water pressure falls below the low band pressure, the controller 75 can restart the motor 11. In some embodiments, the low band pressure can be set, or defaulted, to 1-10 pounds per square inch (PSI) lower than the pressure set point. Once the motor 11 is restarted, normal operation with PID control (i.e., PID mode) can commence. In one embodiment, one of two conditions can trigger the controller 75 to turn the motor 11 off. A first condition can be if a sleep mode (described with respect to FIG. 12) is triggered. A second condition can be if the pressure exceeds a certain safety value (i.e., about 20 PSI above the pressure set point). Other conditions that can stop the drive 10 are various faults (described further below), the user pressing the stop button 60, and lack of a digital input for an optional run enable mode.

For normal operation, with the motor 11 being driven, the controller 75 can regulate pump speed in a continuous fashion using PID control as long as the pressure remains below the safety pressure value, such as about 20 PSI above the pressure set point. The drive 10 can stop the motor 11 whenever the actual pressure exceeds the safety pressure value. During normal operation, as long as water usage does not exceed the motor/pump capabilities, the pressure can remain constant at approximately the pressure set point. Large instantaneous changes in flow requirements can result in variations from the desired pressure band. For example, if flow is stopped, causing the pressure to quickly increase, the motor 11 can be stopped (i.e., set to 0 Hz). This can be considered an alternate sleep mode operation and is further described below with respect to FIG. 13.

Figure 7:
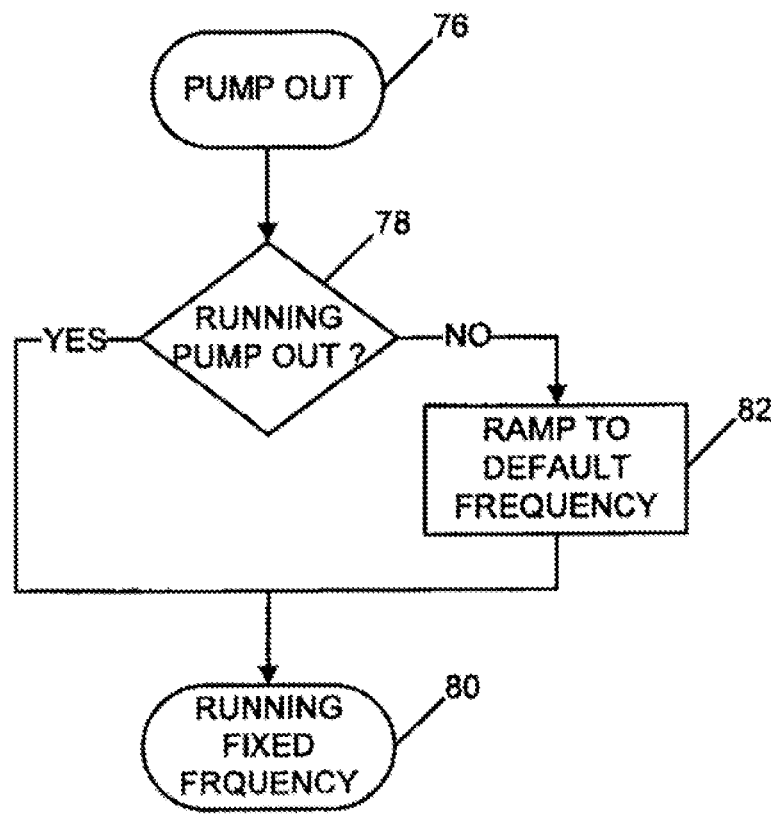
FIG. 7 is a flow chart illustrating a pump out operation.

FIGS. 7-15 are flow charts describing pump control according to some embodiments of the invention. The flow chart of FIG. 7 illustrates when the controller 75 receives a signal to run the pump in the pump out mode 76 (e.g., when the pump-out button 40 is pressed). The controller 75 first determines, at step 78, if the pump is already running in pump out mode. If so, the pump is being run at a correct, fixed frequency for pump out mode (step 80). If not, the controller 75, at step 82, ramps up the input frequency of power to the motor 11 to the correct frequency, then proceeds to step 80.

Figure 8:
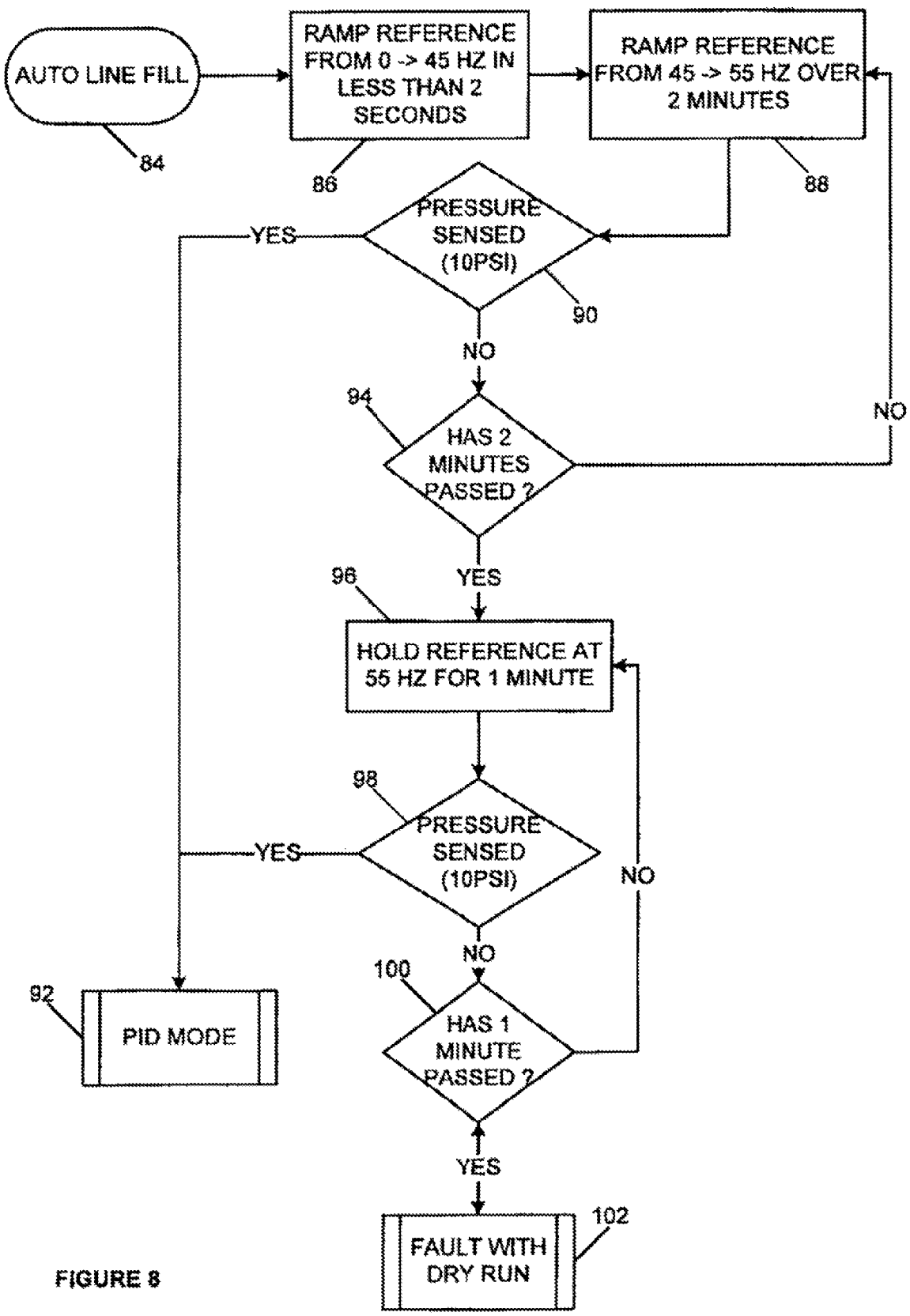
FIG. 8 is a flow chart illustrating an automatic line fill operation.

FIG. 8 illustrates an automatic line fill operation 84, according to some embodiments. This operation can automatically run at drive start-up (e.g., when the drive 10 is powered up, after a power interruption, when the motor 11 is restarted, or when the automatic start button 62 is pressed). Thus, the motor may be off (i.e., at 0 Hz) at the beginning of this operation. The controller 75 first can ramp up the frequency driving the motor from 0 Hz to about 45 Hz in less than a first time period, such as about two seconds (step 86). In a second time period, such as about two minutes, or about five minutes in some embodiments, the controller 75 can start to ramp up the frequency from, for example, about 45 Hz to about 55 Hz (step 88). During the second time period, the controller 75 determines the pressure via input from the pressure transducer 15 (step 90). If the sensed pressure has reached a minimum pressure, or pressure set point (e.g., about 10 PSI), indicating the line has been filled, the fill operation is completed and the controller 75 enters PID mode (step 92). However, if the sensed pressure is less than 10 PSI at step 90, the controller 75 determines if the second time period (e.g., about two minutes or about five minutes) has passed (step 94). If the second period has not passed, the controller 75 reverts back to step 88 and continues to ramp the motor frequency. If the second time period has passed, the controller 75 will hold the frequency at about 55 Hz for about one minute (step 96). The controller 75 then determines if the sensed pressure is about 10 PSI (step 98). If the sensed pressure is about 10 PSI, indicating the line has been filled, the fill operation is completed and the controller 75 enters PID mode (step 92). However, if the sensed pressure is still less than 10 PSI at step 90, the controller 75 determines if one minute has passed (step 100). If one minute has not passed, the controller 75 reverts back to step 96. If one minute has passed, a dry run fault is recognized and a dry run fault operation is executed (step 102) (e.g., the system is stopped).

In one alternative embodiment, step 88 can include setting the frequency to about 45 Hz for the second time period, and if the sensed pressure is less than 10 PSI after the second time period, repeating step 88 with the frequency set to about 50 Hz for another second time period. If the sensed pressure is still less than 10 PSI after the second time period while at 50 Hz, step 88 can be repeated with the frequency set to about 55 Hz for yet another second time period. If the sensed pressure is still less than 10 PSI after the second time period while at 55 Hz, the controller 75 can continue to step 96.

Figure 9:
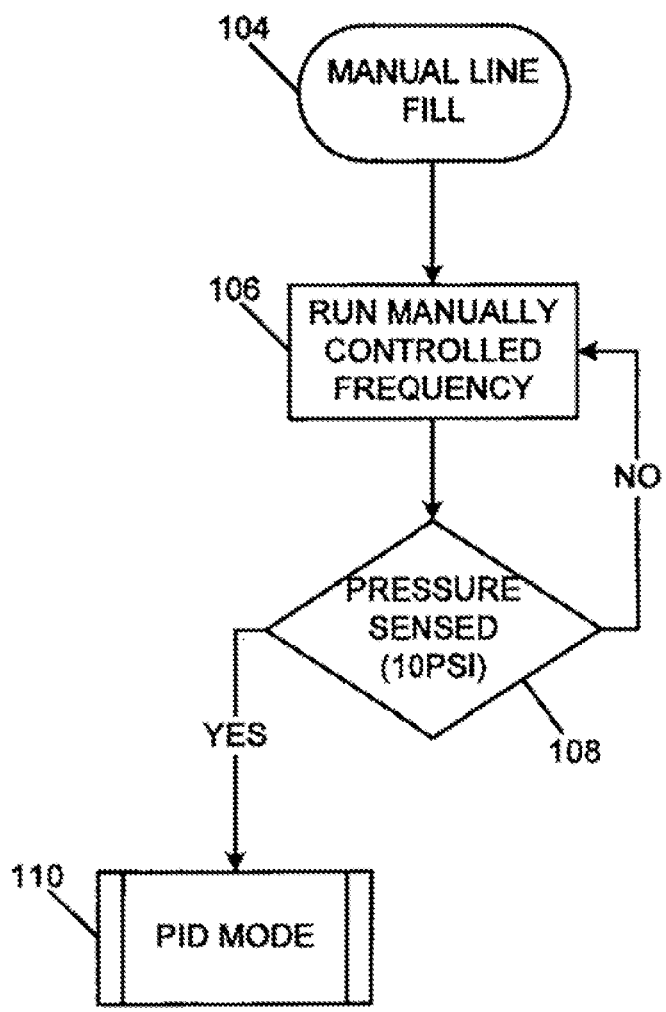
FIG. 9 is a flow chart illustrating a manual line fill operation.

FIG. 9 illustrates a manual line fill operation 104, according to some embodiments. The motor 11 is run at a manually-controlled frequency (e.g., entered by a user) at step 106. The motor 11 keeps running at this frequency until the sensed pressure reaches about 10 PSI (step 108). Once the sensed pressure has reached about 10 PSI, the controller 75 enters PID mode (step 110). In some embodiments, if the controller 75 does not enter PID mode within a time period (e.g., fifteen minutes), the drive 10 is stopped.

The manual fill line operation can be considered always enabled because it can be executed at any time during the auto line fill operation. For example, by using the up and down directional buttons 52 on the control pad 14, the user can interrupt the automatic line fill operation and adjust the frequency output to the motor 11, thus changing the motor speed. Once in manual line fill mode, the user can continue to change the speed as needed at any time. The motor 10 can continue at the new set frequency until the sensed pressure reaches about 10 PSI, and then it will proceed to PID mode, as described above. The manual fill line operation can be beneficial for both vertical or horizontal pipe fill applications. In addition, both the automatic fill line operation and the manual fill line operation can prevent common motor issues seen in conventional systems, such as motor overloading and the occurrence of water hammering.

Figure 10:
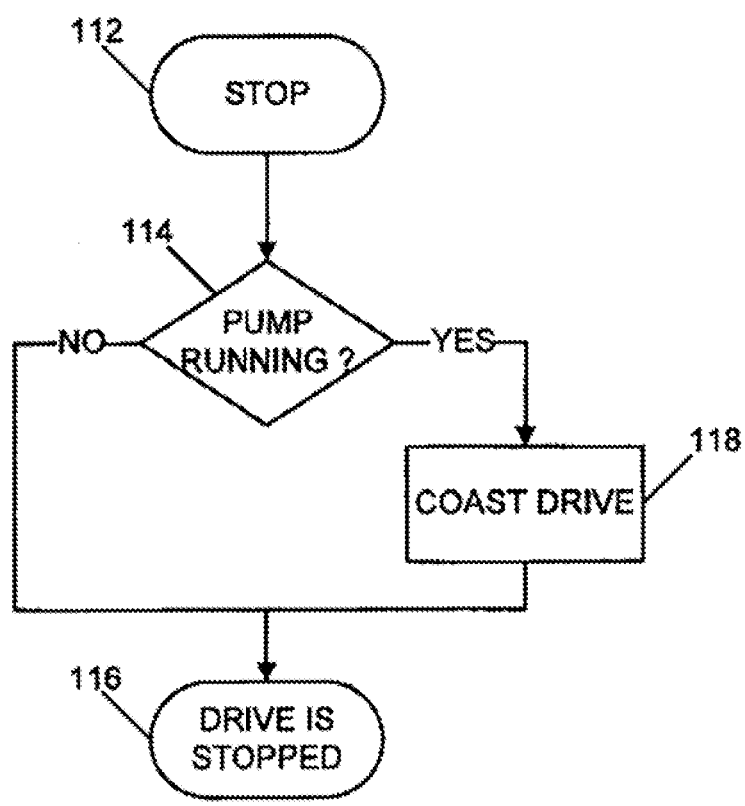
FIG. 10 is a flow chart illustrating a stop operation.

FIG. 10 illustrates a stop operation 112, according to some embodiments. The controller 75 determines if the pump is running (step 114). If the pump is not running (e.g., if the drive 10 is in sleep mode or a run enable command is not triggered), the drive 10 is stopped (step 116). If the pump is running, the motor is allowed to coast to a stop (i.e., 0 Hz) at step 118, then proceeds to step 116.

Figure 11:
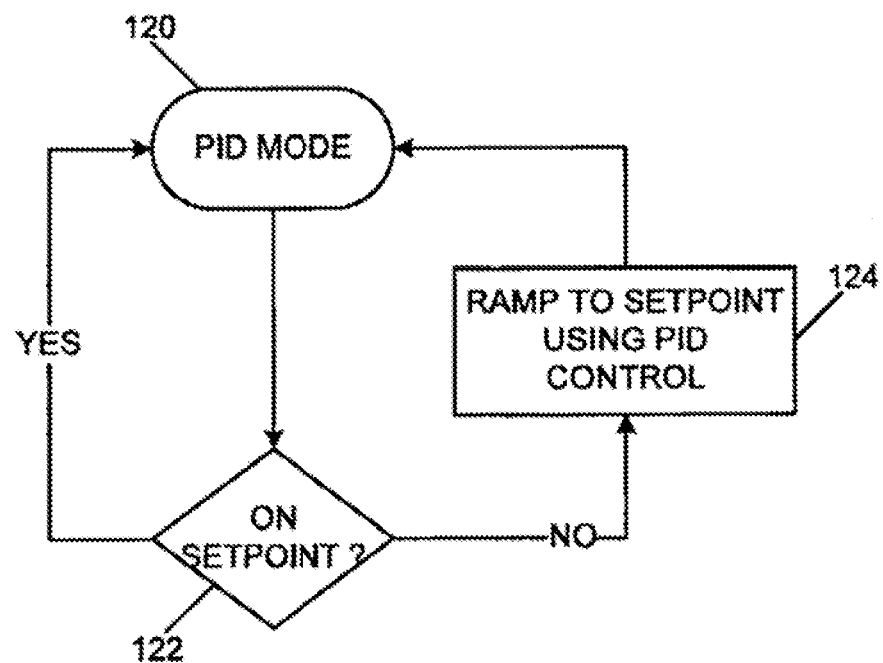
FIG. 11 is a flow chart illustrating a proportional/integral/derivative (PID) mode control operation.

FIG. 11 illustrates a PID mode operation 120, according to some embodiments. The controller 75 continuously determines if the pressure is at a programmed set point (step 122). If the pressure is not at the programmed set point, PID feedback control is used to ramp the frequency until the pressure reaches the set point (step 124).

Figure 12:
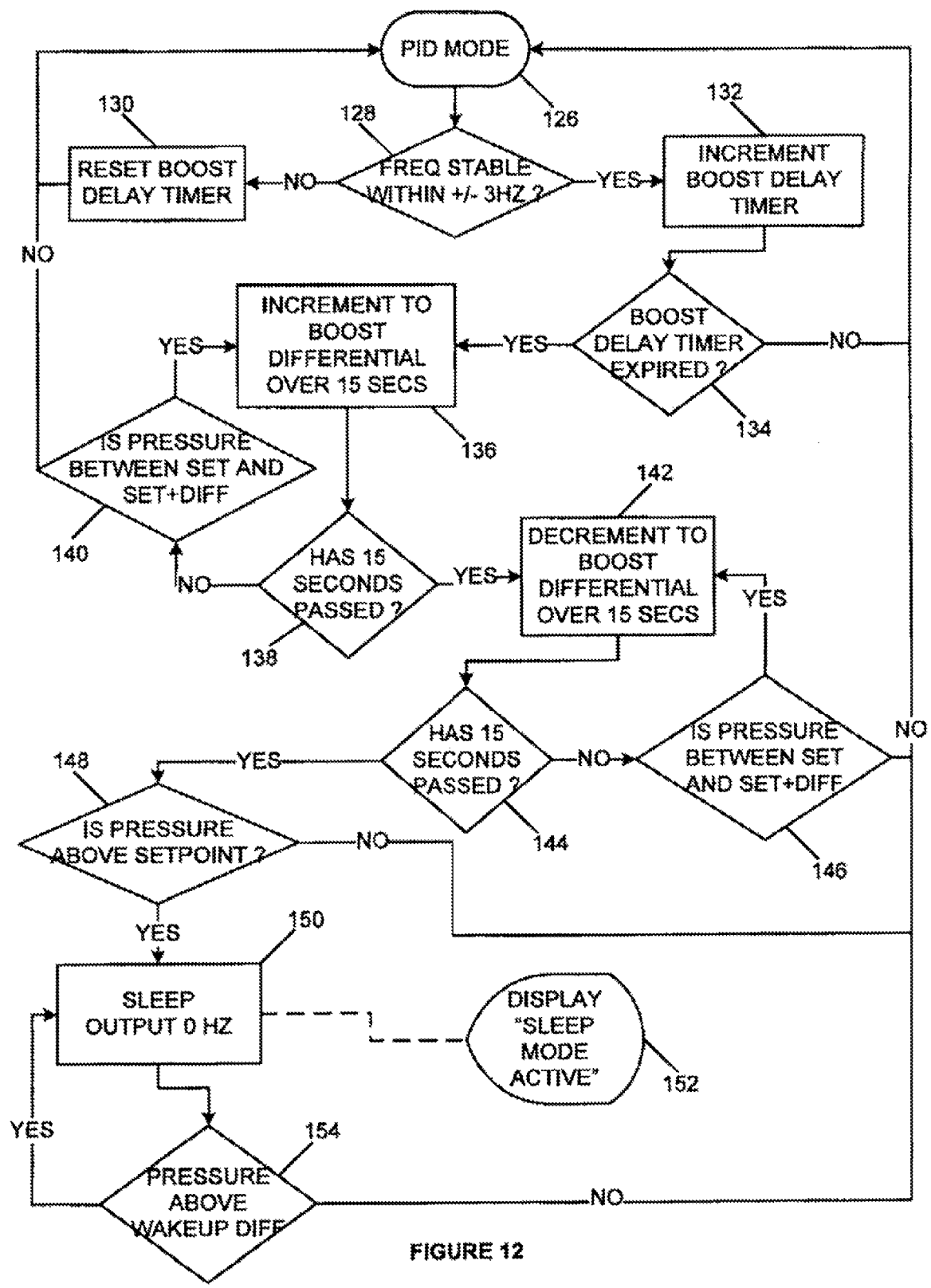
FIG. 12 is a flow chart illustrating a sleep mode operation.

FIG. 12 illustrates the controller 75, running in PID mode (at step 126), checking if the pump should enter a sleep mode. First, at step 128, the controller 75 determines if the frequency of the motor 11 is stable within about +/−3 Hz (e.g., at a steady-state frequency). If not (step 130), a boost delay timer is reset and the controller 75 reverts to step 126. If the frequency of the motor 11 is stable, the boost delay timer is incremented at step 132. If, at step 134 the boost delay timer is not expired after being incremented, the controller 75 reverts back to step 126. However, if, at step 134 the boost delay timer has expired, the controller 75 proceeds to step 136 and the pressure is boosted (e.g., about 3 PSI above the pressure set point) for a short period of time (e.g., about 15 seconds or about 30 seconds).

Until the short period of time has passed (step 138), the controller 75 determines if the pressure stays between the pressure set point (e.g., about 10 PSI) and the boosted pressure (step 140). If, in that short period of time, the pressure falls outside (i.e., below) the range between the pressure set point and the boosted pressure, the controller 75 reverts back to step 126. If, however, the pressure stays between the pressure set point and the boosted pressure, the controller 75 then decrements the pressure over another short period of time (step 142). Until the short period of time has passed (step 144), the controller 75 determines if the pressure stays between the pressure set point (e.g., the steady-state pressure) and the boosted pressure (step 146). If, in that short period of time, the pressure falls outside the range between the pressure set point and the boosted pressure, indicating that there is flow occurring, the controller 75 reverts back to step 126. If, however, the pressure stays between the pressure set point and the boosted pressure, indicating no flow, the controller 75 then determines if the pressure is above the pressure set point (step 148). If not, the controller 75 reverts back to step 126. If the pressure is above the pressure set point, the pump enters the sleep mode causing the motor frequency to coast down to 0 Hz (step 150) and a "sleep mode active" message to be displayed on the liquid crystal display 36 (step 152). While in sleep mode, at step 154, the controller 75 continuously determines if the pressure stays above a wakeup differential pressure (e.g., about 5 PSI below the pressure set point). If the pressure drops below the wakeup differential pressure, the controller 75 reverts back to step 126.

In some embodiments, the controller 75 will only proceed from step 126 to step 128 if the pressure has been stable for at least a minimum time period (e.g., one or two minutes). Also, when the controller 75 cycles from step 128 to step 130 and back to step 126, the controller 75 can wait a time period (e.g., one or two minutes) before again proceeding to step 128. In some embodiments, the controller 75 can determine if the motor speed is stable at step 128. In addition, the controller 75 can perform some steps of FIGS. 11 and 12 simultaneously.

By using the sleep mode operation, a separate device does not need to be purchased for the drive 10 (e.g., a flow meter). Further, the sleep mode operation can self-adjust for changes in pump performance or changes in the pumping system. For example, well pump systems often have changes in the depth of the water in the well both due to drawdown as well as due to time of year or drought conditions. The sleep mode operation can be executed independent of such changes. In addition, the sleep mode operation does not require speed conditions specific to the pump being used.

Figure 13:
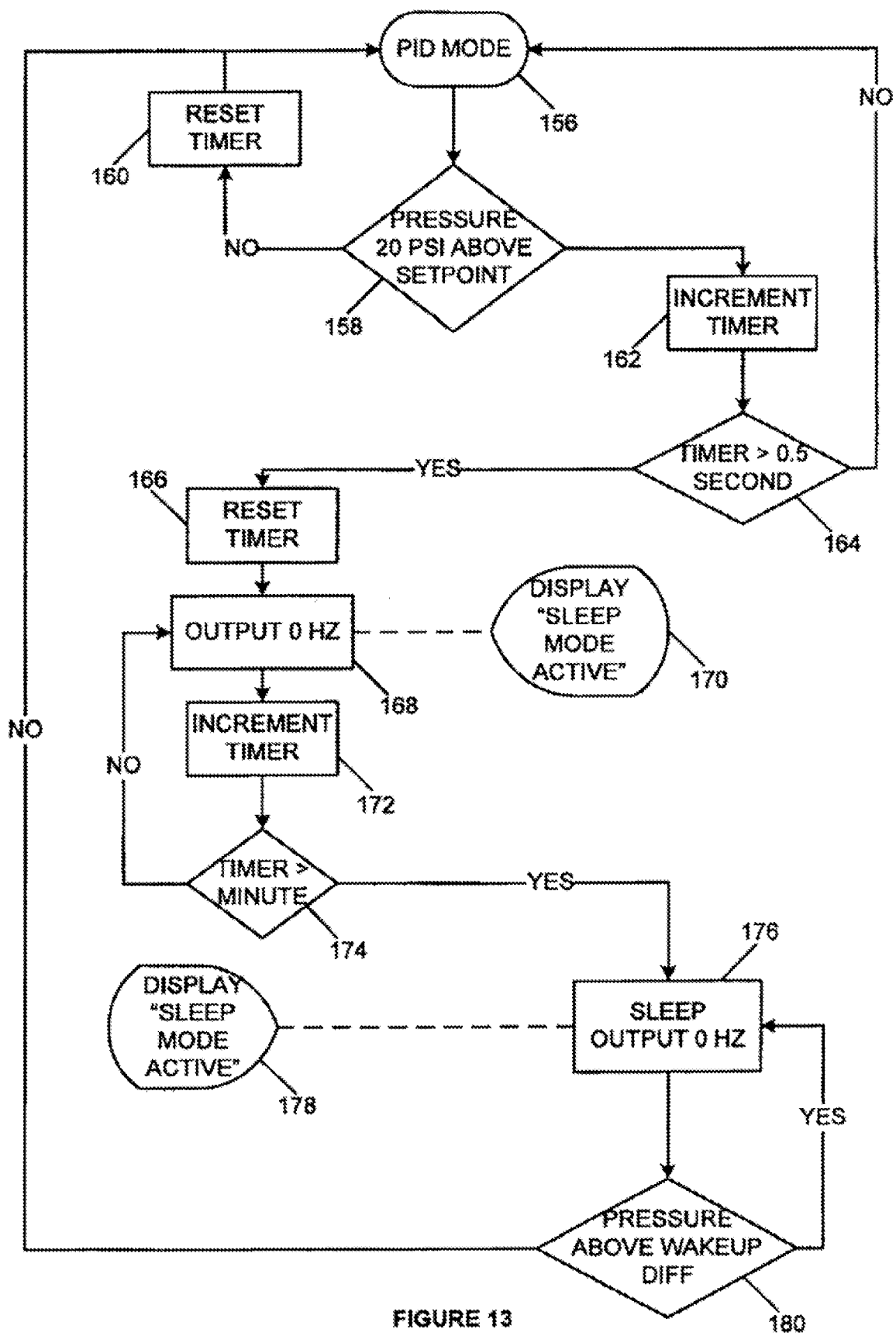
FIG. 13 is a flow chart illustrating an alternate sleep mode operation.

FIG. 13 illustrates the controller 75, running in PID mode, checking if the pump should enter an alternate sleep mode 156. First, at step 158, the controller 75 determines if pressure is at a preset value above the pressure set point (e.g., 20 PSI above the pressure set point). If not (step 160), a timer is reset and the controller 75 reverts to step 156. If the pressure is 20 PSI above the pressure set point, the timer is incremented at step 162. If, at step 164 the timer is less than a value, such as 0.5 seconds, the controller 75 reverts back to step 156. However, if, at step 164 the timer has exceeded 0.5 seconds, the controller 75 proceeds to step 166 and the timer is reset. The controller 75 then sets the motor frequency to 0 Hz (step 168) and displays a "sleep mode active" message 170 on the liquid crystal display 36. The controller 75 then again increments the timer (step 172) until the time reaches another value, such as 1 minute (step 174), and then proceeds to step 176. At step 176, the controller 75 keeps the motor frequency at 0 Hz and displays a "sleep mode active" message 178 on the liquid crystal display 36 as long as the pressure is above a wakeup differential pressure (step 180). If the pressure drops below the wakeup differential pressure (e.g., water is being used), the controller 75 reverts back to step 156.

Figure 14:
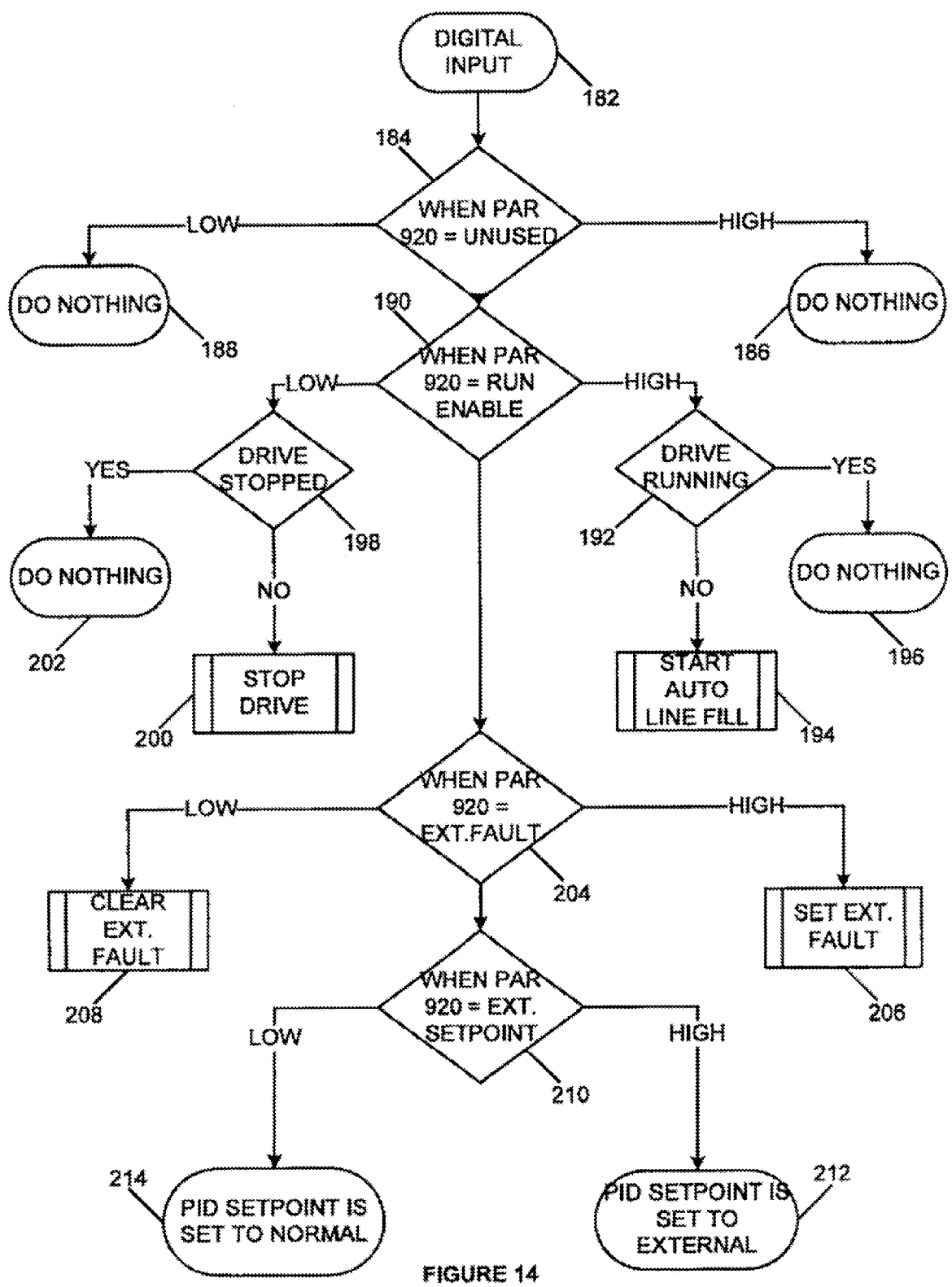
FIG. 14 is a flow chart illustrating a digital input control operation.

FIG. 14 illustrates an example of controller operation using the digital input. The controller 75 first recognizes a digital input (step 182). If an external input parameter is unused (step 184), the controller 75 takes no action whether the input is high or low (steps 186 and 188, respectively). If the external input parameter is set to a run enabled mode (step 190) and the input is high (e.g. indicating allowing the drive 10 to be run), the controller 75 determines if the drive 10 is running (step 192). If the drive 10 is running, the controller 75 can take no action (step 196) and continue in its current mode of operation. If the drive 10 is not running, the controller 75 can start an auto line fill operation (step 194), as described with reference to FIG. 8 (e.g., similar to actions taken if the auto start button 62 is pressed). If the external input parameter is set to a run enabled mode (step 190) and the input is low (e.g., indicating to stop the drive 10), the controller 75 can check if the drive 10 is stopped (step 198). If the drive 10 is not stopped, the controller 75 can execute a stop operation (step 200), as described with reference to FIG. 10. If the drive 10 is stopped, the controller 75 can take no action (step 202). If the external input parameter is set to an external fault mode (step 204) and the input is high (e.g., indicating an external fault), the controller 75 can perform an external fault operation (step 206), as described with reference to FIG. 47. If the external input parameter is set to an external fault mode (step 204) and the input is low (e.g., indicating there is no external fault), the controller 75 can clear any external fault indications (step 208). If the external input parameter is set to an external set point mode (step 210) and the input is high, the controller 75 sets the PID set point to "external" (step 212), for example, so that the digital input controls the pressure set point for PID pressure control. If the external input parameter is set to an external set point mode (step 210) and the input is low, the controller 75 sets the PID set point to "normal" (step 214), for example, so that the digital input has no control over the pressure set point for PID pressure control.

Figure 15:
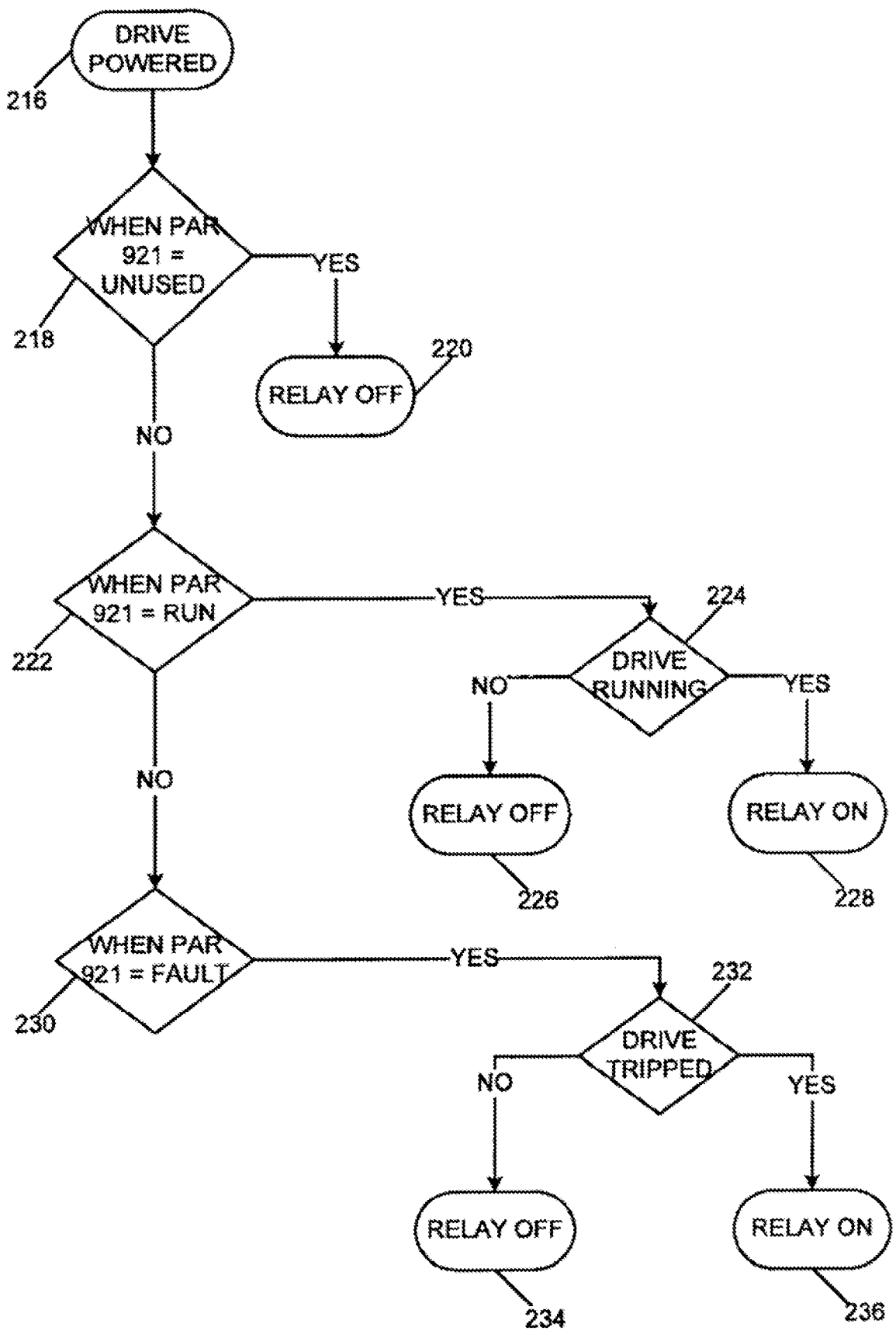
FIG. 15 is a flow chart illustrating a relay output control operation.

FIG. 15 illustrates controller operation of a relay output. When the drive 10 is powered (step 216), the controller 75 determines if a relay output parameter is unused (step 218). If so, the controller 75 turns the relay off (step 220). If not, the controller 75 determines if the relay output parameter is set to a run mode (step 222). If the relay output parameter is set to a run mode (at step 222), the controller 75 determines if the drive 10 is running (step 224). The controller 75 will then turn the relay off if the drive 10 is not running (step 226) or turn the relay on if the drive 10 is running (step 228). If the relay output parameter is not set to a run mode (at step 222), the controller 75 determines if the relay output parameter is set to a fault mode (step 230). If so, the controller 75 determines, at step 232, if the drive 10 is tripped (e.g., a fault has occurred and the drive 10 has been stopped). The controller 75 will then turn the relay off if the drive 10 has not been tripped (step 234) or turn the relay on if the drive 10 has been tripped (step 236). For example, if an alarm is the relay output, the alarm can be activated if the drive 10 has been tripped to indicate the fault condition to the user.

Figure 16:
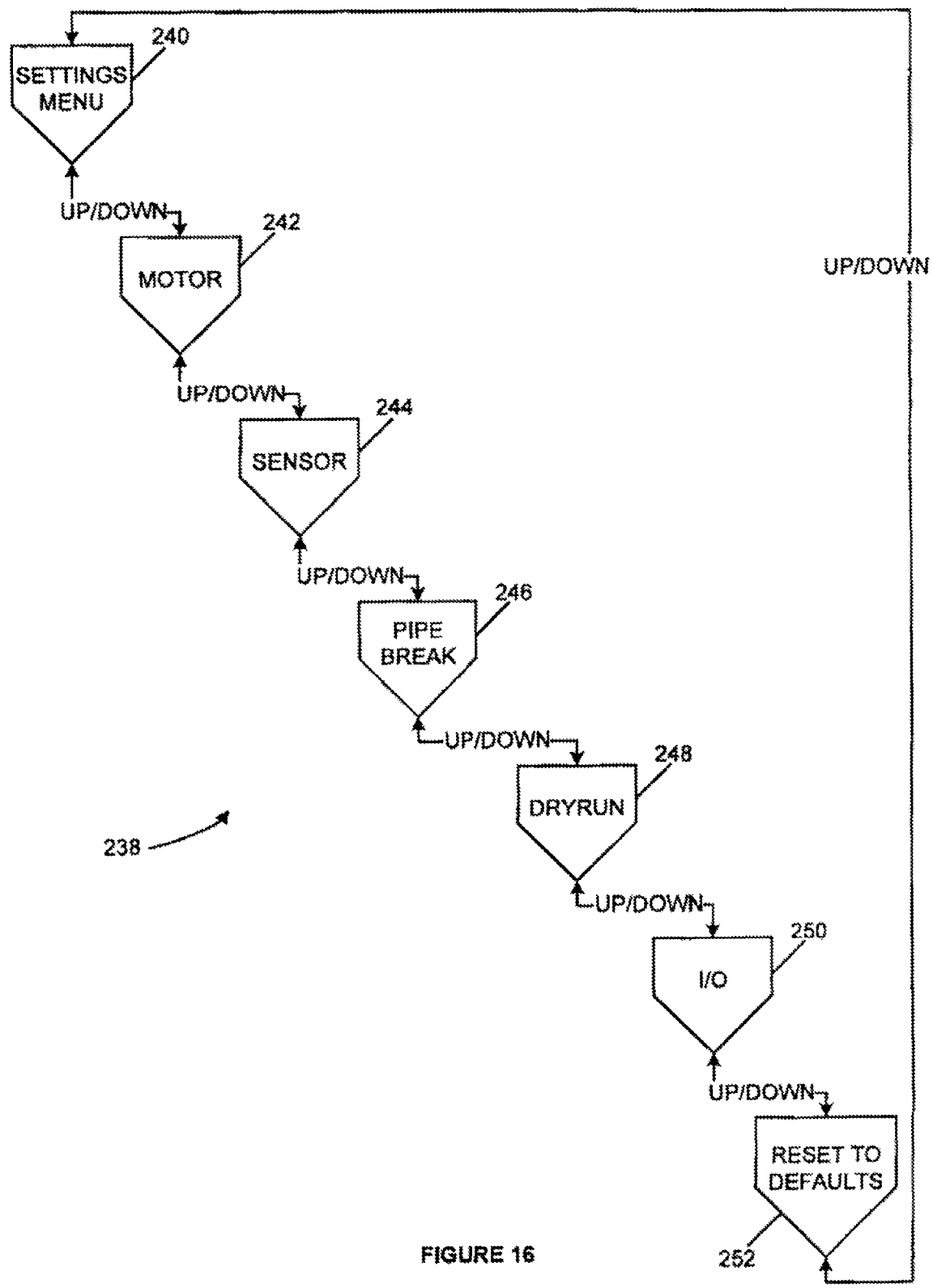
FIG. 16 is a flow chart illustrating a main menu.

FIGS. 16-29 are flow charts describing menu operations according to some embodiments of the invention. FIG. 16 illustrates a main menu 238 of the controller 75. The main menu 238 can include the following parameters: settings menu 240, motor 242, sensor 244, pipe break 246, dry run 248, I/O (input/output) 250, and reset to defaults 252. The user can view the main menu 238 on the liquid crystal display 36 using the main menu button 44 on the control pad 14. The user can then toggle up and down through the parameters of the main menu 238 using the directional buttons 52. The user can select a parameter using the enter button 56.

Figure 17:
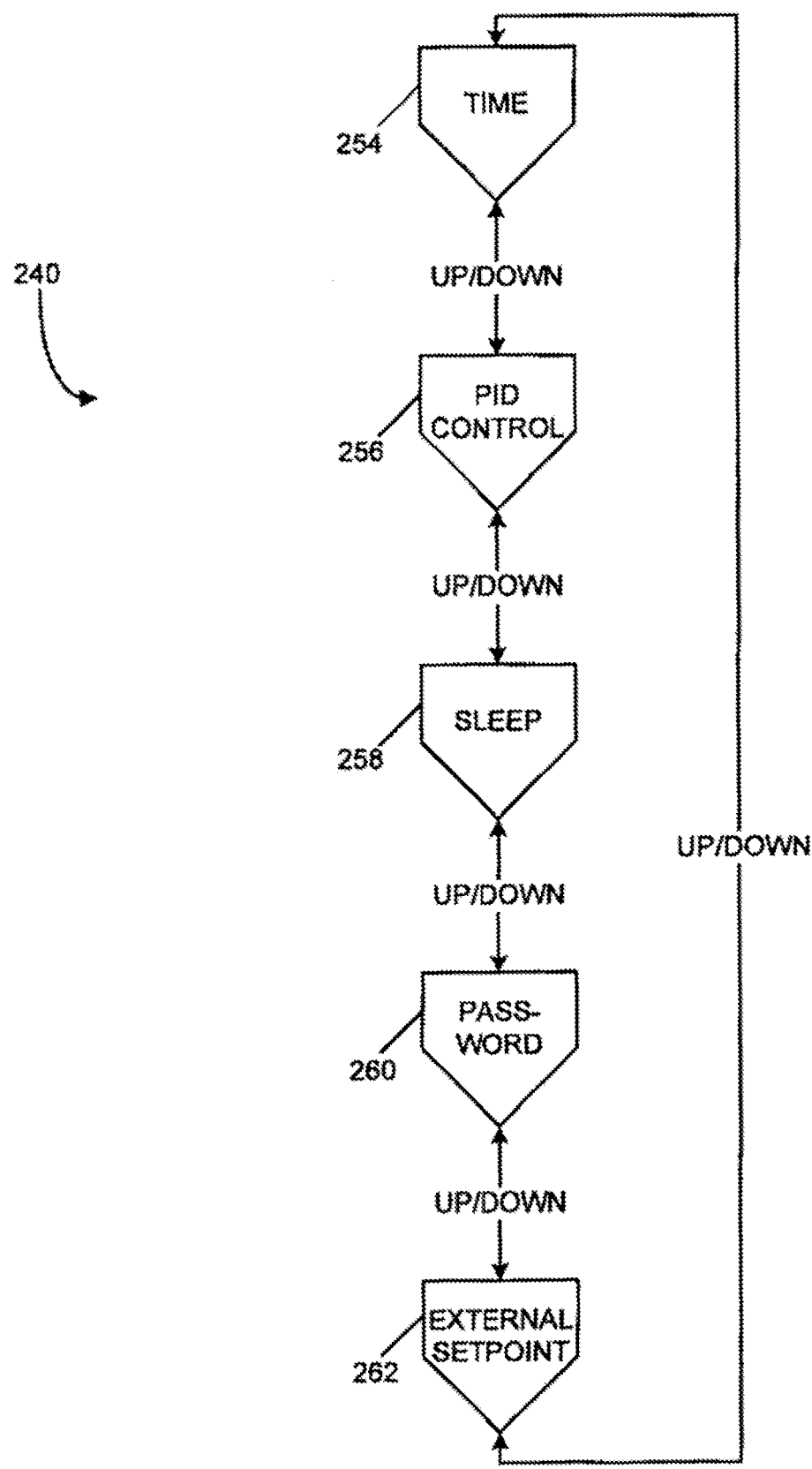
FIG. 17 is a flow chart illustrating a settings menu.

From the main menu 238, the user can select the settings menu 240. The user can toggle up and down through the settings menu 240 to view the following parameters, as shown in FIG. 17: time 254, PID control 256, sleep 258, password 260, and external set point 262.

Figure 18:
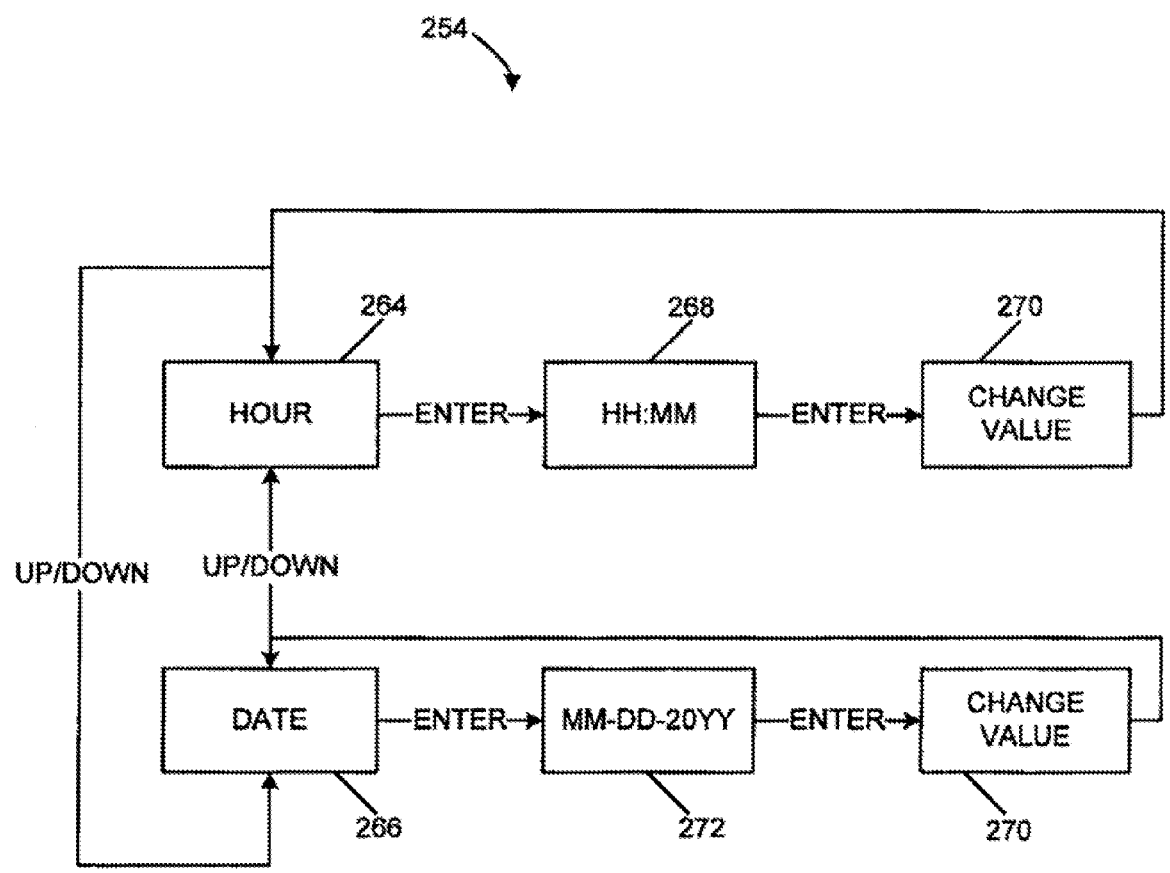
FIG. 18 is a flow chart illustrating a time parameter menu.

FIG. 18 illustrates the user's options after selecting the time parameter 254 from the settings menu 240. The user can toggle up and down between setting a current hour 264 or a date 266. If the user selects the hour parameter 264, the user can enter a current time 268, and a time value for the controller 75 will be changed according to the user's input 270. If the user selects the date parameter 266, the user can enter a current date 272 and a date value for the controller 75 will be changed according to the user's input 270.

Figure 19:
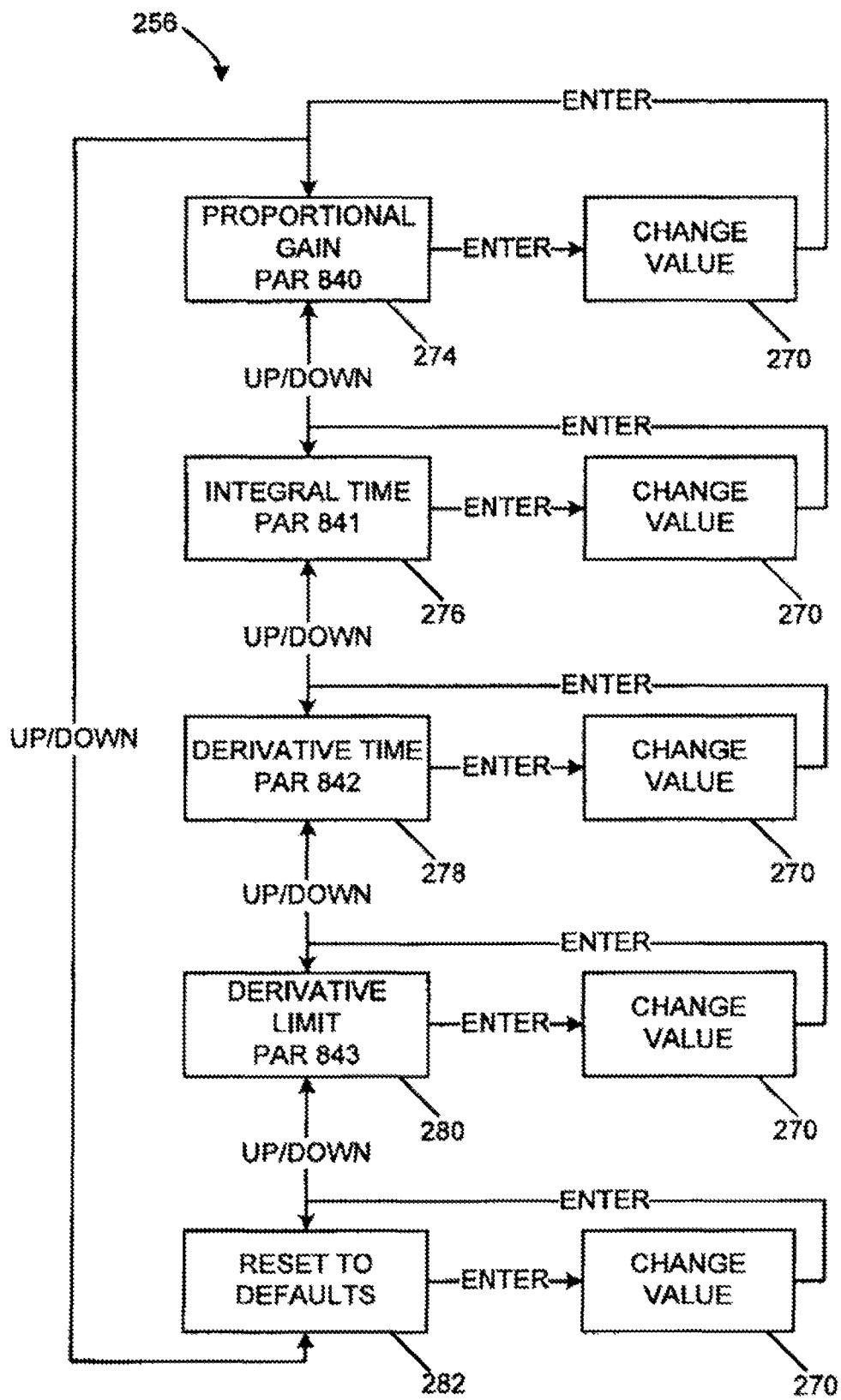
FIG. 19 is a flow chart illustrating a PID control parameter menu.

FIG. 19 illustrates the user's options after selecting the PID control parameter 256 from the settings menu 240. The following parameters can be chosen after selecting PID control 256: proportional gain 274, integral time 276, derivative time 278, derivative limit 280, and restore to defaults 282. The user can select any of the parameters 274-282 to modify one or more preferences associated with the parameters, and appropriate values for the controller 75 will be changed 270.

Figure 20:
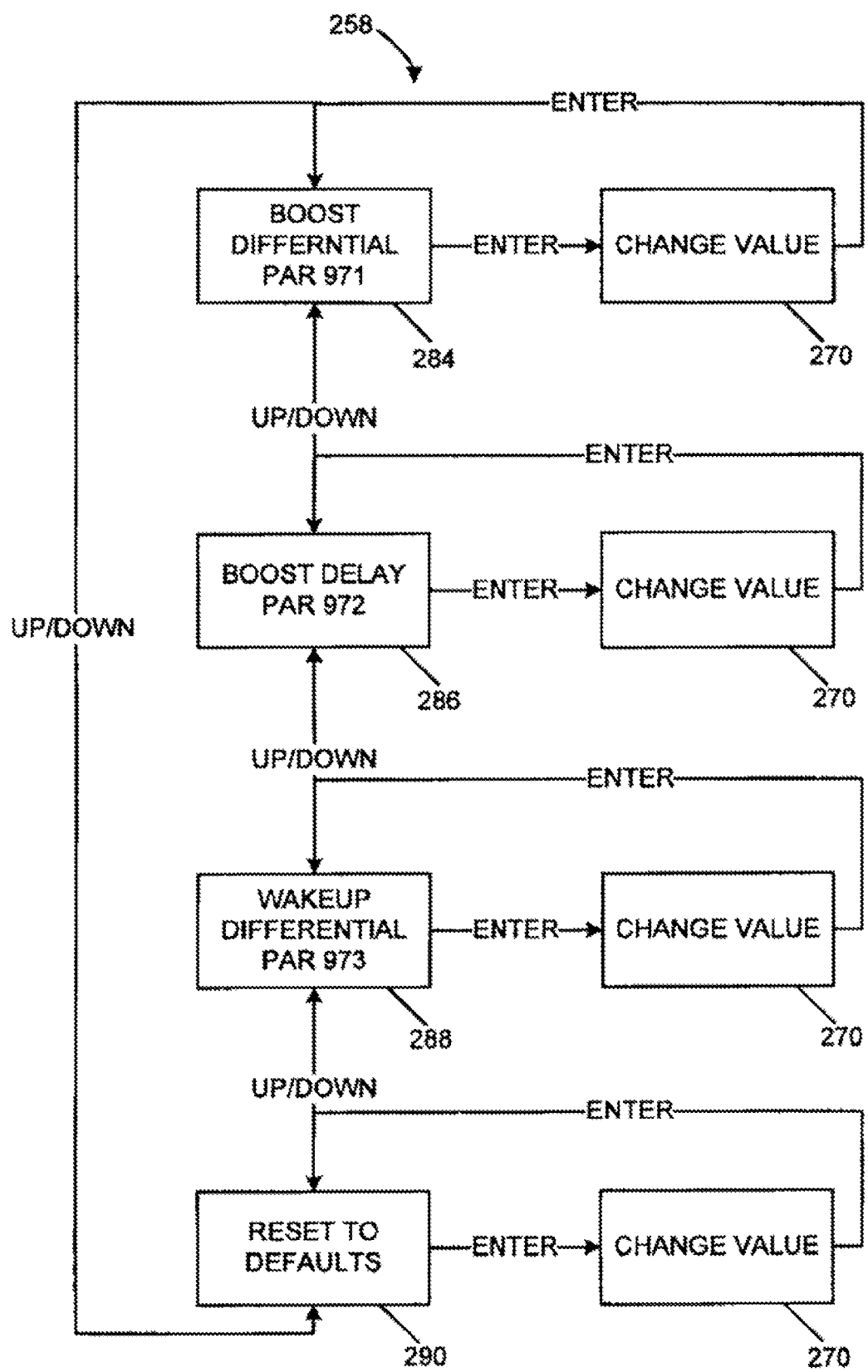
FIG. 20 is a flow chart illustrating a sleep parameter menu.

FIG. 20 illustrates the user's options after selecting the sleep parameter 258 from the settings menu 240. The following parameters can be chosen after selecting sleep 258: boost differential 284, boost delay 286, wakeup differential 288, and restore to defaults 290. The user can select any of the parameters 284-290 to modify one or more preferences associated with the parameters, and appropriate values for the controller 75 will be changed 270. The parameters can be set to modify or adjust the sleep mode operation described with reference to FIG. 12.

Figure 21:
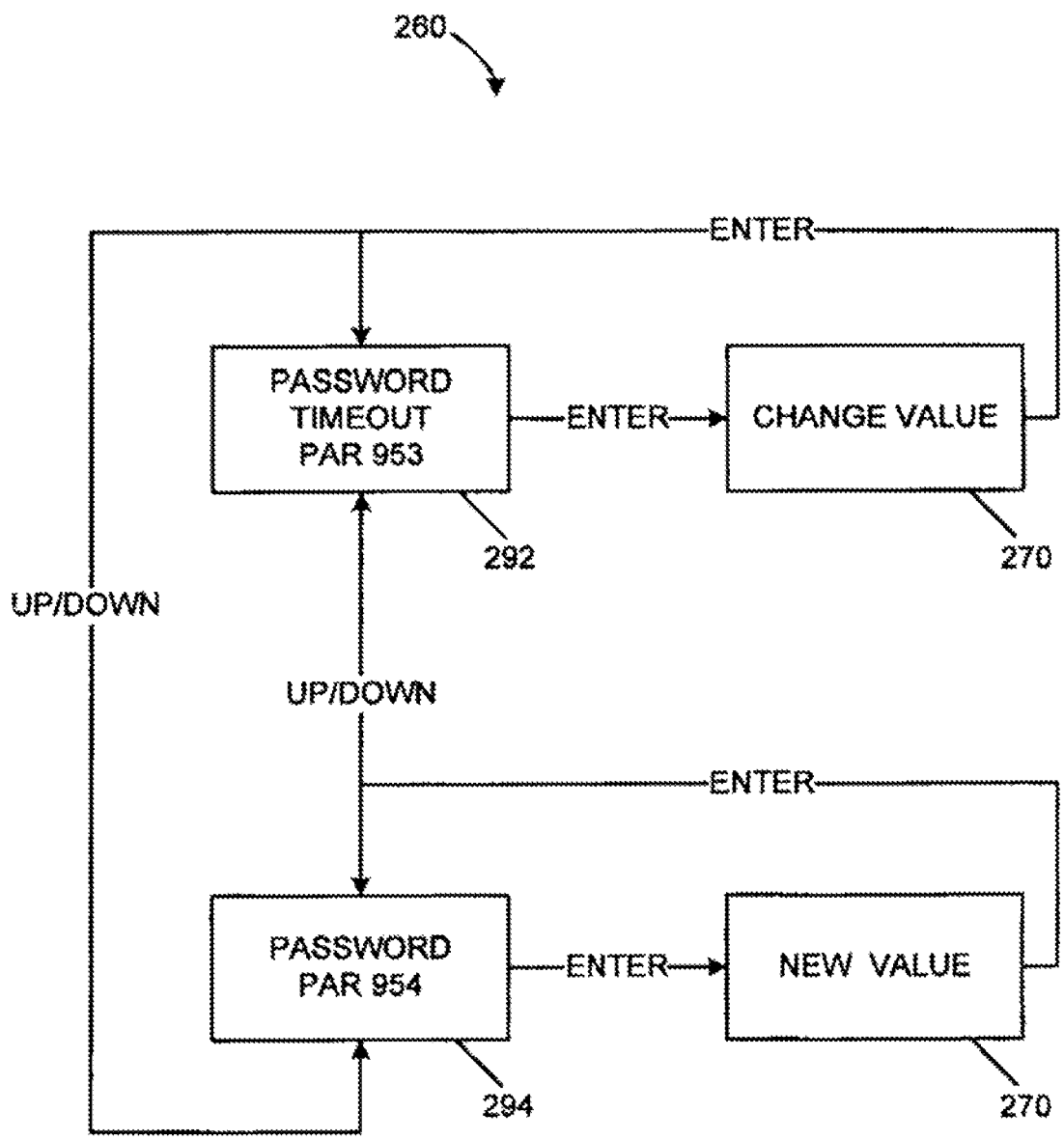
FIG. 21 is a flow chart illustrating a password parameter menu.

FIG. 21 illustrates the user's options after selecting the password parameter 260 from the settings menu 240. The following parameters can be chosen after selecting password 260: password timeout 292 and password 294. The user can select any of the parameters 292-294 to modify one or more preferences associated with the parameters, and appropriate values for the controller 75 will be changed 270. The password timeout parameter 292 can include a timeout period value. If the control pad 14 is not accessed within the set timeout period, the controller 75 175 can automatically lock the control pad 14 (i.e., enter a password protection mode). To unlock the keys, or leave the password protection mode, the user must enter the password that is set under the password parameter 294. This is further described below with reference to FIG. 56.

Figure 22:
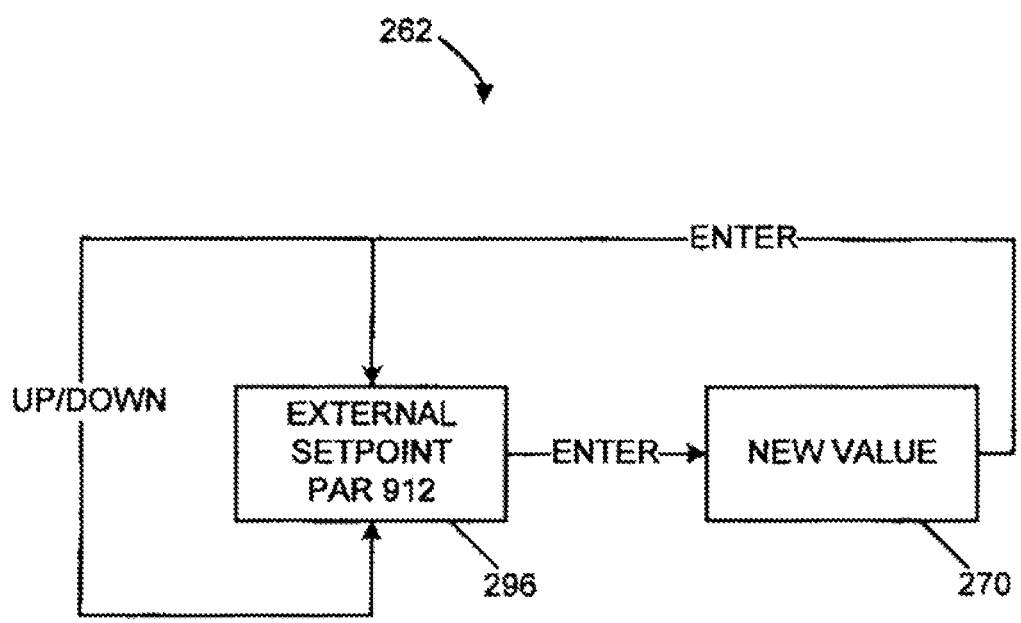
FIG. 22 is a flow chart illustrating an external set point parameter menu.

FIG. 22 illustrates the user's options after selecting the external set point parameter 262 from the settings menu 240. The user can select the external set point parameter 296 to modify one or more preferences associated with the parameter 296, and appropriate values for the controller 75 will be changed 270.

Figure 23:
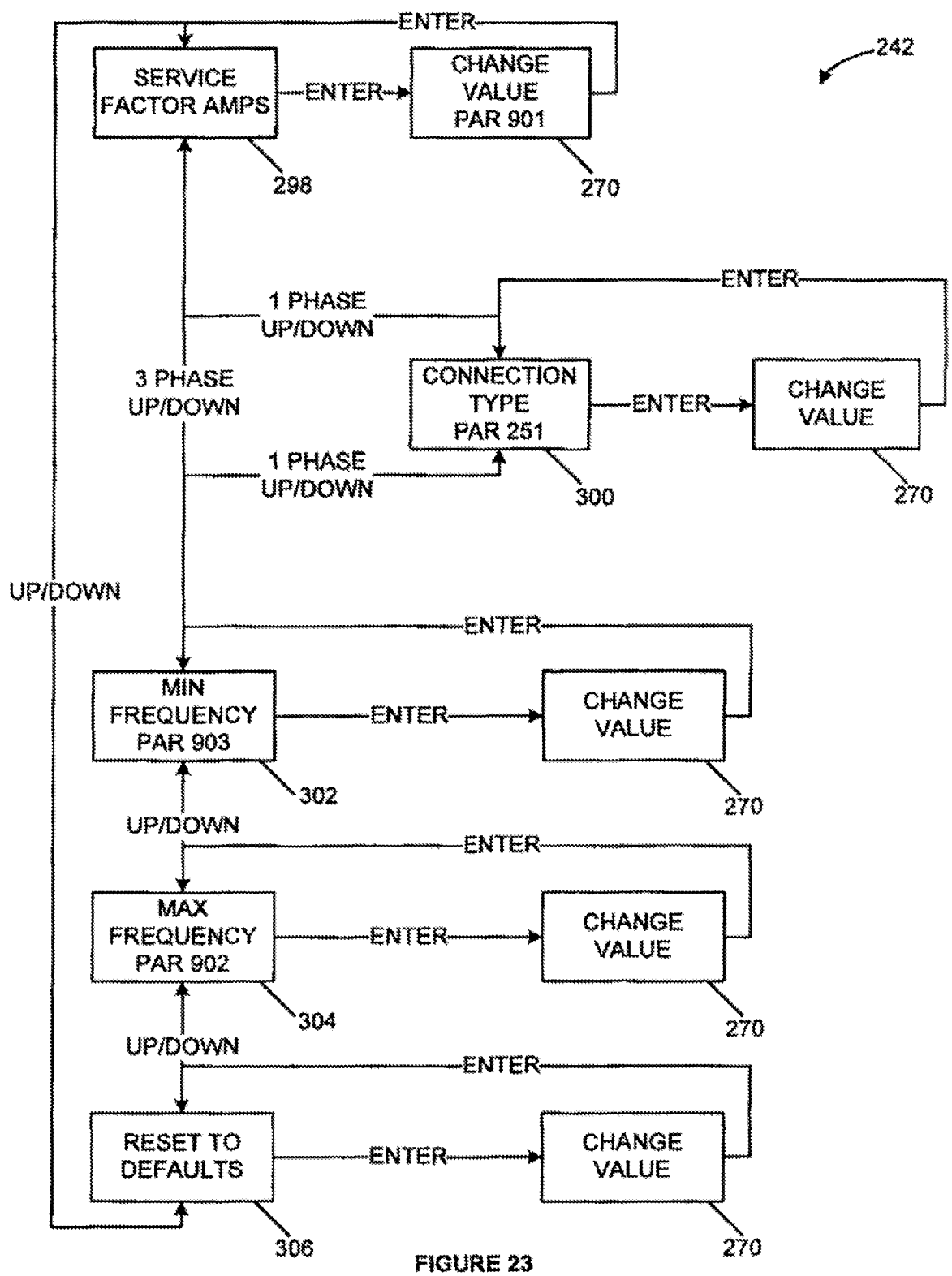
FIG. 23 is a flow chart illustrating a motor parameter menu.

FIG. 23 illustrates the user's options after selecting the motor parameter 242 from the main menu 238. The following parameters can be chosen after selecting motor 242: service factor amps 298, connection type 300, minimum frequency 302, maximum frequency 304, and restore to defaults 306. The connection type parameter 300 may only be available if the drive 10 is being used to run a single-phase motor. If the drive 10 is being used to run a three-phase motor, the connection type parameter 300 may not be provided. The user can select any of the parameters 298-306 to modify one or more preferences associated with the parameters, and appropriate values for the controller 75 will be changed 270.

Figure 24:
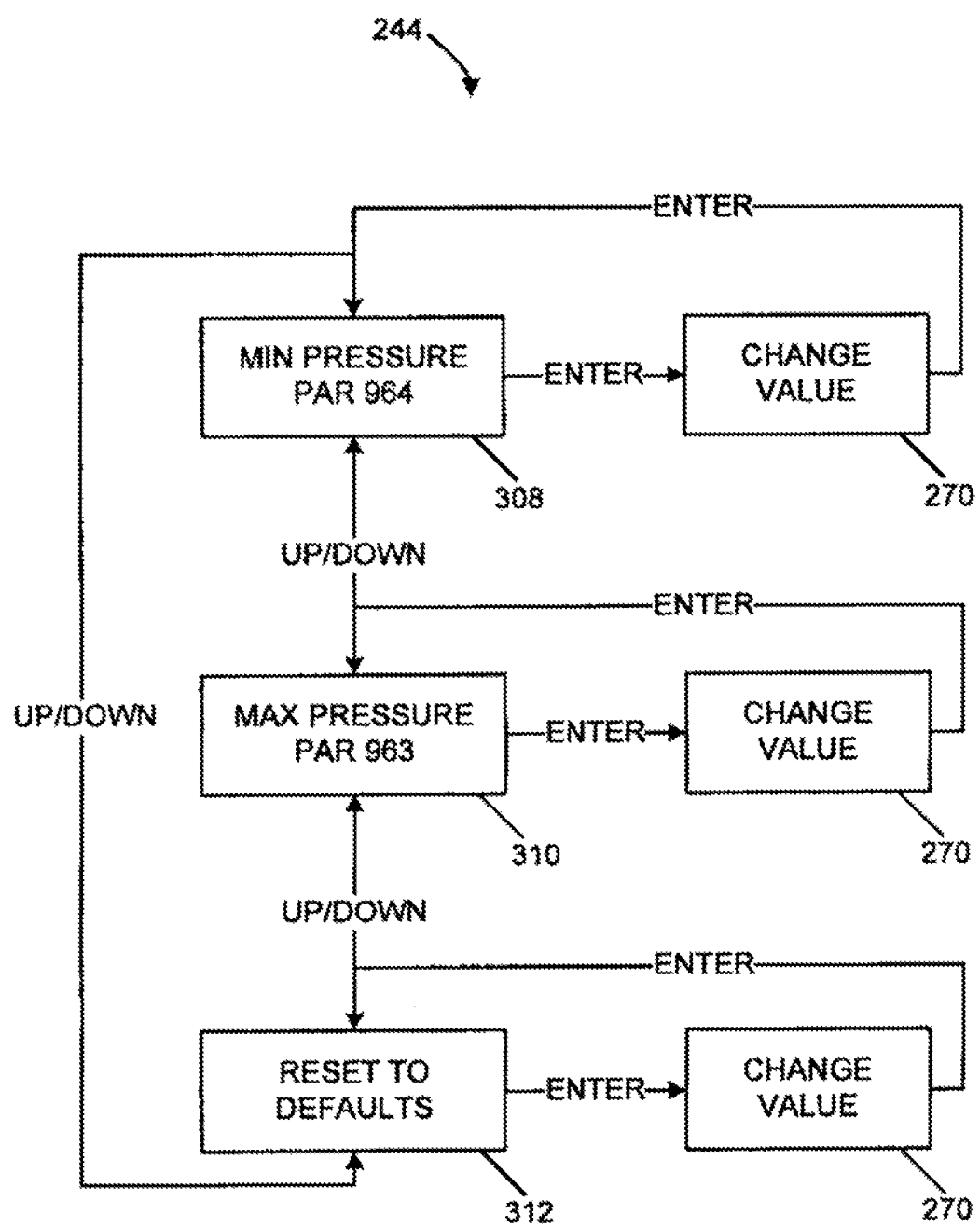
FIG. 24 is a flow chart illustrating a sensor parameter menu.

FIG. 24 illustrates the user's options after selecting the sensor parameter 244 from the main menu 238. The following parameters can be chosen after selecting sensor 244: minimum pressure 308, maximum pressure 310, and restore to defaults 312. The user can select any of the parameters 308-312 to modify one or more preferences associated with the parameters, and appropriate values for the controller 75 will be changed 270.

Figure 25:
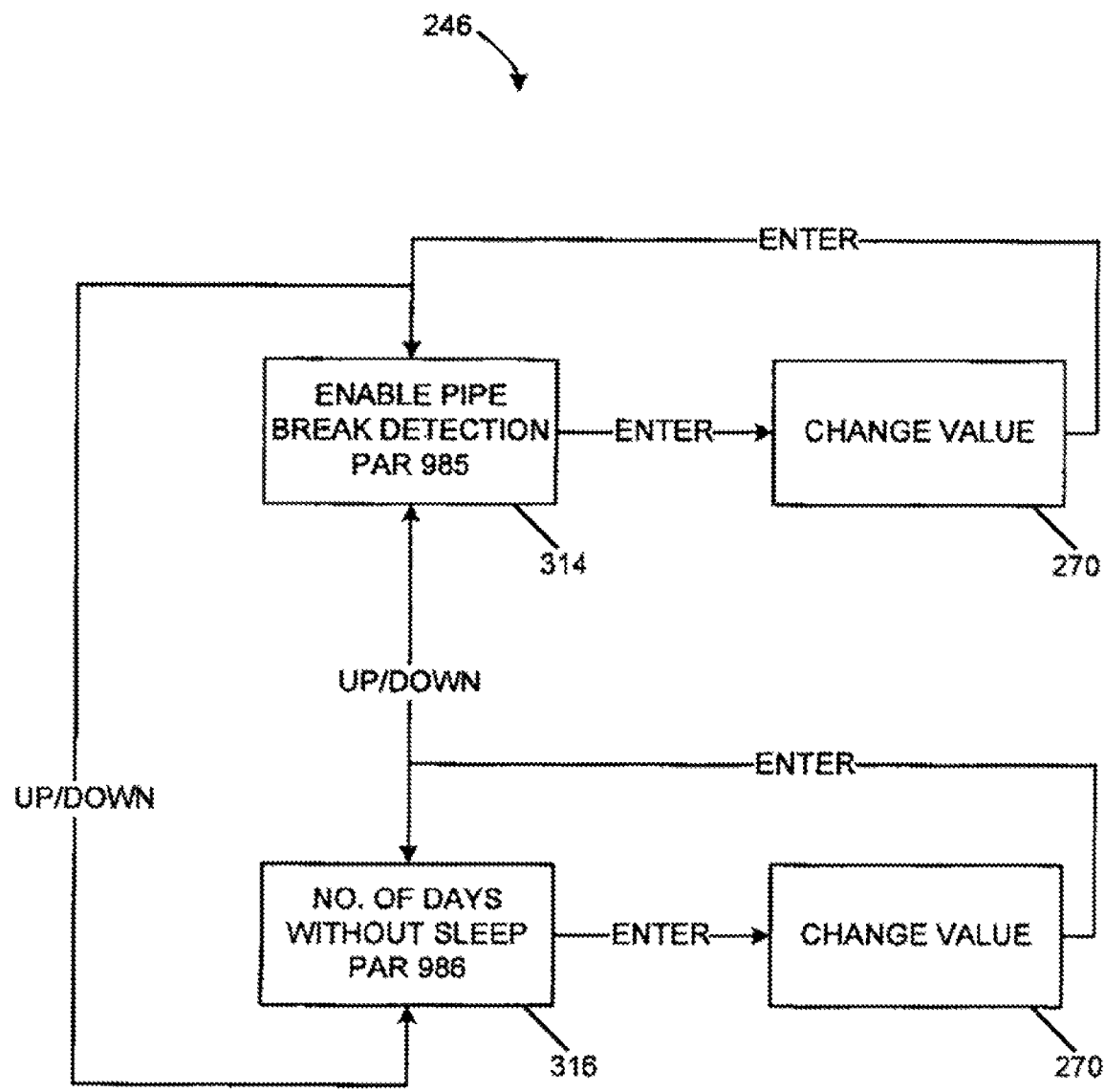
FIG. 25 is a flow chart illustrating a pipe break parameter menu.

FIG. 25 illustrates the user's options after selecting the pipe break parameter 246 from the main menu 238. The following parameters can be chosen after selecting pipe break 246: enable pipe break detection 314 and number of days without sleep 316. The user can select either of the parameters 314-316 to modify one or more preferences associated with the parameters, and appropriate values for the controller 75 will be changed 270. In some embodiments, the number of days without sleep parameter 316 can include values in the range of about four hours to about fourteen days. The enable pipe break detection parameter 314 can allow the user to enable or disable pipe break detection.

Figure 26:
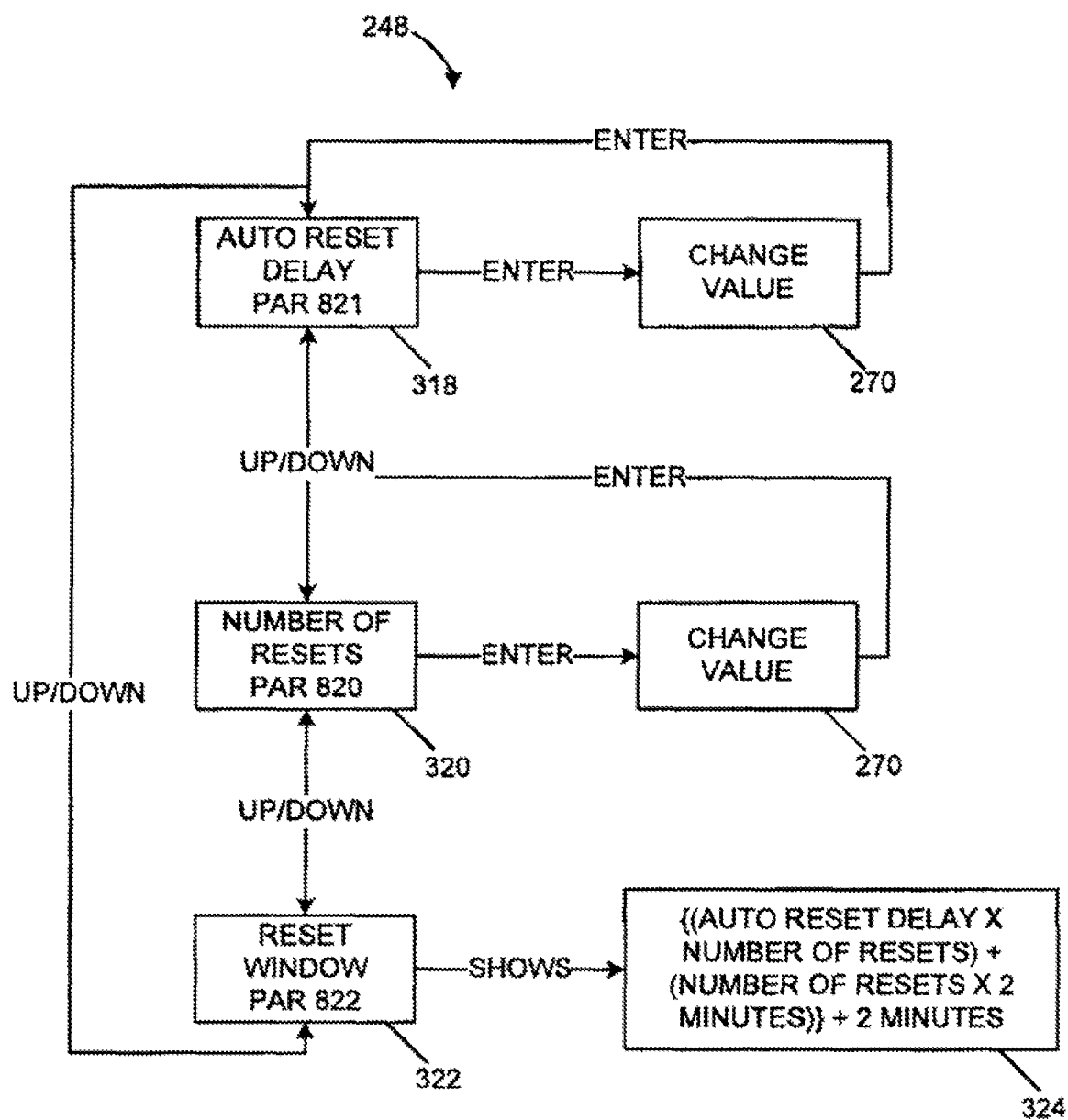
FIG. 26 is a flow chart illustrating a dry run parameter menu.

FIG. 26 illustrates the user's options after selecting the dry run parameter 248 from the main menu 238. The following parameters can be chosen after selecting dry run 248: auto reset delay 318, number of resets 320, and reset window 322. The user can select either of the parameters 318-320 to modify one or more preferences associated with the parameters, and appropriate values for the controller 75 will be changed 270. The user can select the reset window parameter 322 to view a value 324 indicating a reset window of the controller 75. The reset window value can be based from the values chosen for the auto reset delay 318 and the number of resets 320. Thus, the reset window parameter 322 can be a view-only (i.e., non-adjustable) parameter.

Figure 27:
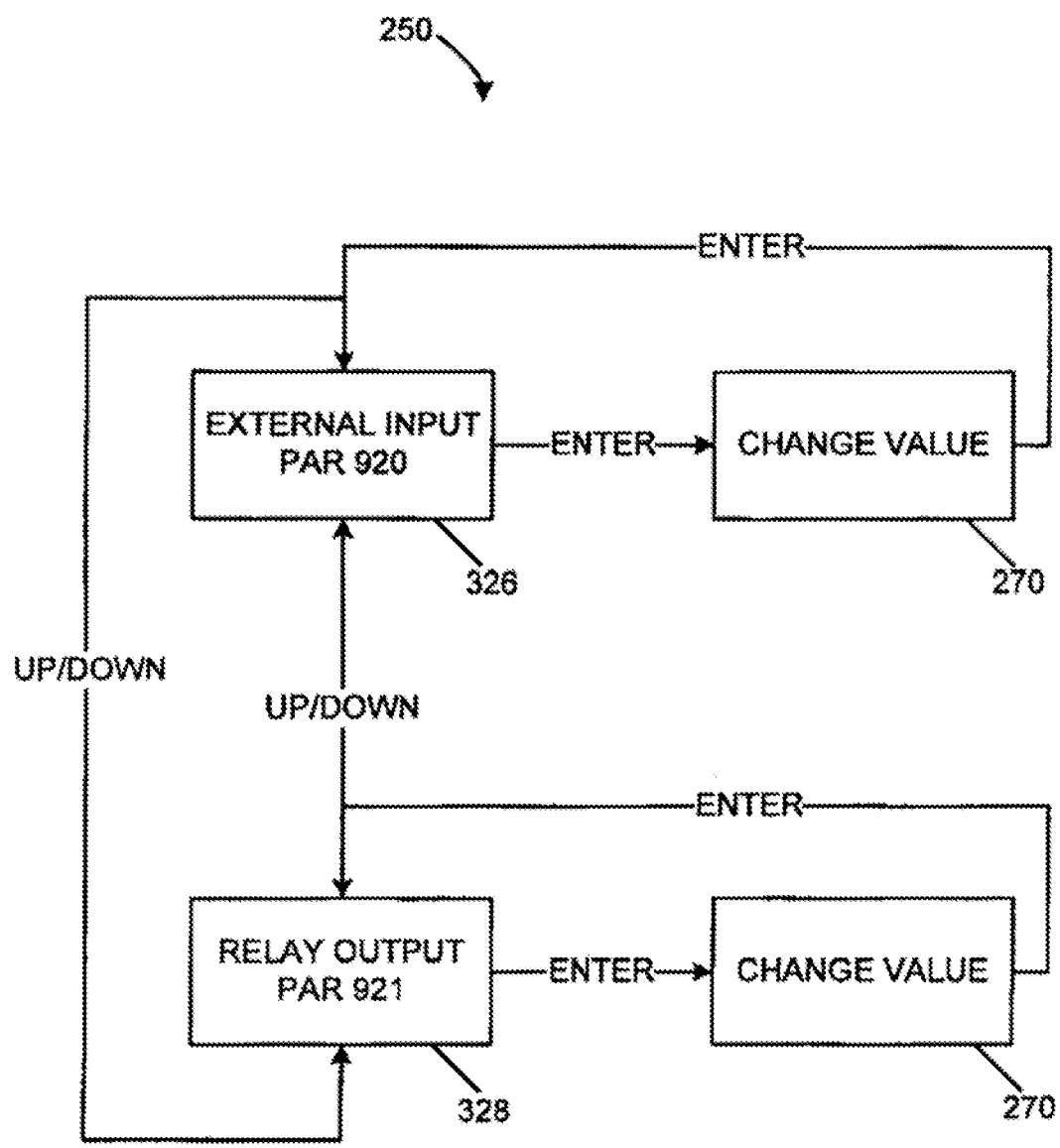
FIG. 27 is a flow chart illustrating an input/output parameter menu.

FIG. 27 illustrates the user's options after selecting the I/O parameter 250 from the main menu 238. The following parameters can be chosen after selecting I/O 250: external input 326 and relay output 328. The user can select either of the parameters 326-328 to modify one or more preferences associated with the parameters, and appropriate values for the controller 75 will be changed 270.

Figure 28:
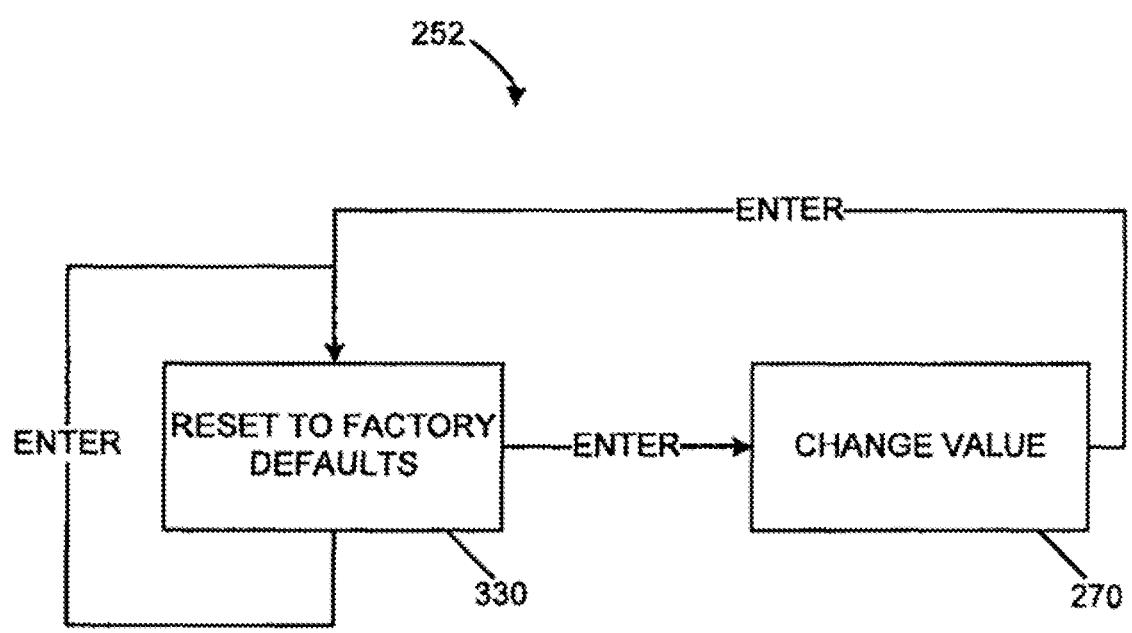
FIG. 28 is a flow chart illustrating a reset parameter menu.

FIG. 28 illustrates the user's options after selecting the reset to defaults parameter 252 from the main menu 238. The user can select the parameter 330 to change all values to factory default values 270.

Figure 29:
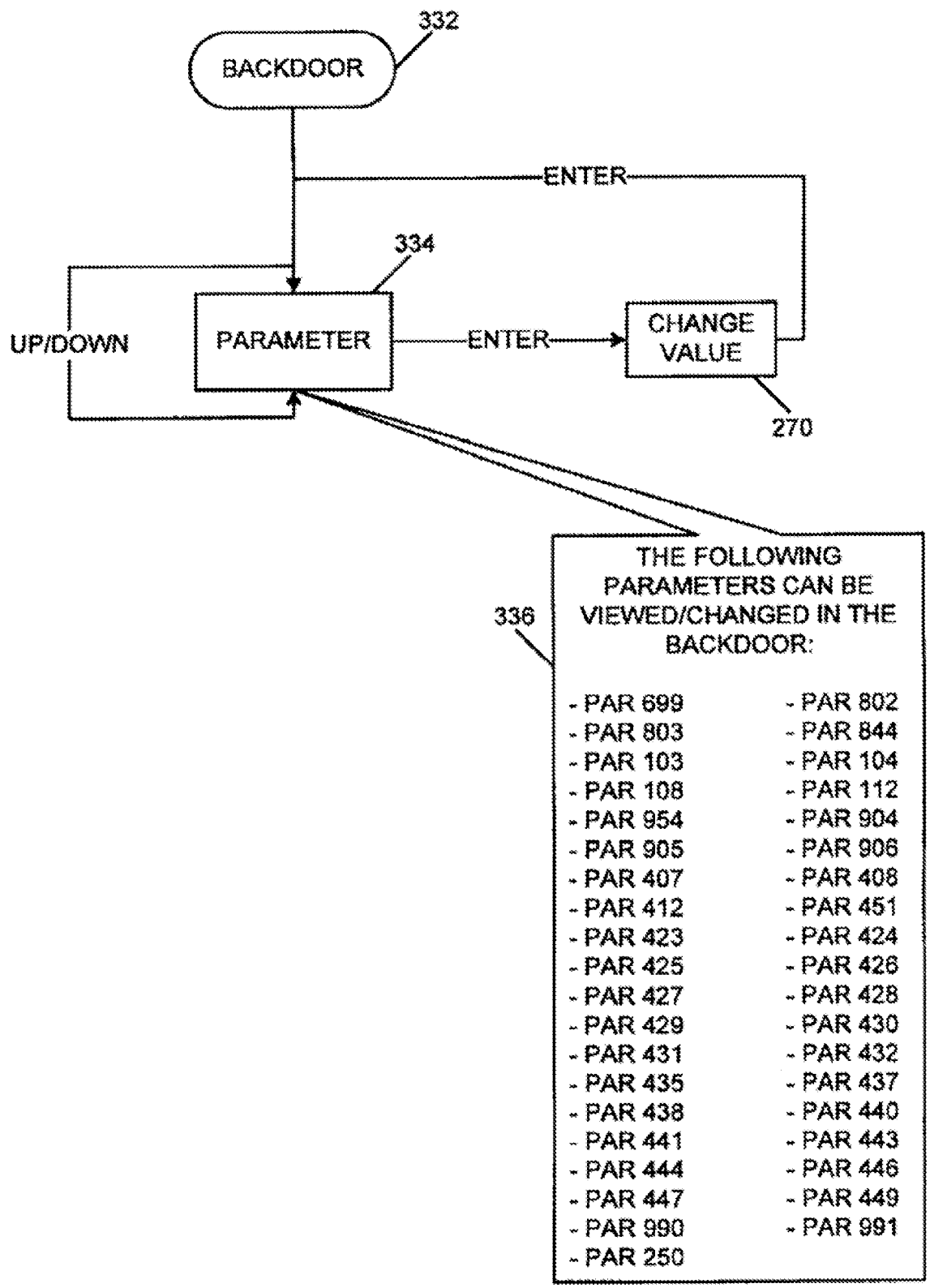
FIG. 29 is a flow chart illustrating a backdoor parameter menu.

FIG. 29 illustrates a backdoor parameter 332, according to some embodiments. With the backdoor parameter 332, the user can choose a parameter 334 not normally accessible through other menus. The user can select the parameter 334 to modify one or more preferences associated with the parameter, and appropriate values for the controller 75 will be changed 270. The parameter 334 that the user selects can be from a list of parameters 336. The list of parameters 336 can include one or more of the parameters disclosed above as well as other parameters.

Figure 30:
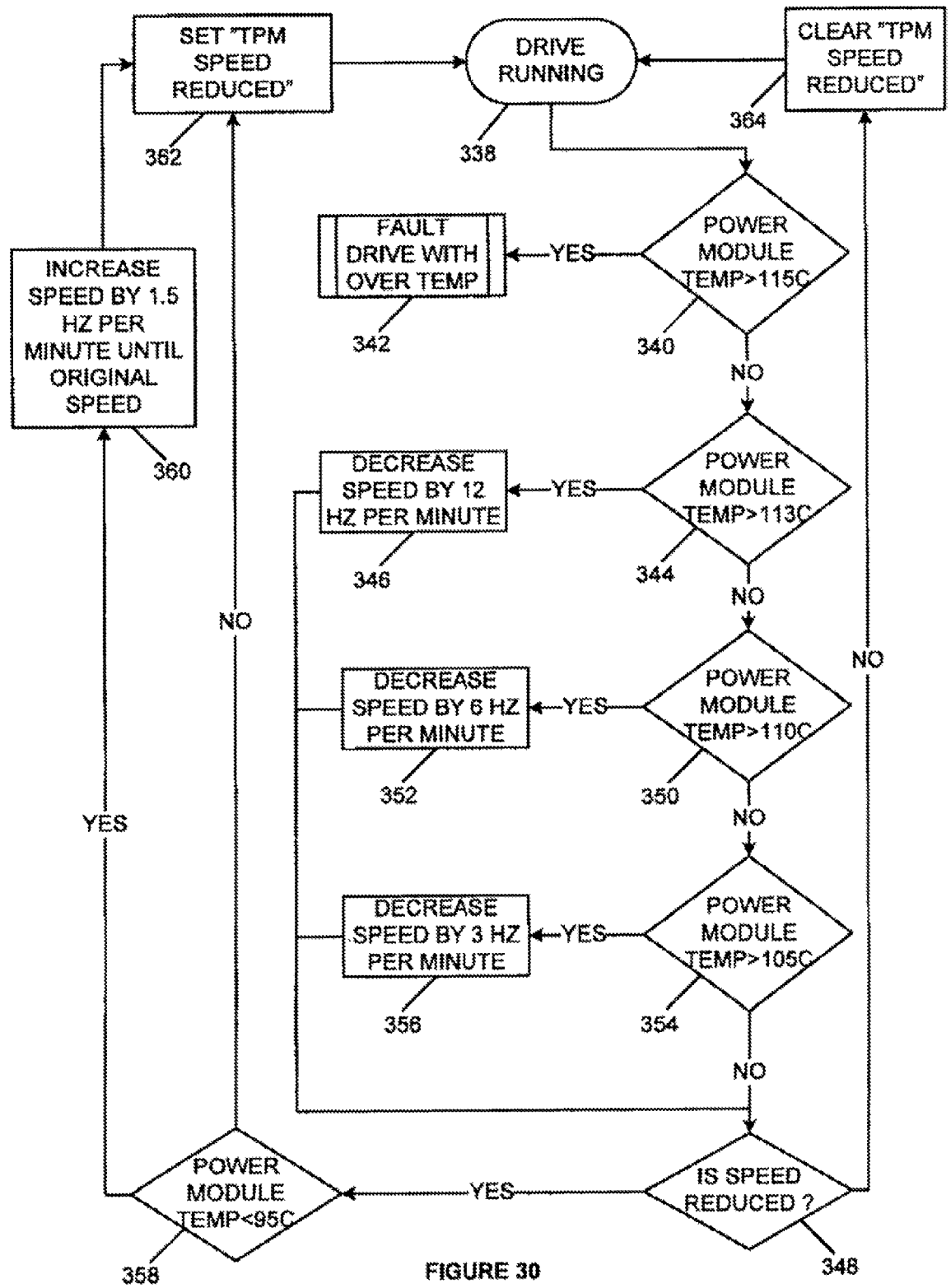
FIG. 30 is a flow chart illustrating an overheat prevention operation.

FIGS. 30-47 are flow charts describing drive warnings and faults according to some embodiments of the invention. FIG. 30 illustrates an overheat prevention operation of the controller 75. When the drive 10 is running (step 338), the controller 75 first determines, at step 340, if a power module temperature is greater than a first temperature (e.g., 115 degrees Celsius). If so, an overheat fault operation is executed (step 342). If not, the controller 75 then determines, at step 344, if the power module temperature is greater than a second temperature (e.g., about 113 degrees Celsius). If so, the controller 75, at step 346, decreases the speed of the motor by a first value (e.g., about 12 Hz per minute) and continues to step 348. If not, the controller 75 then determines, at step 350, if the power module temperature is greater than a third temperature (e.g., about 110 degrees Celsius). If so, the controller 75, at step 352, decreases the speed of the motor by a second value (e.g., about 6 Hz per minute) and continues to step 348. If not, the controller 75 then determines, at step 354, if the power module temperature is greater than a fourth temperature (e.g., about 105 degrees Celsius). If so, the controller 75, at step 356, decreases the speed of the motor by a third value (e.g., about 3 Hz per minute) and continues to step 348. If not, the controller 75 proceeds to step 348. At step 348, the controller 75 determines if the speed has been reduced (i.e., if the controller 75 performed steps 346, 352, or 356). If so, the controller 75, at step 358, determines if the power module temperature is less than a fifth value (e.g., about 95 degrees Celsius). If the power module temperature is less than the fifth value, then the controller 75 increases the speed of the motor by a fourth value (e.g., about 1.5 Hz per minute) until the motor's original speed is reached (step 360) and a warning message "TPM: Speed Reduced" is displayed (step 362). If the power module temperature is greater than the fifth value, the controller 75 proceeds straight to step 362. From step 362, the controller 75 reverts back to step 338, and repeats the above process. If, at step 348, the controller 75 determines that the speed has not been reduced (i.e., the controller 75 did not performed steps 346, 352, or 356), then the "TPM: Speed Reduced" warning message is cleared (step 364), the controller 75 reverts back to step 338, and the above operation is repeated. In some embodiments, the power module being monitored can be the drive 10 itself or various components of the drive 10 (e.g., a heat sink of the controller 75, the motor 11, or the pump 12).

Figure 31:
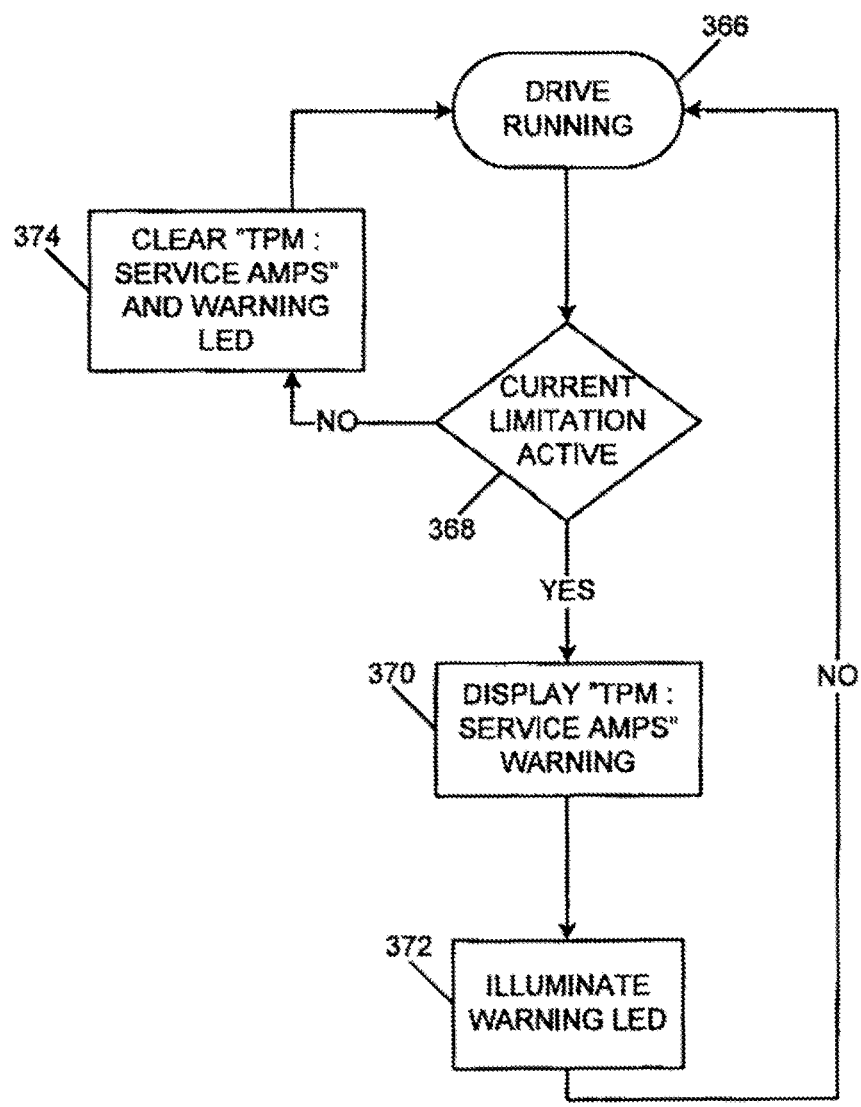
FIG. 31 is a flow chart illustrating an overcurrent prevention operation.

FIG. 31 illustrates an overcurrent prevention operation of the controller 75. When the drive 10 is running (step 366), the controller 75 determines, at step 368, if the drive current is being limited (e.g., because it is above the reference service factor amps parameter 298 in FIG. 23). If so, a warning message "TPM: Service Amps" is displayed (step 370) and the Warning LED 70 is illuminated (step 372). The controller 75 then reverts back to step 366 where the operation is repeated. If the drive current is not being limited, the "TPM: Service Amps" warning message and the Warning LED 70 are cleared (step 374).

Figure 32:
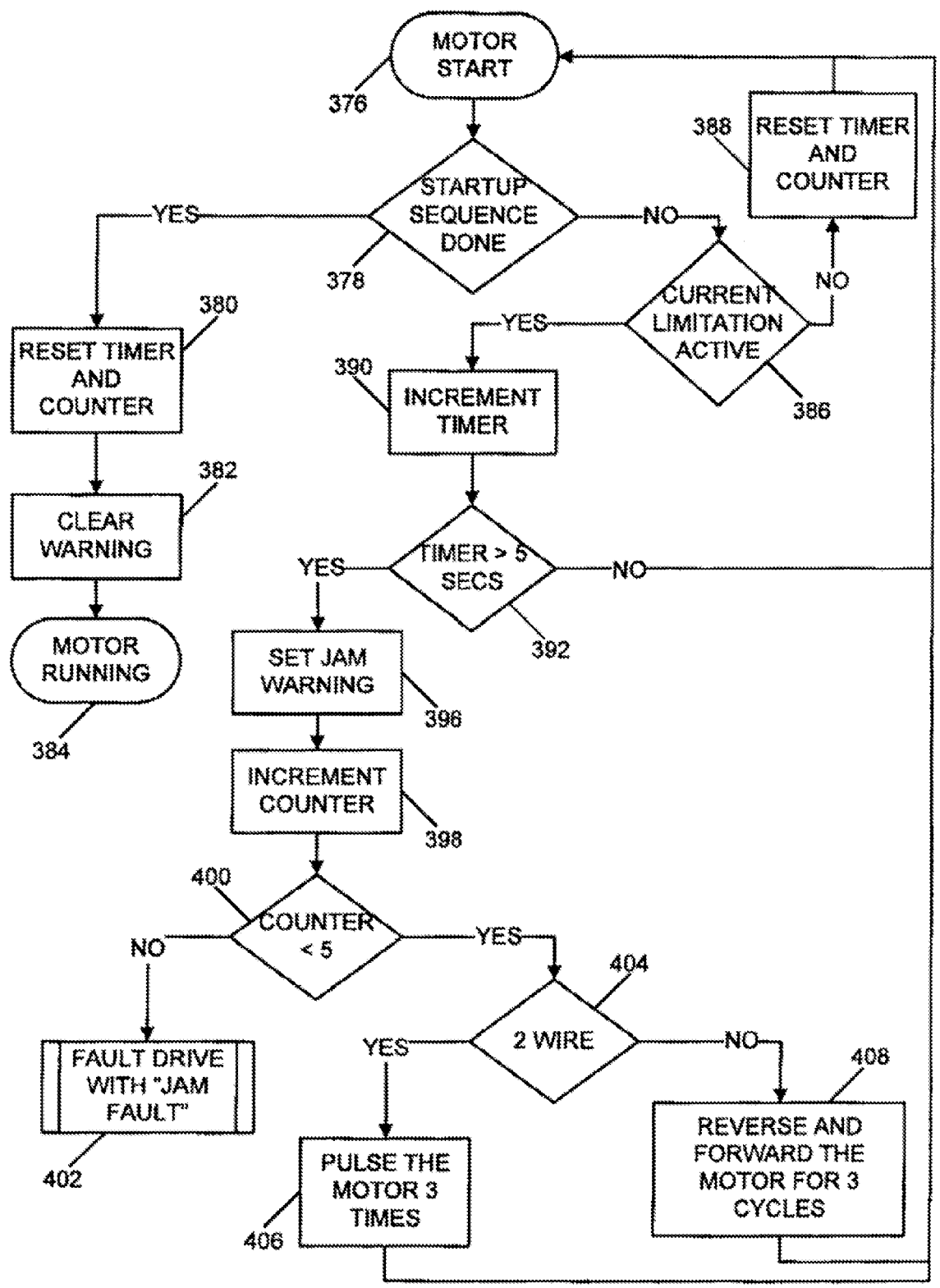
FIG. 32 is a flow chart illustrating a jam prevention operation.

FIG. 32 illustrates a jam prevention operation of the controller 75. When the motor is triggered to start (step 376), the controller 75 determines, at step 378, if a startup sequence is completed. If so, a timer and a counter are reset (step 380), any warning messages are cleared (step 382), and the motor is operating (step 384). If the startup sequence is not completed at step 378, then the controller 75 proceeds to step 386 to check if current limitation is active. If not, the timer and the counter can be reset (step 388), and the controller 75 can proceed back to step 376. If the controller 75 detects that current limitation is active at step 386, then the timer is incremented (step 390). If the timer has not reached five seconds, at step 392, the controller 75 reverts back to step 376. However, if the timer has reached five seconds, at step 392, the controller 75 proceeds to step 396. The controller 75 sets a jam warning (step 396) and increments the counter (step 398). If the counter is greater than five, at step 400, the controller 75 executes a jam fault operation (step 402). If the counter is not greater than five, the controller 75 determines if it is controlling a two-wire motor (step 404). If yes, the controller 75 pulses the motor about three times (step 406), then proceeds back to step 376. If the motor is not a two-wire (e.g., if the motor is a three-wire motor), the controller 75 executes a series of three forward-reverse cycles (step 408), then proceeds back to step 376.

Figure 33:
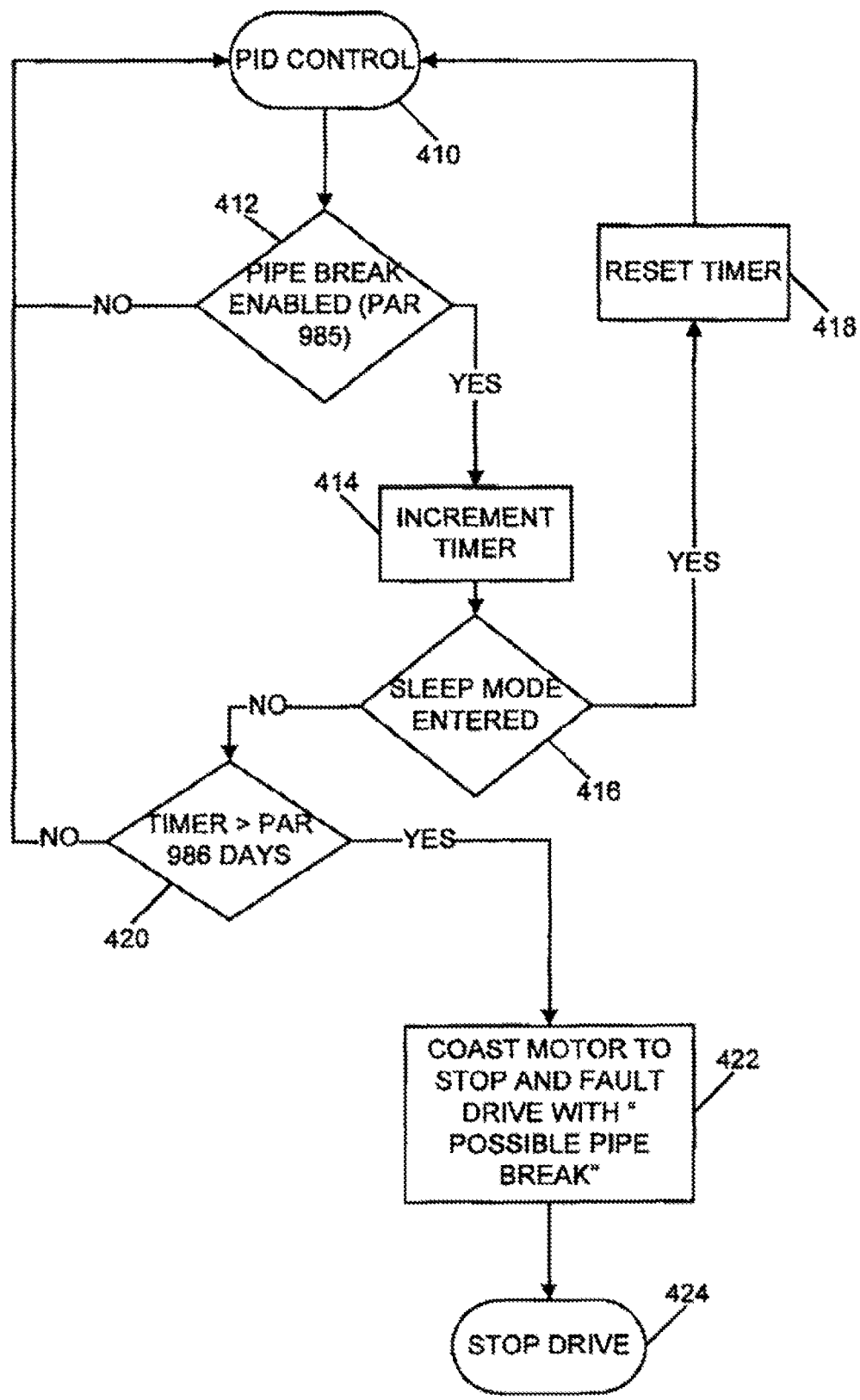
FIG. 33 is a flow chart illustrating a pipe break prevention operation.

FIG. 33 illustrates a line or pipe break fault operation of the controller 75. During PID control (step 410), the controller 75 determines if a pipe break parameter (e.g., pipe break detection parameter 314 from FIG. 25) is enabled (step 412). The controller 75 continues back to step 410 until the parameter is enabled. If the controller 75 determines that the parameter is enabled at step 412, a timer is incremented (step 414), and the controller 75 determines if the pump is in sleep mode (step 416). If the pump is in sleep mode, the timer is reset (step 418) and the controller 75 reverts back to step 410. If the pump is not in sleep mode, the controller 75, at step 420, determines if the timer has been incremented above a certain number of days (e.g., as set by the number of days without sleep parameter 316). If the timer has not exceeded the set number of days, then the controller 75 proceeds back to step 410. If the timer has exceeded the set number of days, the motor is coasted to a stop and a "possible pipe break" fault message is displayed (step 422), causing the drive 10 to be stopped (step 424).

Figure 34:
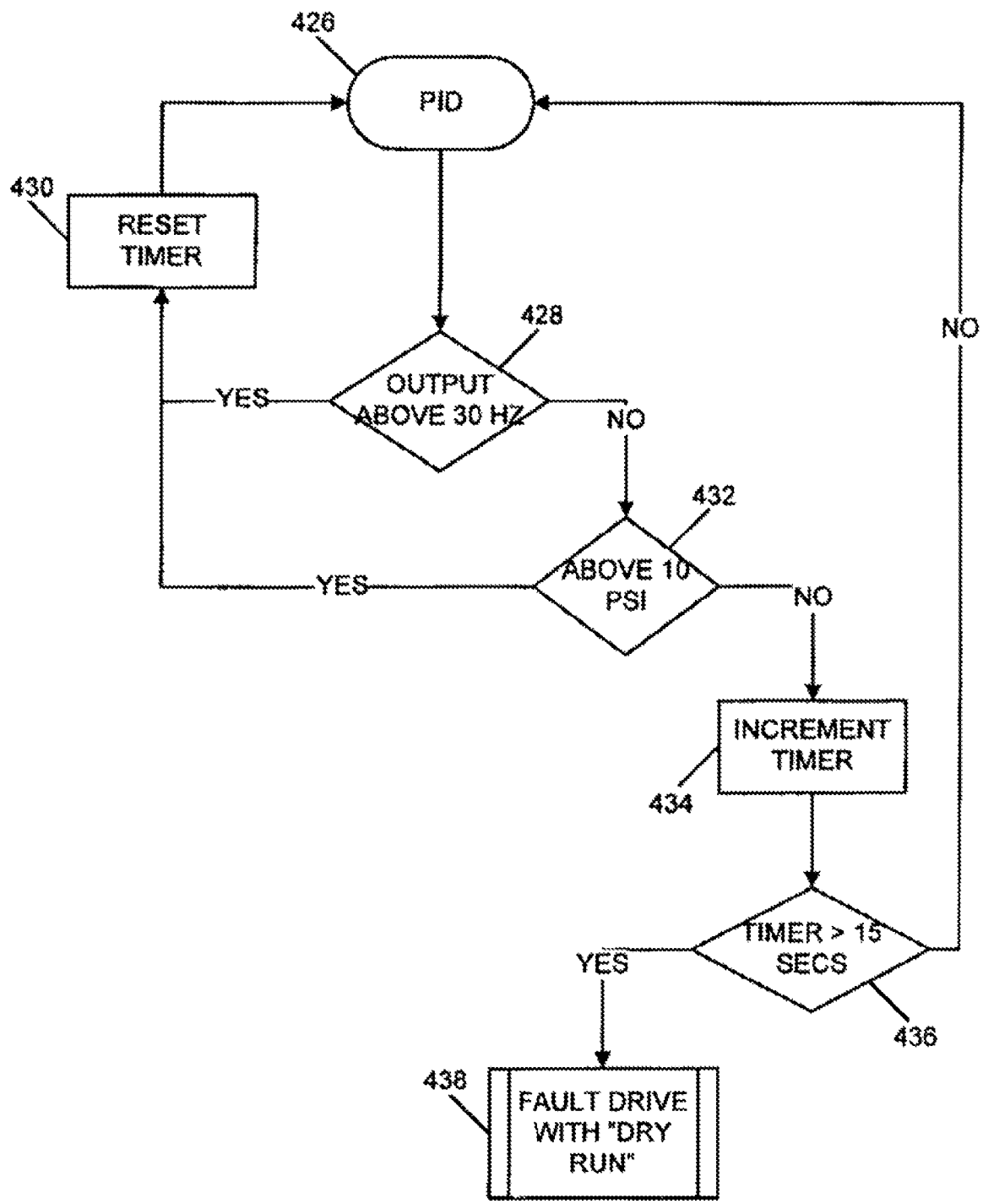
FIG. 34 is a flow chart illustrating a dry run detection operation.

FIG. 34 illustrates a dry run detection operation of the controller 75. During PID control (step 426), the controller 75 determines, at step 428, if the frequency output to the motor is greater than a frequency preset value (e.g., about 30 Hz). If so, a timer is reset (step 430) and the controller 75 reverts back to step 426. If the frequency is under the frequency preset value, the controller 75 then determines, at step 432, if the pressure is greater than a pressure preset value (e.g., about 10 PSI). If so, the timer is reset (step 430) and the controller 75 reverts back to step 426. If the pressure is under 10 PSI, the timer is incremented (step 434) and the controller 75 determines if the timer has reached 15 seconds (step 436). If not, the controller 75 reverts back to step 426. However, if the timer has reached 15 seconds, the controller 75 determines that a dry run has occurred and executes a dry run fault operation (step 438). The preset value in step 428 can be checked to ensure the motor 11 is operating at a normal operating frequency (e.g., above 30 Hz).

Figure 35:
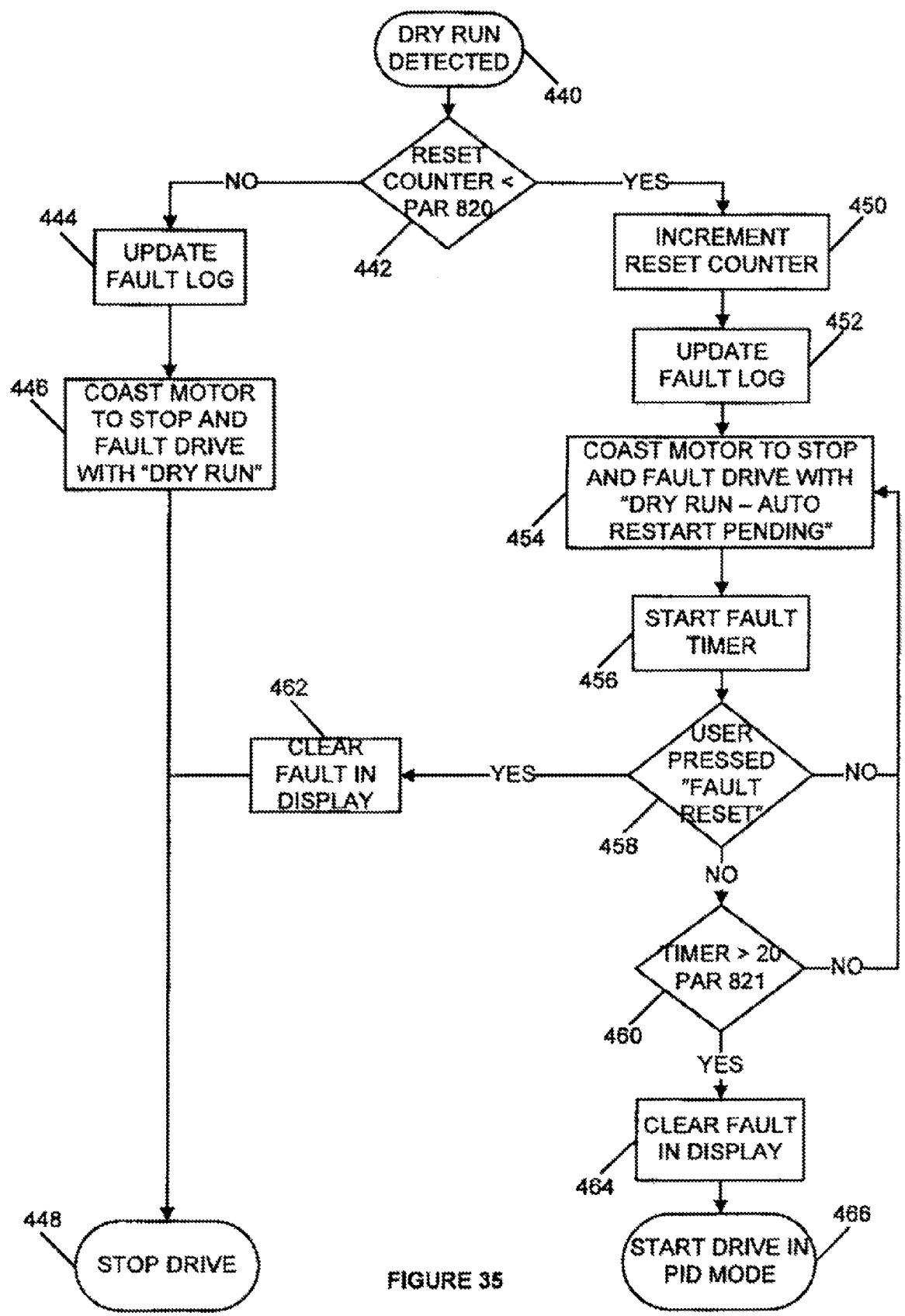
FIG. 35 is a flow chart illustrating a dry run fault operation.

FIG. 35 illustrates a dry run fault operation of the controller 75. The controller 75 can proceed to step 440 if step 438 of FIG. 34 was reached. From step 440, the controller 75 can check if a reset counter value is less than a set value (e.g., the value set under the number of resets parameter 320 of FIG. 26) at step 442. If the reset counter is not less than the set value, the controller 75 can update a fault log (step 444), coast the motor to a stop and display a "Dry Run" fault message (step 446), so that the drive 10 is stopped (step 448). If, at step 442, the reset counter is less than the set value, the reset counter is incremented (step 450) and the fault log is updated (step 452). The controller 75 can then coast the motor to a stop and display a "Dry Run—Auto Restart Pending" fault message (step 454), then start a fault timer (step 456), and continuously check if the user has pressed the fault reset button 64 (step 458) or if a timer has exceeded a time value (step 460). The time value can be the auto reset delay parameter 318 (shown in FIG. 26) set by the user. If the user presses the fault reset button 64, the controller 75 will proceed from step 458 to step 462 and clear the fault message displayed, then stop the drive 10 (step 448). If the timer exceeds the time value, the controller 75 will proceed from step 460 to step 464 and clear the fault message displayed, then restart the drive 10 in PID mode (step 466).

Figure 36:
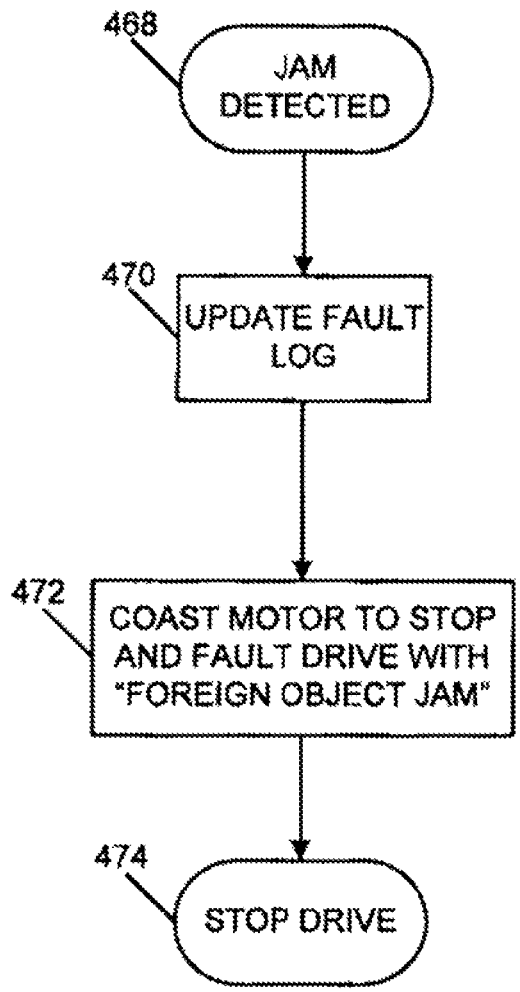
FIG. 36 is a flow chart illustrating a jam fault operation.

FIG. 36 illustrates a jam fault operation of the controller 75. When a jam has been detected (step 468), the fault log is updated (step 470). After step 470, the motor is coasted to a stop and a "Foreign Object Jam" fault message is displayed (step 472), then the drive 10 is stopped (step 474).

Figure 37:
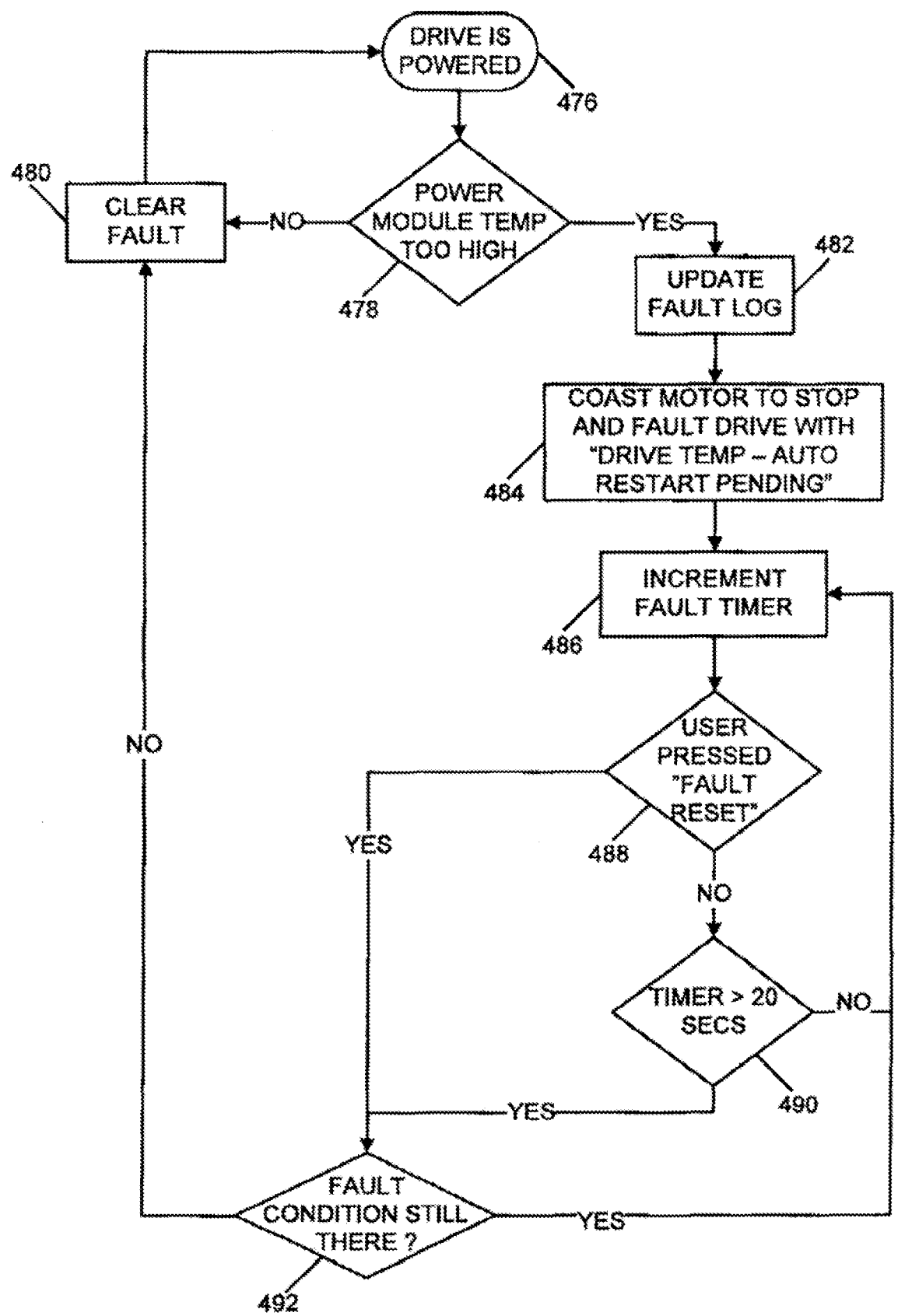
FIG. 37 is a flow chart illustrating an overtemperature fault operation.

FIG. 37 illustrates an overtemperature fault operation of the controller 75. When the drive 10 is powered (step 476), the controller 75 determines if the power module temperature is too high (step 478), for example, using the overheat prevention operation in FIG. 30. If the power module temperature is not too high, the fault is cleared (step 480) and the controller 75 reverts back to step 476. If the power module temperature is too high, the fault log is updated (step 482), the motor is coasted to a stop and a "Drive Temp—Auto Restart Pending" fault message is displayed (step 484), and a fault timer is incremented (step 486). The controller 75 then continuously determines if the user has pressed the fault reset button 64 (step 488) until the timer has been incremented past a value (step 490). If the user has pressed the fault reset button 64 or if the timer has incremented past the value, the controller 75 proceeds from step 488 or step 490, respectively, to step 492 to check if the fault condition is still present. If the fault condition is still present, the controller 75 reverts back to step 486. If the fault condition is not present, the controller 75 clears the fault (step 480) and reverts back to step 476.

Figure 38:
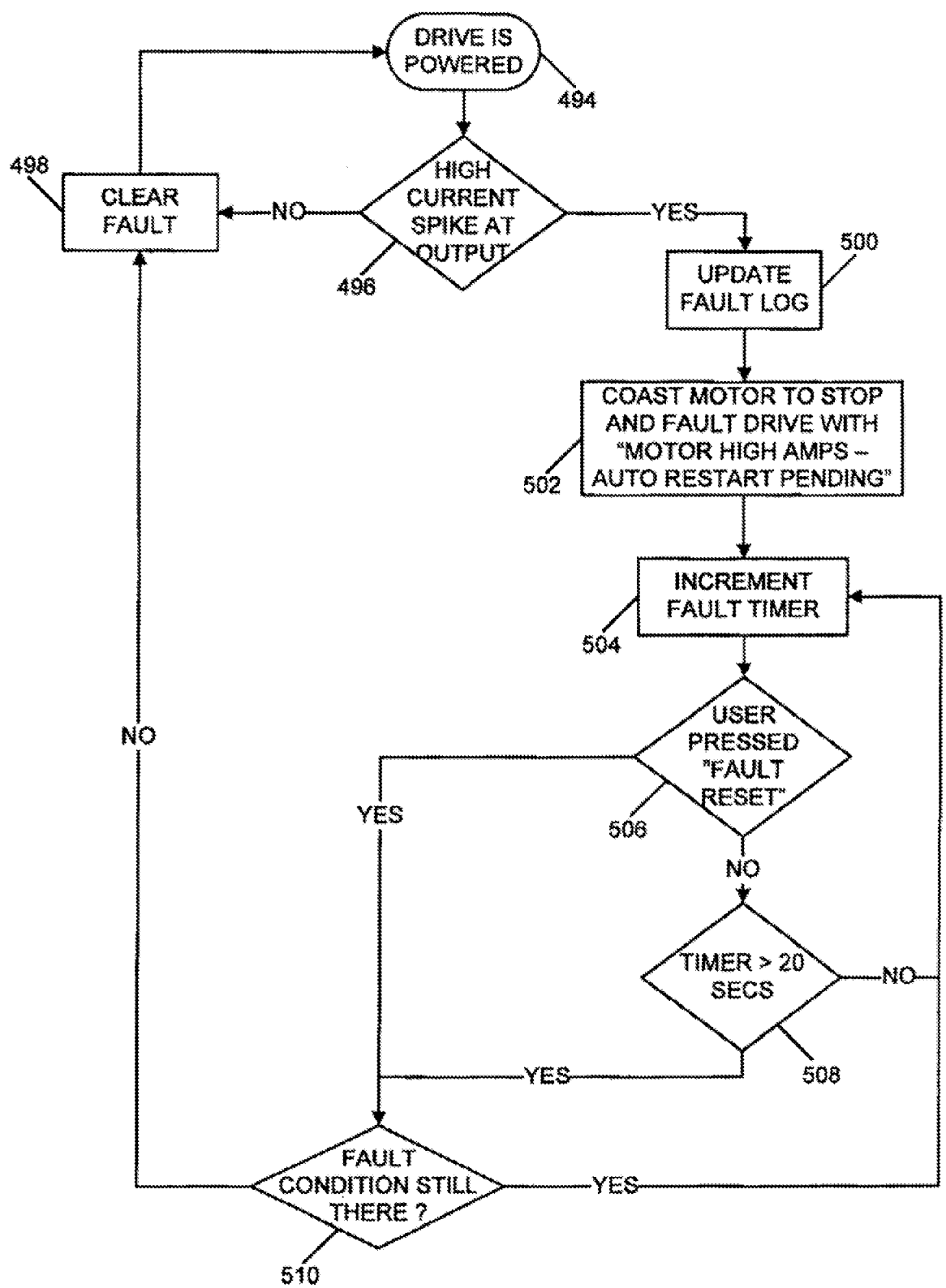
FIG. 38 is a flow chart illustrating an overcurrent fault operation.

The motor 11 and pump 12 combination can satisfy typical performance requirements as specified by the pump manufacturer while maintaining current under service factor amps as specified for the motor 11. Performance can match that of a typical capacitor start/capacitor run control box for each motor HP offering. If the motor 11 performs outside of such specifications, the controller 75 can generate a fault and stop the motor 11. For example, FIG. 38 illustrates an overcurrent fault operation of the controller 75. When the drive 10 is powered (step 494), the controller 75 determines if there is a high current spike (step 496), for example, using the overcurrent prevention operation of FIG. 31. If there is no high current spike, the fault is cleared (step 498) and the controller 75 reverts back to step 494. If there a high current spike, the fault log is updated (step 500), the motor is coasted to a stop and a "Motor High Amps—Auto Restart Pending" fault message is displayed (step 502), and a fault timer is incremented (step 504). The controller 75 then continuously determines if the user has pressed the fault reset button 64 (step 506) until the timer has been incremented past a value (step 508). If the user has pressed the fault reset button 64 or if the timer has incremented past the value, the controller 75 proceeds from step 506 or step 508, respectively, to step 510 to check if the fault condition is still present. If the fault condition is still present, the controller 75 reverts back to step 504. If the fault condition is not present, the controller 75 clears the fault (step 498) and reverts back to step 494.

Figure 39:
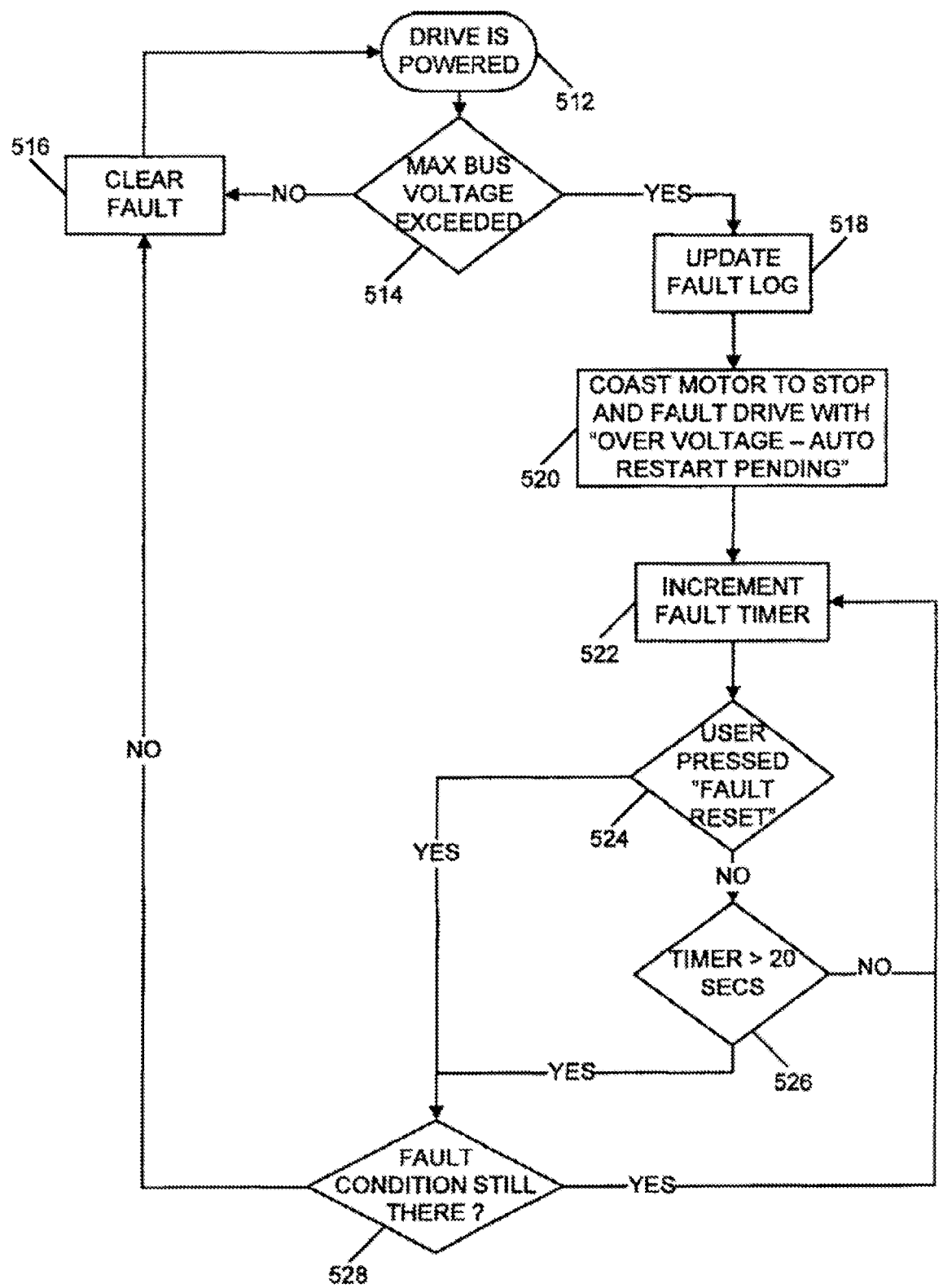
FIG. 39 is a flow chart illustrating an overvoltage fault operation.

FIG. 39 illustrates an overvoltage fault operation of the controller 75. When the drive 10 is powered (step 512), the controller 75 determines if a maximum bus voltage has been exceeded (step 514). If the bus voltage has not exceeded the maximum value, the fault is cleared (step 516) and the controller 75 reverts back to step 512. If the bus voltage has exceeded the maximum value, the fault log is updated (step 518), the motor is coasted to a stop and an "Over Voltage—Auto Restart Pending" fault message is displayed (step 520), and a fault timer is incremented (step 522). The controller 75 then continuously determines if the user has pressed the fault reset button 64 (step 524) until the timer has been incremented past a value (step 526). If the user has pressed the fault reset button 64 or if the timer has incremented past the value, the controller 75 proceeds from step 524 or step 526, respectively, to step 528 to check if the fault condition is still present. If the fault condition is still present, the controller 75 reverts back to step 522. If the fault condition is not present, the controller 75 clears the fault (step 516) and reverts back to step 512.

Figure 40:
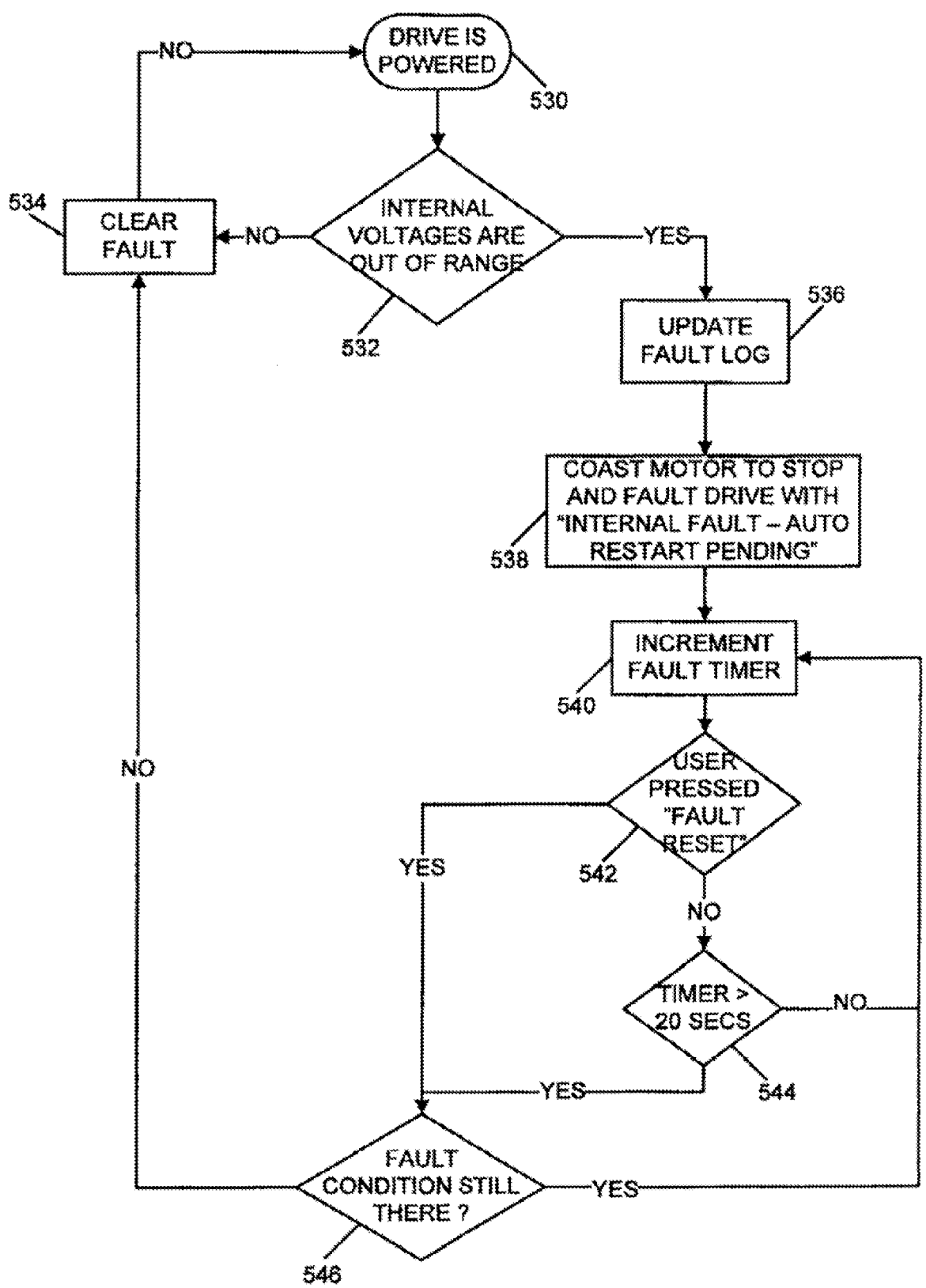
FIG. 40 is a flow chart illustrating an internal fault operation.

FIG. 40 illustrates an internal fault operation of the controller 75. When the drive 10 is powered (step 530), the controller 75 determines if any internal voltages are out of range (step 532). If the internal voltages are not out of range, the fault is cleared (step 534) and the controller 75 reverts back to step 530. If the internal voltages are out of range, the fault log is updated (step 536), the motor is coasted to a stop and an "Internal Fault—Auto Restart Pending" fault message is displayed (step 538), and a fault timer is incremented (step 540). The controller 75 then continuously determines if the user has pressed the fault reset button 64 (step 542) until the timer has been incremented past a value (step 544). If the user has pressed the fault reset button 64 or if the timer has incremented past the value, the controller 75 proceeds from step 542 or step 544, respectively, to step 546 to check if the fault condition is still present. If the fault condition is still present, the controller 75 reverts back to step 540. If the fault condition is not present, the controller 75 clears the fault (step 534) and reverts back to step 530.

Figure 41:
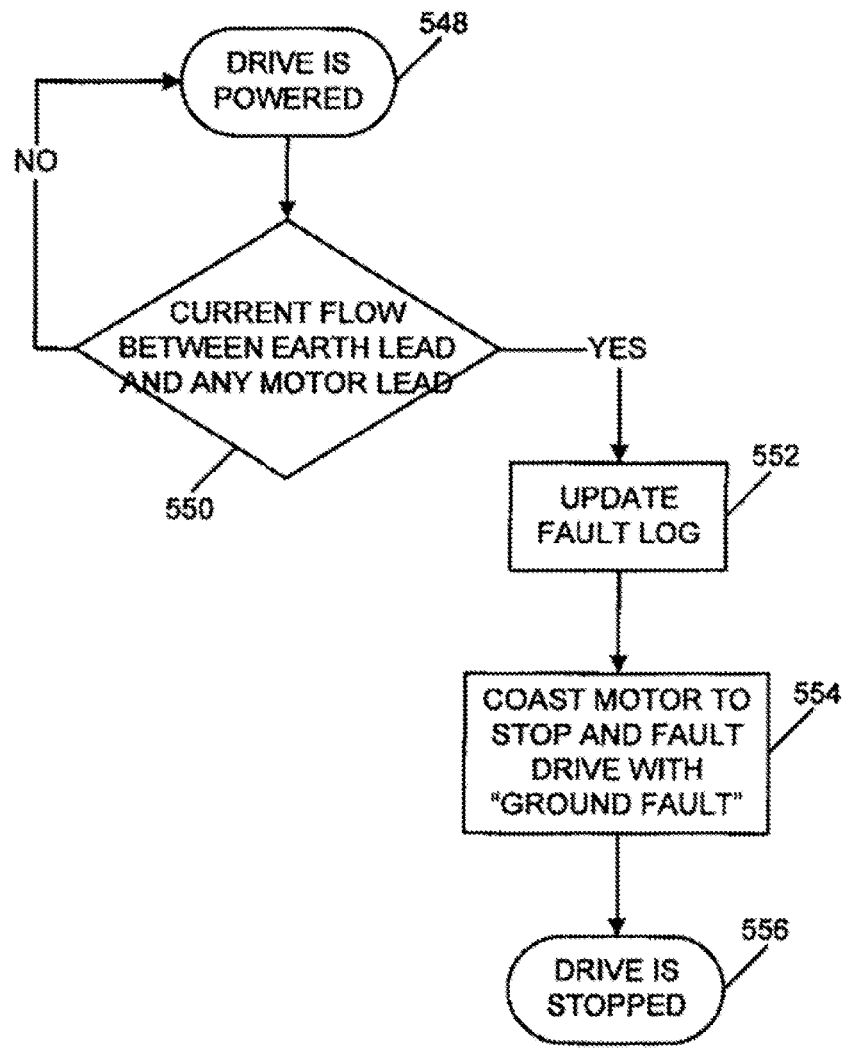
FIG. 41 is a flow chart illustrating a ground fault operation.

FIG. 41 illustrates a ground fault operation of the controller 75. When the drive 10 is powered (step 548), the controller 75 continuously determines if there is current flow between an earth, or ground, lead and any motor lead (step 550). If so, the fault log is updated (step 552), the motor is coasted to a stop and a "Ground Fault" fault message is displayed (step 554), and the drive 10 is stopped (step 556).

Figure 42:
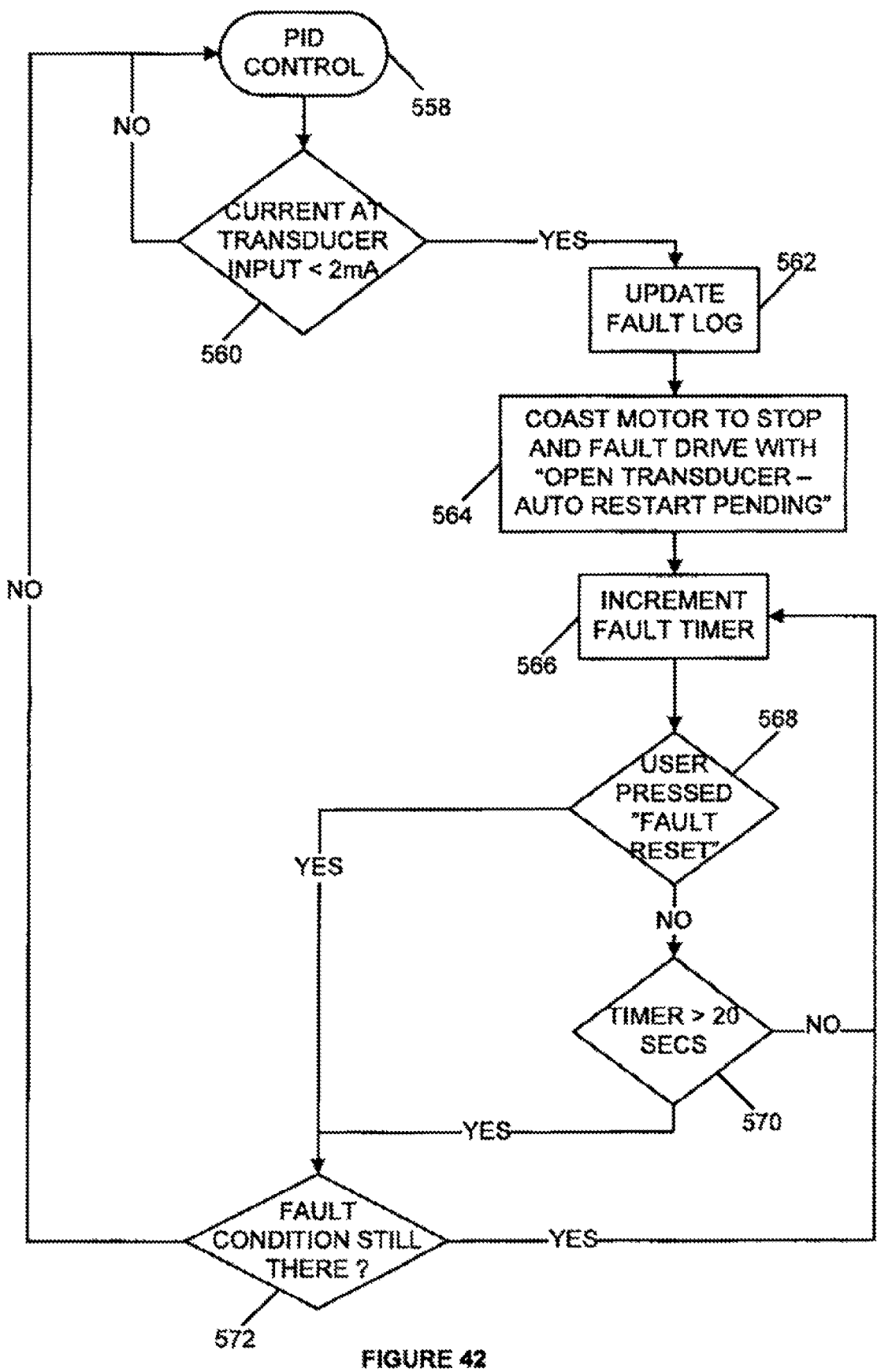
FIG. 42 is a flow chart illustrating an open transducer fault operation.

FIG. 42 illustrates an open transducer fault operation of the controller 75. While in PID mode (step 558), the controller 75 determines if a current measured at the transducer input is less than a value, such as 2 milliamps (step 560). If the current is not less than the value, the controller 75 reverts back to step 558. If the current is less than the value, the fault log is updated (step 562), the motor is coasted to a stop and an "Open Transducer—Auto Restart Pending" fault message is displayed (step 564), and a fault timer is incremented (step 566). The controller 75 then continuously determines if the user has pressed the fault reset button 64 (step 568) until the timer has been incremented past a value (step 570). If the user has pressed the fault reset button 64 or if the timer has incremented past the value, the controller 75 proceeds from step 568 or step 570, respectively, to step 572 to check if the fault condition is still present. If the fault condition is still present, the controller 75 reverts back to step 566. If the fault condition is not present, the controller 75 reverts back to step 558.

Figure 43:
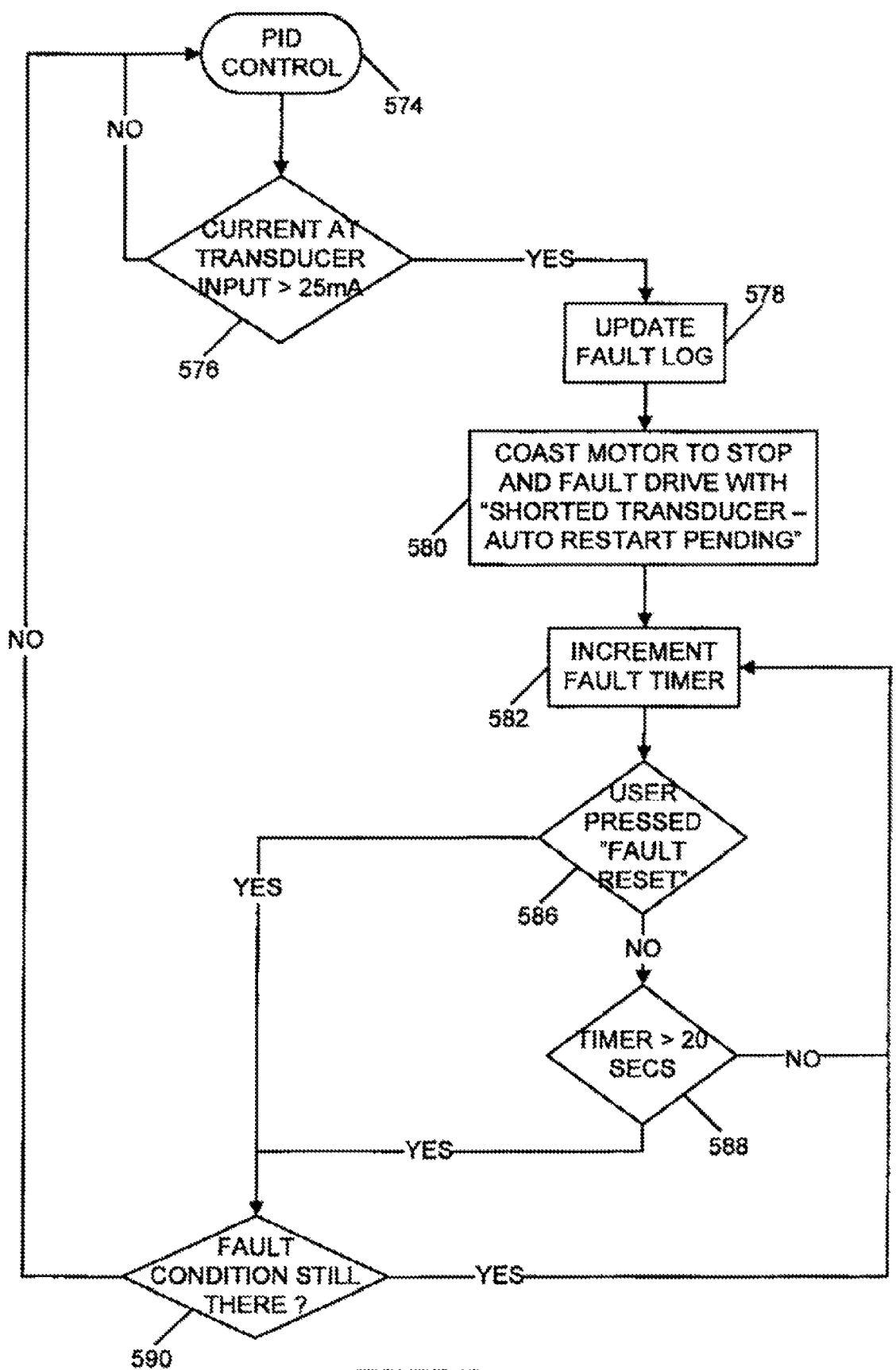
FIG. 43 is a flow chart illustrating a shorted transducer fault operation.

FIG. 43 illustrates a shorted transducer fault operation of the controller 75. While in PID mode (step 574), the controller 75 determines if a current measured at the transducer input is greater than a value, such as 25 milliamps (step 576). If the current is not greater than the value, the controller 75 reverts back to step 574. If the current is greater than the value, the fault log is updated (step 578), the motor is coasted to a stop and a "Shorted Transducer—Auto Restart Pending" fault message is displayed (step 580), and a fault timer is incremented (step 582). The controller 75 then continuously determines if the user has pressed the fault reset button 64 (step 586) until the timer has been incremented past a value (step 588). If the user has pressed the fault reset button 64 or if the timer has incremented past the value, the controller 75 proceeds from step 586 or step 588, respectively, to step 590 to check if the fault condition is still present. If the fault condition is still present, the controller 75 reverts back to step 582. If the fault condition is not present, the controller 75 reverts back to step 574.

FIGS. 44A-44B illustrate a multiple faults operation of the controller 75. Referring to FIG. 44A, when the drive 10 is powered (step 592), the controller 75 continuously determines if a fault has occurred (step 594). If a fault has occurred, a counter is incremented (step 596) and the controller 75 determines if the counter has reached a value, such as ten (step 598). If the counter has reached the value, the motor is coasted to a stop and a "Multiple Faults" fault message is displayed (step 600), and the drive 10 is stopped (step 602). The steps of FIG. 44B serve to provide a time frame for which the counter can reach the value. When the drive 10 is powered (step 592), the controller 75 continuously determines if the counter (i.e., the counter in step 596 of FIG. 44A) has been incremented (step 604). If so, a timer is incremented (step 606). The controller 75 continues to increment the timer as long as the counter is above zero until the timer reaches a value, such as thirty minutes (step 608). Once the timer has reached the value, the counter is decremented and the timer is reset (step 610).

Figure 45:
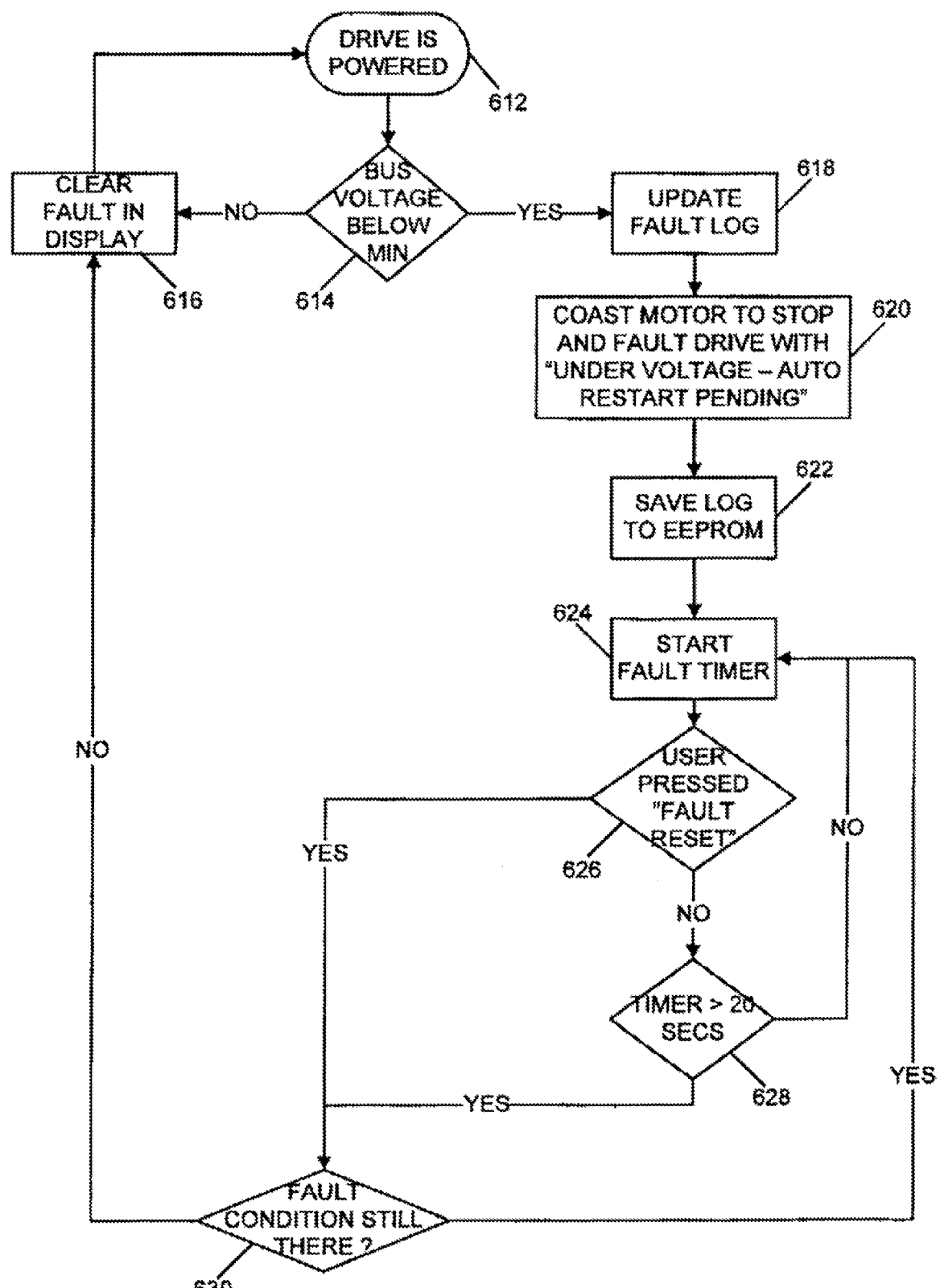
FIG. 45 is a flow chart illustrating an undervoltage fault operation.

FIG. 45 illustrates an undervoltage fault operation of the controller 75. When the drive 10 is powered (step 612), the controller 75 determines if the bus voltage is below a minimum value (step 614). If the bus voltage is not below the minimum value, the fault is cleared (step 616) and the controller 75 reverts back to step 612. If the bus voltage is below the minimum value, the fault log is updated (step 618), the motor is coasted to a stop and an "Under Voltage—Auto Restart Pending" fault message is displayed (step 620), the fault log is saved in memory, such as the device's electrically erasable programmable read-only memory, or EEPROM (step 622) and a fault timer is incremented (step 624). The controller 75 then continuously determines if the user has pressed the fault reset button 64 (step 626) until the timer has been incremented past a value (step 628). If the user has pressed the fault reset button 64 or if the timer has incremented past the value, the controller 75 proceeds from step 626 or step 628, respectively, to step 630 to check if the fault condition is still present. If the fault condition is still present, the controller 75 reverts back to step 624. If the fault condition is not present, the controller 75 clears the fault (step 616) and reverts back to step 612.

Figure 46:
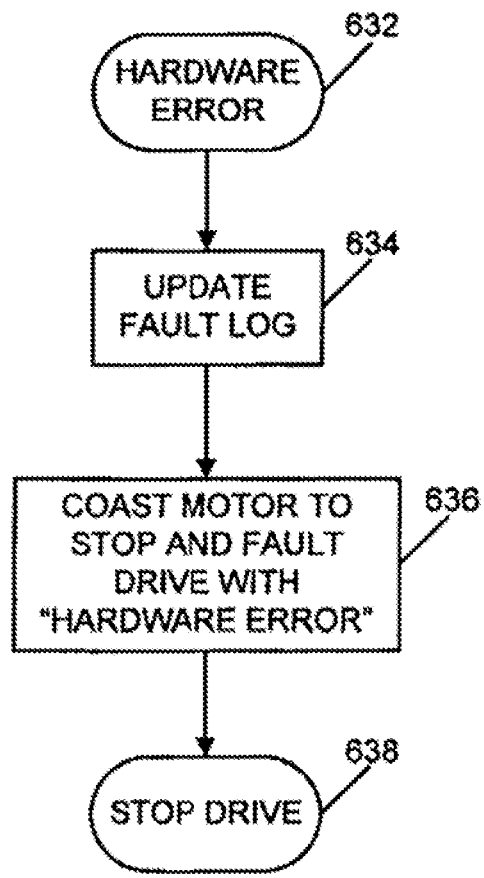
FIG. 46 is a flow chart illustrating a hardware fault operation.

FIG. 46 illustrates a hardware fault operation of the controller 75. When the controller 75 recognizes a hardware error (step 632), the fault log is updated (step 634). After step 634, the motor is coasted to a stop and a "Hardware Error" fault message is displayed (step 636), then the drive 10 is stopped (step 638).

Figure 47:
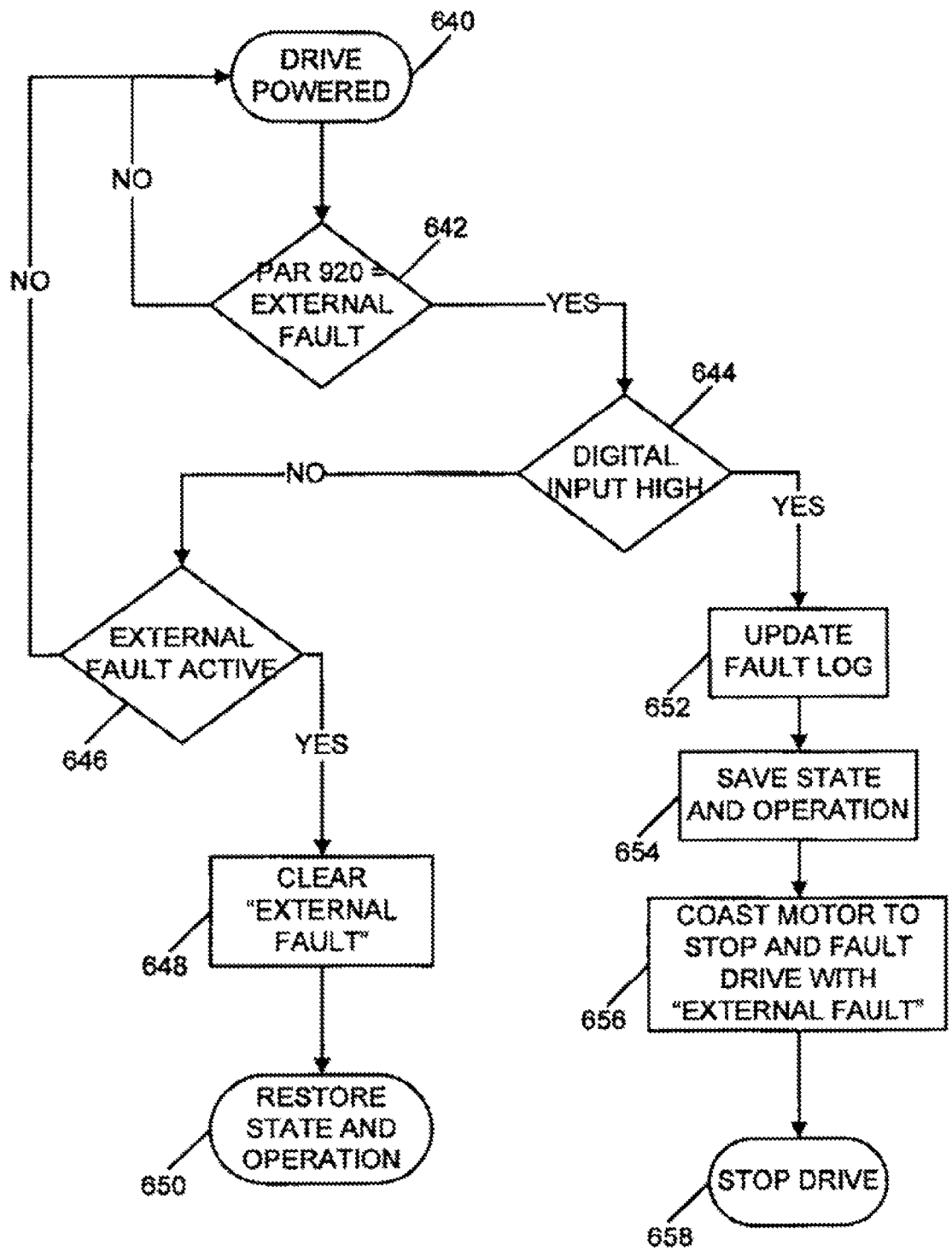
FIG. 47 is a flow chart illustrating an external fault operation.

FIG. 47 illustrates an external fault operation of the controller 75. When the drive 10 is powered (step 640), the controller 75 continuously determines if an external fault parameter is present, for example, from a relay input at the input power terminal block 28 or the digital input/output (I/O) spring terminals 30 (step 642). If so, the controller 75 determines if a digital input is high (step 644). If the digital input is not high, the controller 75 determines if the external fault is active (step 646). If the external fault is not active, the controller 75 reverts back to step 640. If the external fault is active, the controller 75 clears an "external fault" fault message (if it is being displayed) at step 648 and the device's previous state and operation are restored (step 650). If, at step 644, the digital input is high, the fault log is updated (step 652) and the device's current state and operation are saved (step 654). Following step 654, the motor is coasted to a stop and a "External Fault" fault message is displayed (step 656), then the drive 10 is stopped (step 658).

Figure 48:
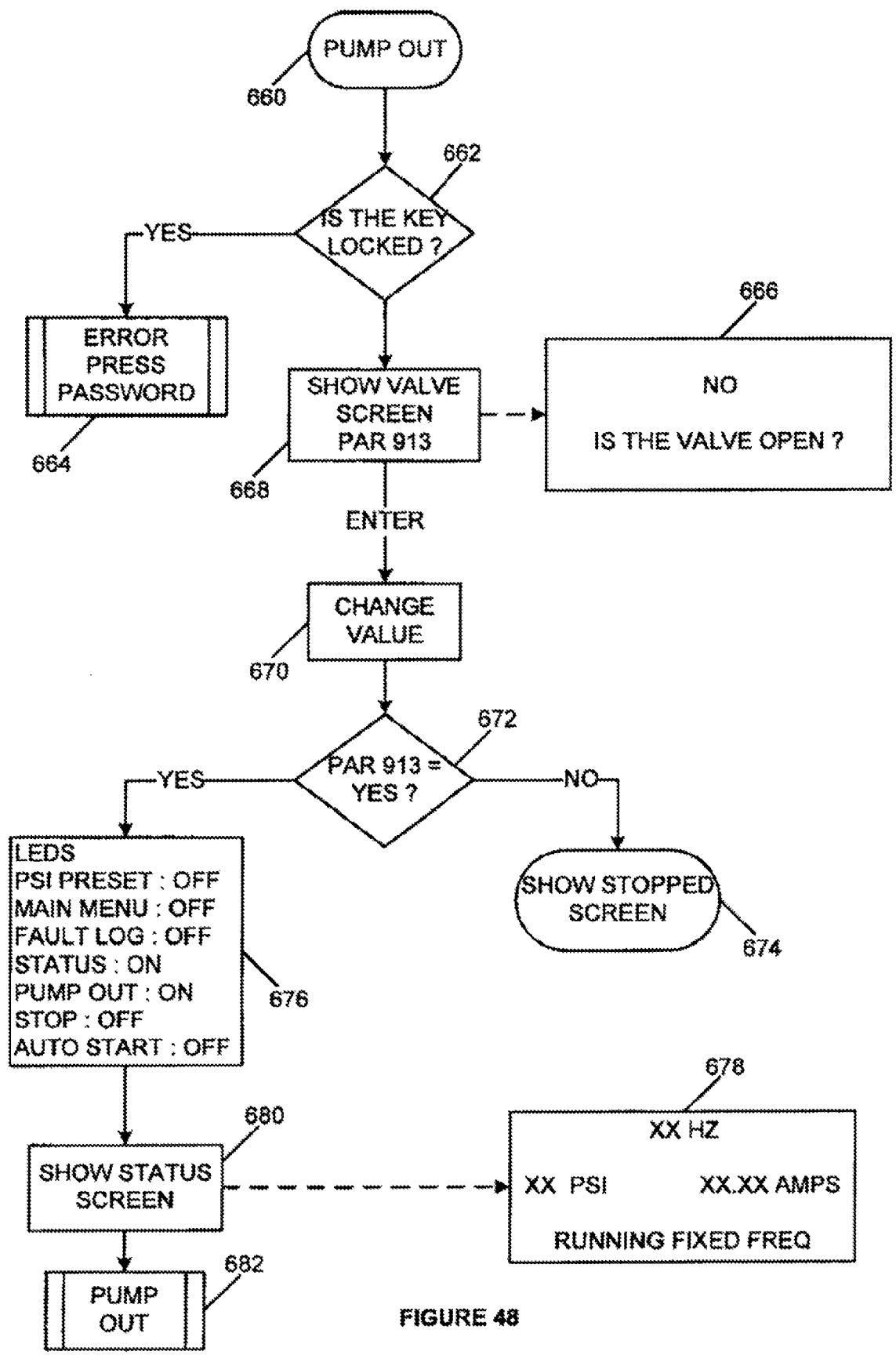
FIG. 48 is a flow chart illustrating a pump out button control operation.

FIGS. 48-63 are flow charts describing control operations for the control pad 14 according to some embodiments of the invention. FIG. 48 illustrates a pump-out button control operation, according to some embodiments. When the pump-out button 40 is pressed (step 660), the controller 75 first determines if the control pad 14 is locked, or in the password protection mode (step 662). If so, the controller 75 executes a keys locked error operation (step 664). If not, a valve screen 666 is displayed (step 668) asking the user if a valve is open. Once the user chooses if the valve is open or not and presses enter, a valve parameter value is changed (step 670). The controller 75 then determines, at step 672, if the valve parameter value is yes (i.e., if the valve is open). If the valve parameter is not yes (i.e., if the user selected that the valve was not open), a stopped screen is displayed (step 674), indicating that the pump 12 is stopped. If the valve parameter is yes, the controller 75 sets LED indicators 66 on or off accordingly (step 676), displays a status screen 678 (step 680), and runs the pump out operation to drive the motor 11 in the pump out mode (step 682). The status screen 678 can include information about the pump 12, such as motor frequency, pressure, and motor current during the pump out mode.

Figure 49:
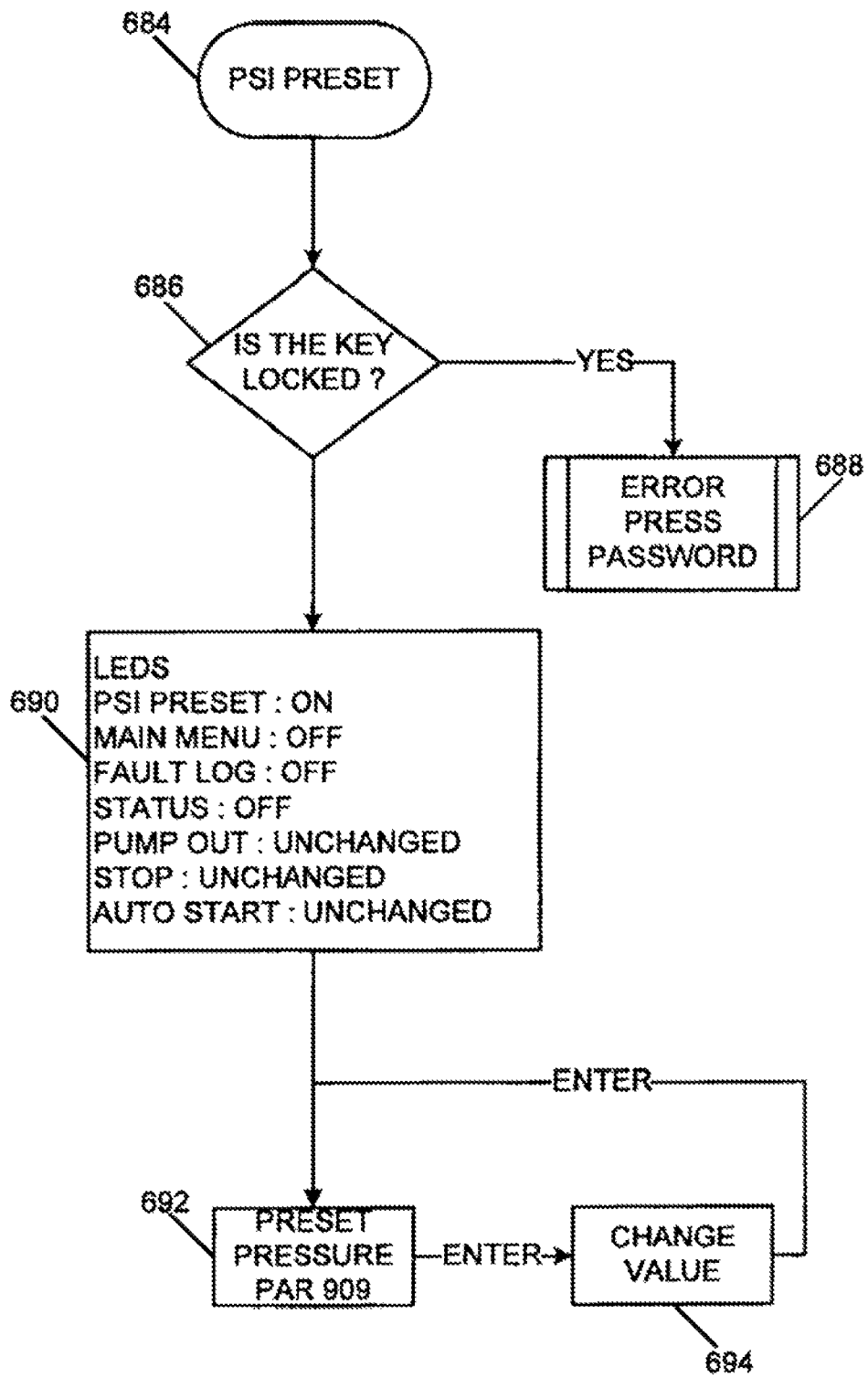
FIG. 49 is a flow chart illustrating a pressure preset button control operation.

FIG. 49 illustrates a pressure preset button control operation, according to some embodiments. When the pressure preset button 42 is pressed (step 684), the controller 75 first determines if the control pad 14 is locked (step 686). If so, the controller 75 executes a keys locked error operation (step 688). If the control pad 14 is not locked, the controller 75 sets the LED indicators 66 on or off accordingly (step 690) and a preset pressure parameter is displayed (step 692). The user can adjust the displayed pressure parameter using the keypad and hit enter to change the value of the preset pressure parameter, changing the pressure set point for the controller 75 (step 694).

Figure 50:
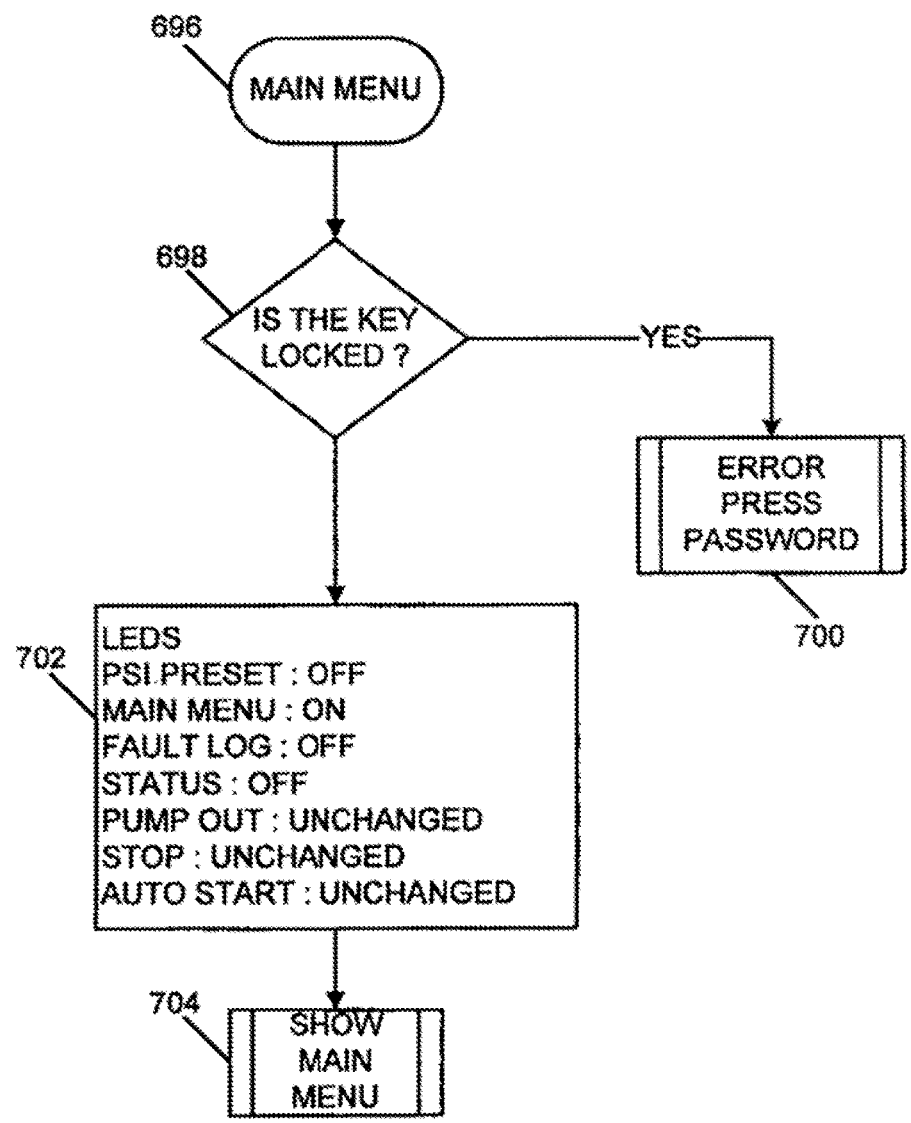
FIG. 50 is a flow chart illustrating a main menu button control operation.

FIG. 50 illustrates a main menu button control operation, according to some embodiments. When the main menu button 44 is pressed (step 696), the controller 75 first determines if the control pad 14 is locked (step 698). If so, the controller 75 executes a keys locked error operation (step 700). If the control pad 14 is not locked, the controller 75 sets the LED indicators 66 on or off accordingly (step 702) and the main menu, as described with respect to FIG. 16, is displayed (step 704).

Figure 51:
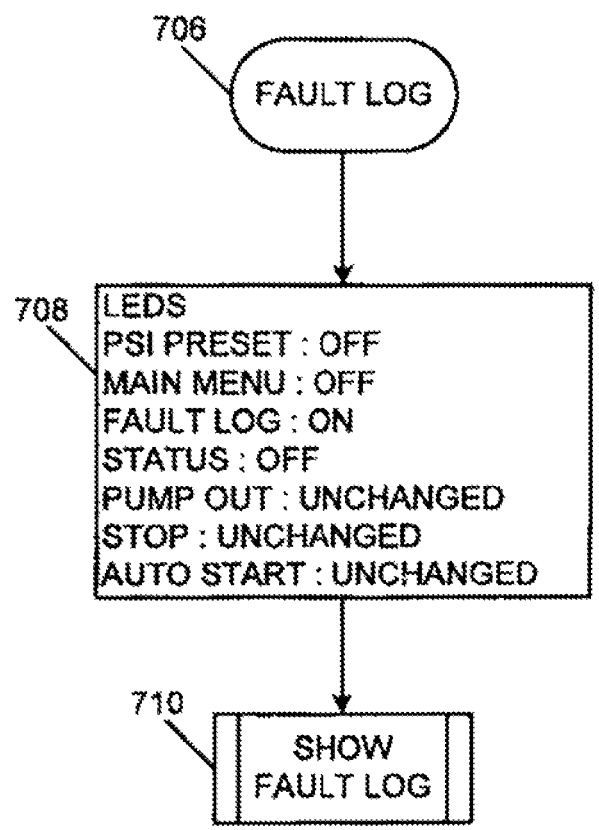
FIG. 51 is a flow chart illustrating a fault log button control operation.

FIG. 51 illustrates a fault log button control operation, according to some embodiments. When the fault log button 46 is pressed (step 706), the controller 75 sets the LED indicators 66 on or off accordingly (step 708) and the fault log is displayed, detailing fault history information to the user (step 710).

Figure 52:
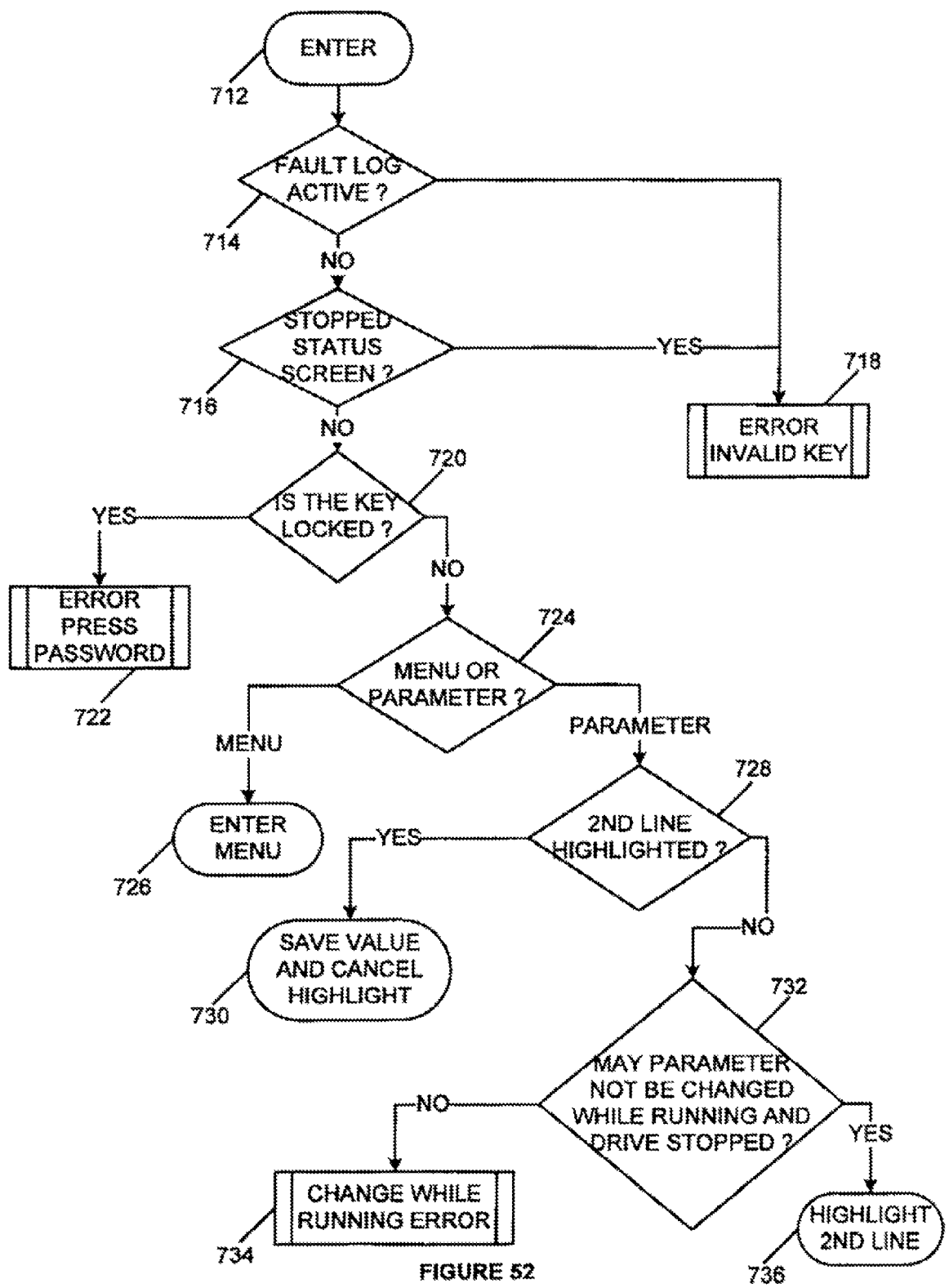
FIG. 52 is a flow chart illustrating an enter button control operation.

FIG. 52 illustrates an enter button control operation, according to some embodiments. When the enter button 56 is pressed (step 712), the controller 75 first determines if the fault log is active (e.g., being displayed) at step 714 or if the stopped status screen is being displayed (step 716). If either step 714 or step 716 is true, the controller 75 executes an invalid key error operation (step 718). If neither the fault log or stopped status screen are being displayed, the controller 75 determines if the control pad 14 is locked (step 720). If so, the controller 75 executes a keys locked error operation (step 722). If the control pad 14 is not locked, the controller 75 determines if the display currently selecting a menu option or a parameter (step 724). If the display is currently selecting a menu option, the controller 75 will enter the selected menu (step 726). If the display is currently selecting a parameter option, the controller 75 determines if the parameter is highlighted (step 728). If the parameter is highlighted, the controller 75 saves the value of the selected parameter and cancels the highlighting of the parameter (step 730). If, at step 728, the parameter is not highlighted, the controller 75 determines if the parameter can be changed with the motor is running and the drive 10 is stopped (step 732). If not, a running error operation is executed (step 734). If the parameter may be changed, then the selected parameter is highlighted (step 736).

Figure 53:
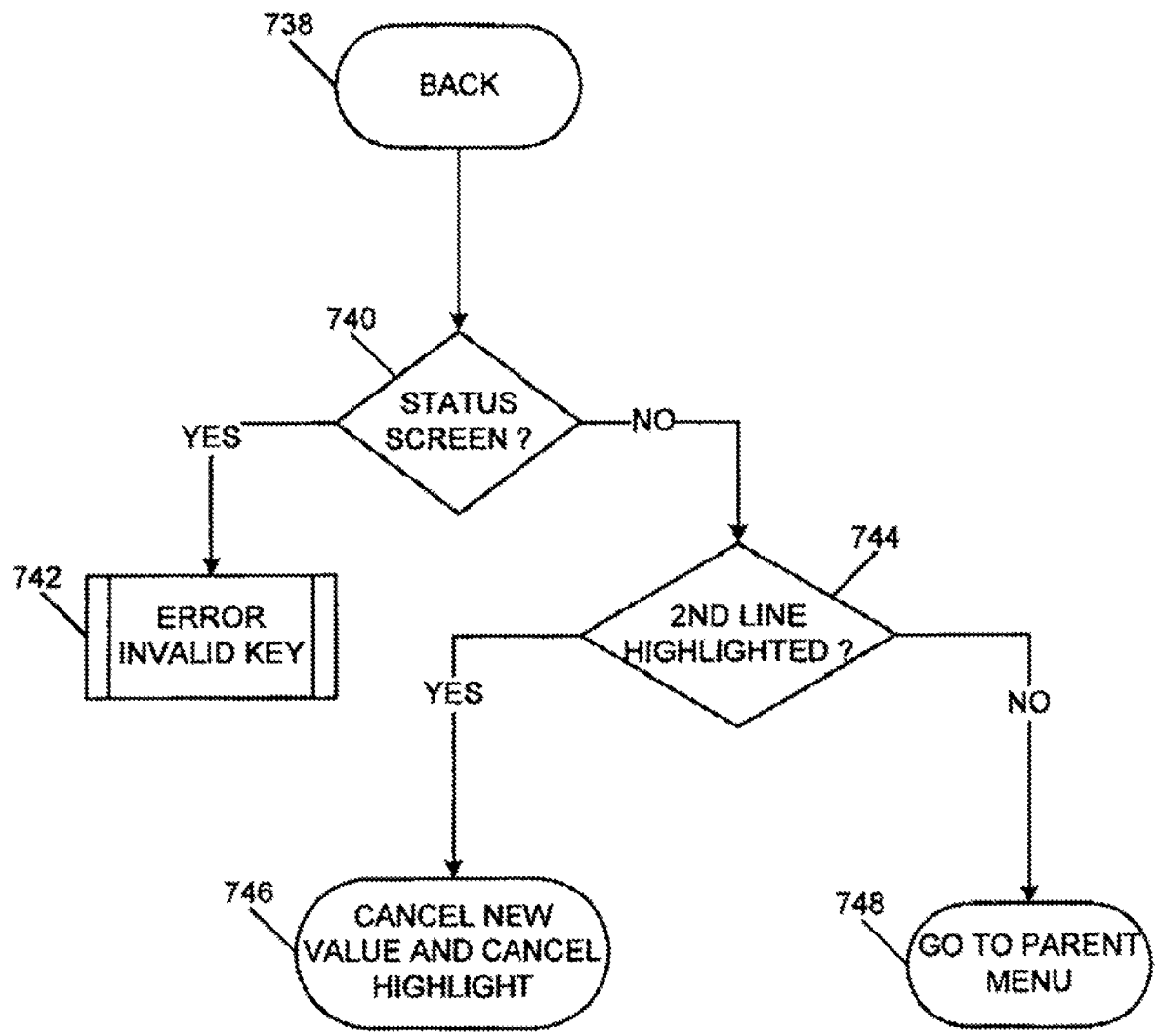
FIG. 53 is a flow chart illustrating a back button control operation.

FIG. 53 illustrates a back button control operation, according to some embodiments. When the back button 54 is pressed (step 738), the controller 75 determines if a status screen is being displayed (step 740). If so, an invalid key error operation is executed (step 742). If a status screen is not being displayed, the controller 75 determines if a line in the display is highlighted (step 744). If so, the new value on the highlighted line is cancelled and the highlighting is cancelled as well (step 746). If, at step 744, there is no highlighted line, the parent, or previous, menu is displayed (step 748).

Figure 54:
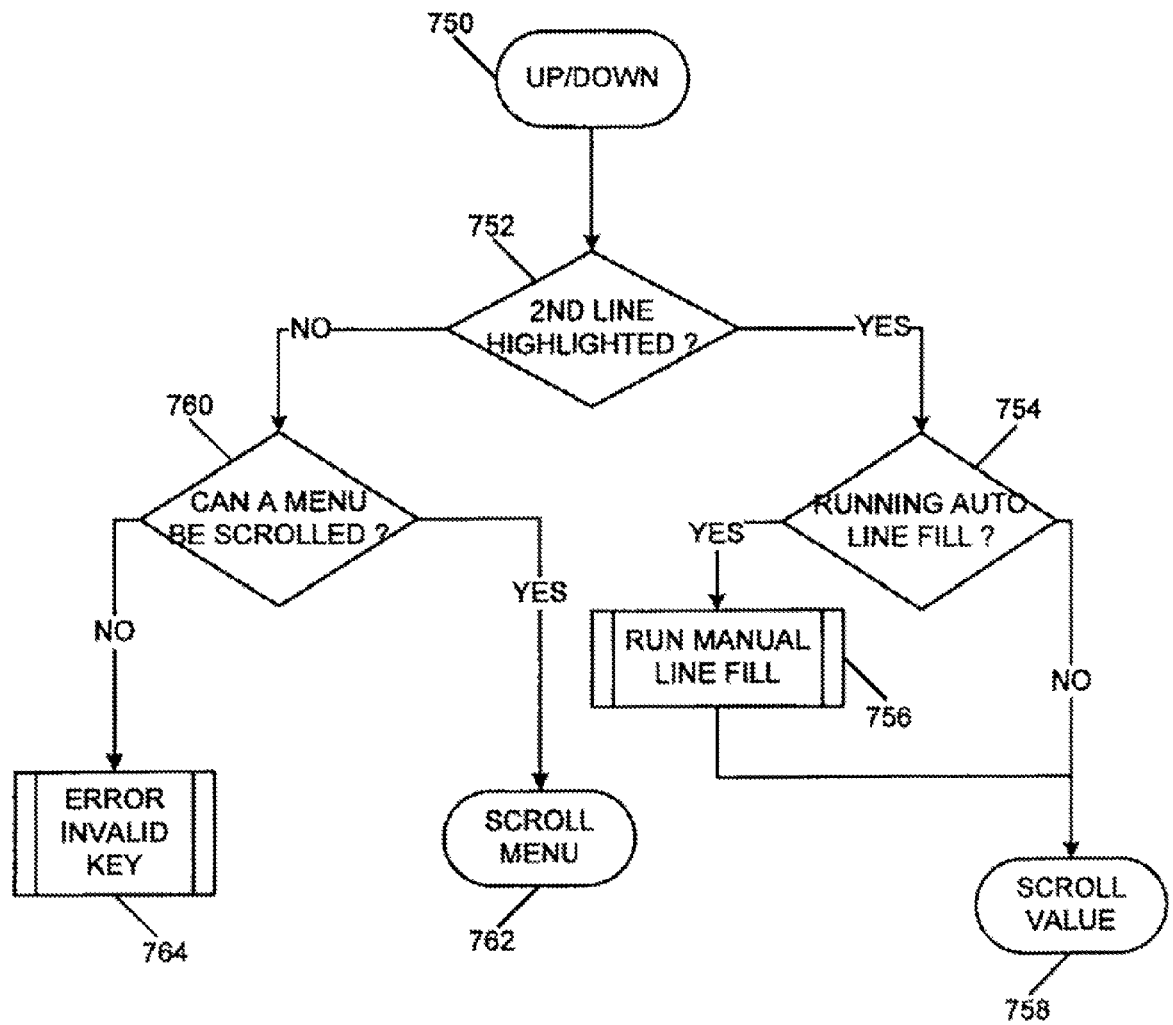
FIG. 54 is a flow chart illustrating an up/down button control operation.

FIG. 54 illustrates an up/down button control operation, according to some embodiments. When either the up or down directional button 52 is pressed (step 750), the controller 75 determines if a line in the display is highlighted (step 752). If so, the controller 75 then determines if the auto line fill operation is being executed (step 754). If so, the controller 75 proceeds to the manual line fill operation (step 756), as described with reference to FIG. 9, then scrolls to another value in the display (step 758). If the controller 75 determines that the auto line fill operation is not being executed at step 754, the controller 75 proceeds to step 758 and scrolls to another value in the display. If, at step 752, the controller 75 determines that no line is highlighted, the controller 75 then determines if a menu in the display can be scrolled (step 760). If so, the menu is scrolled (step 762). If not, an invalid key error operation is executed (step 764).

Figure 55:
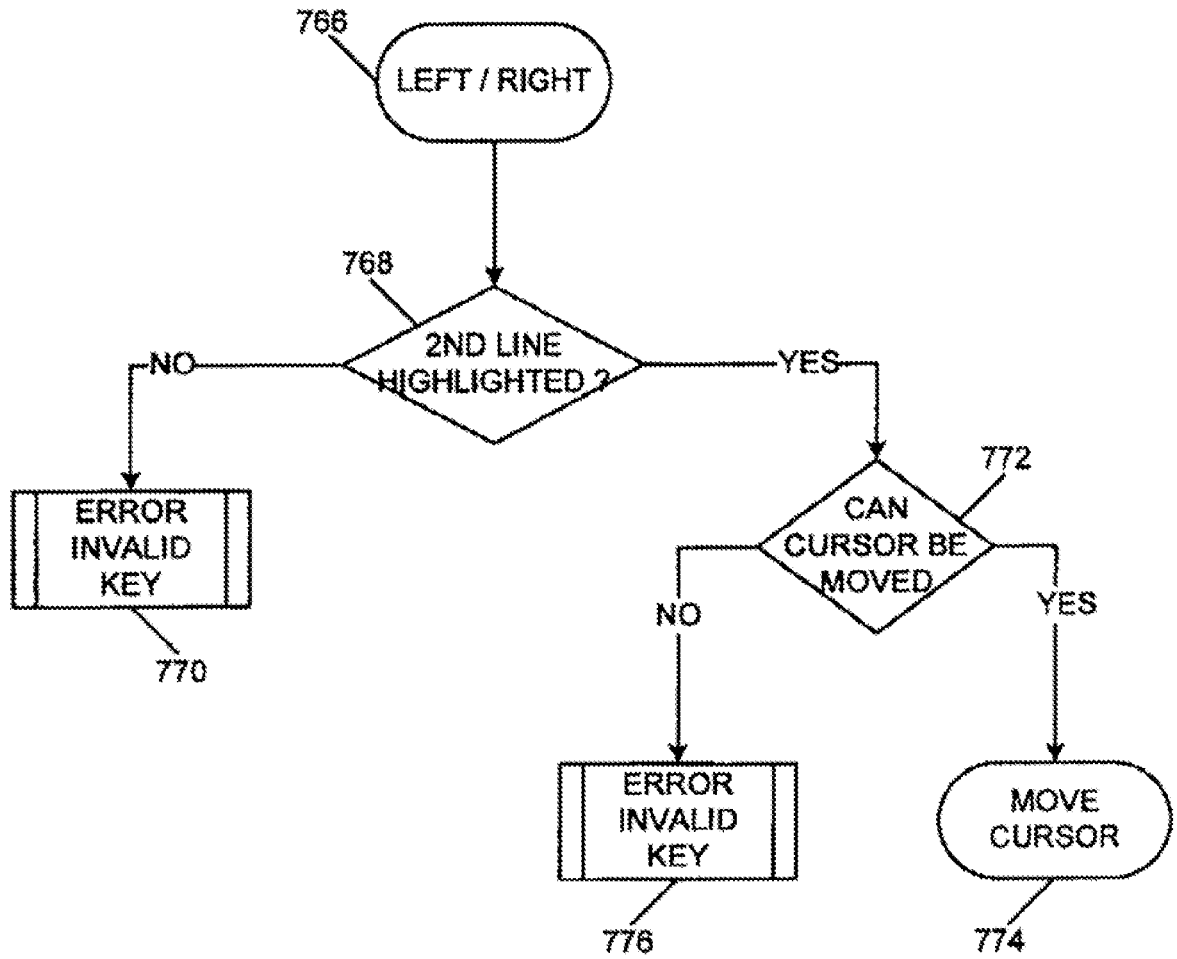
FIG. 55 is a flow chart illustrating a left/right button control operation.

FIG. 55 illustrates a left/right button control operation, according to some embodiments. When either the left or right directional button 52 is pressed (step 766), the controller 75 determines if a line in the display is highlighted (step 768). If not, an invalid key error operation is executed (step 770). If, at step 768, the controller 75 determines that the line is highlighted, the controller 75 then determines if a curser in the display can be moved (step 772). If so, the curser is moved (step 774). If not, an invalid key error operation is executed (step 776).

Figure 56:
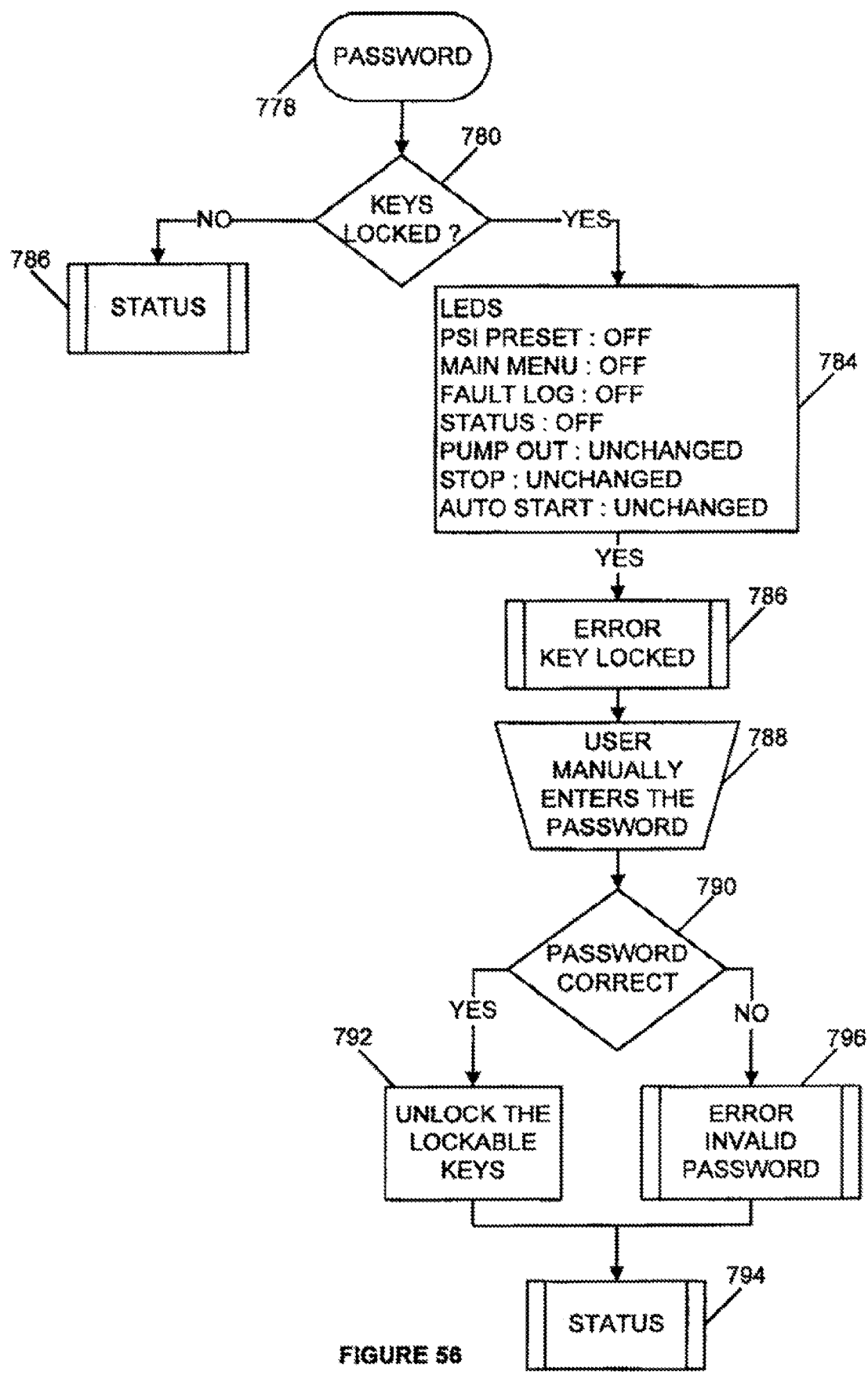
FIG. 56 is a flow chart illustrating a password button control operation.

FIG. 56 illustrates a password button control operation, according to some embodiments. When the password button 48 is pressed (step 778), the controller 75 first determines if the control pad 14 is locked (step 780). If not, a status screen is displayed (step 782). If the control pad 14 is locked, the controller 75 sets the LED indicators 66 on or off accordingly (step 784) and executes a keys locked error operation (step 786). If a user then enters a password (step 788), the controller 75 determines if the password is correct (step 790). If the password is correct, any lockable keys are unlocked (step 792) and the status screen is displayed (step 794). If the password is incorrect, an invalid password error operation is executed (step 796), then the status screen is displayed (step 794). In some embodiments, the lockable keys can include the directional buttons 52, the language button 50, the pump-out button 40, the pressure preset button 42, and/or the main menu button 44.

Figure 57:
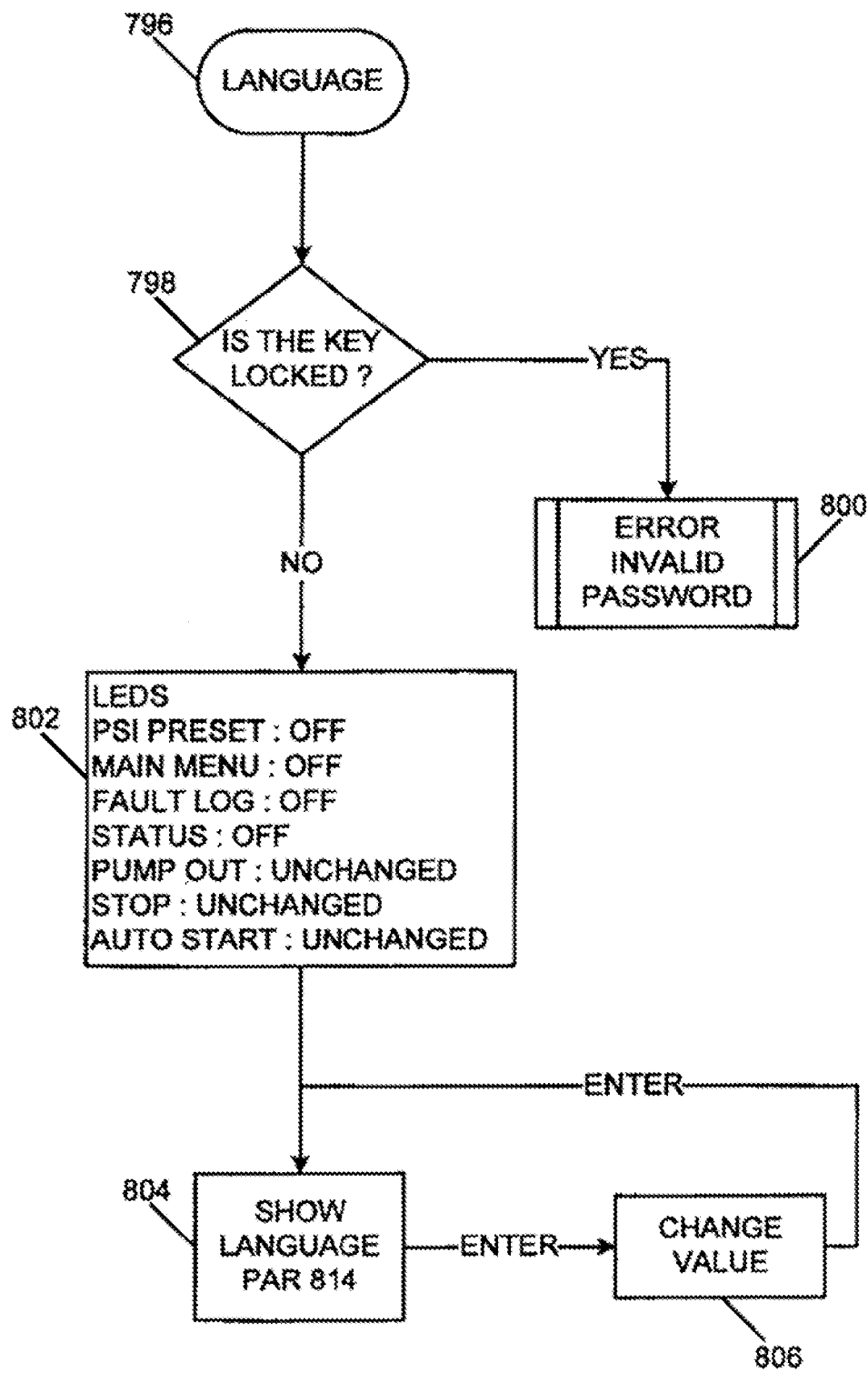
FIG. 57 is a flow chart illustrating a language button control operation.

FIG. 57 illustrates a language button control operation, according to some embodiments. When the language button 50 is pressed (step 796), the controller 75 first determines if the control pad 14 is locked (step 798). If so, the controller 75 executes a keys locked error operation (step 800). If the control pad 14 is not locked, the controller 75 sets the LED indicators 66 on or off accordingly (step 802) and a language parameter is displayed (step 804). The user can change the displayed language using the keypad and hit enter to update the language parameter (step 806).

Figure 58:
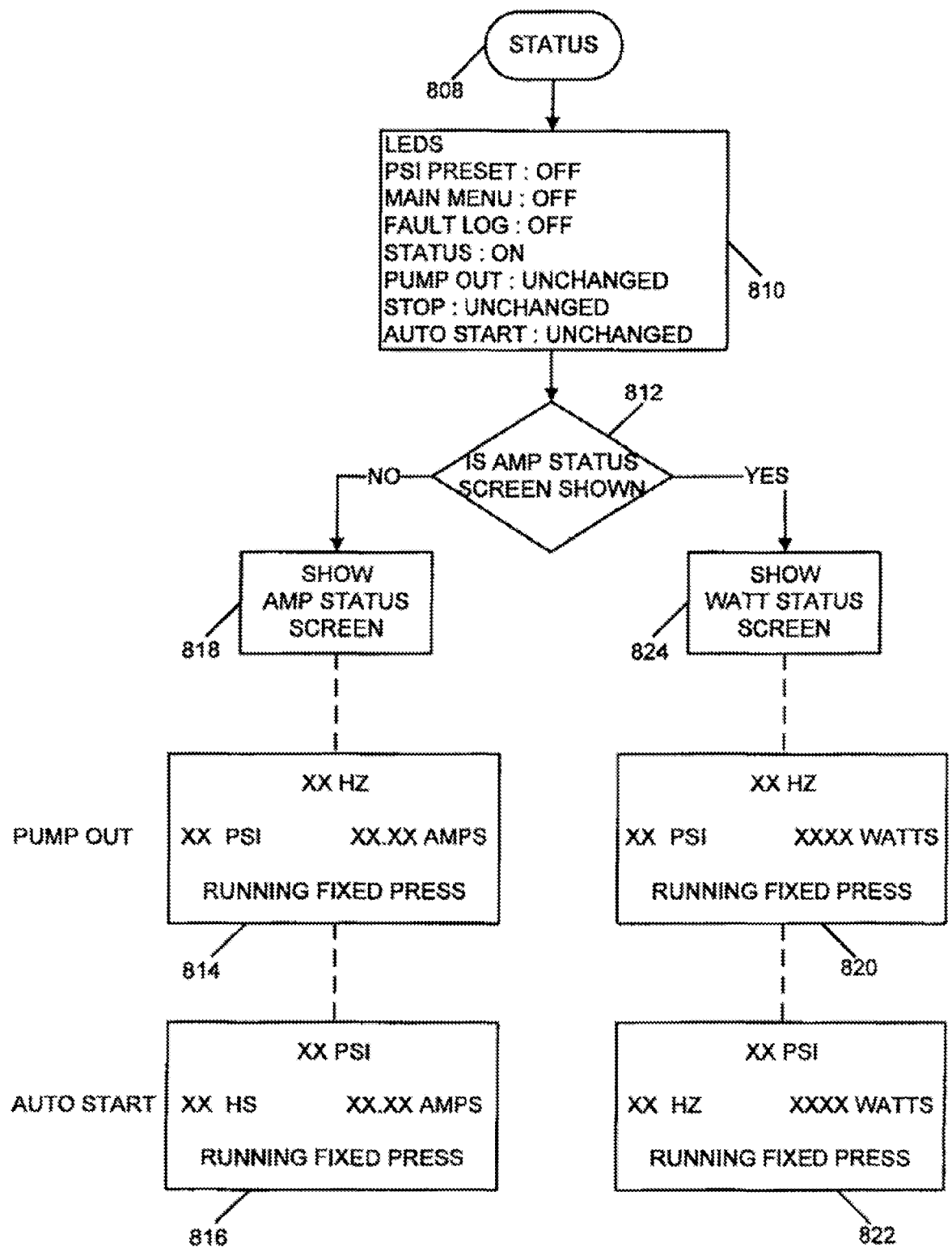
FIG. 58 is a flow chart illustrating a status button control operation.

FIG. 58 illustrates a status button control operation, according to some embodiments. When the status button 58 is pressed (step 808), the controller 75 sets the LED indicators 66 on or off accordingly (step 810) and determines if a current status screen is being displayed (step 812). If not, the current status screen 814 or 816 is displayed (step 818). If the controller 75, at step 812, determines that the current status screen is being displayed, the currents status screen is cleared and a power status screen 820 or 822 is displayed (step 824).

Figure 59:
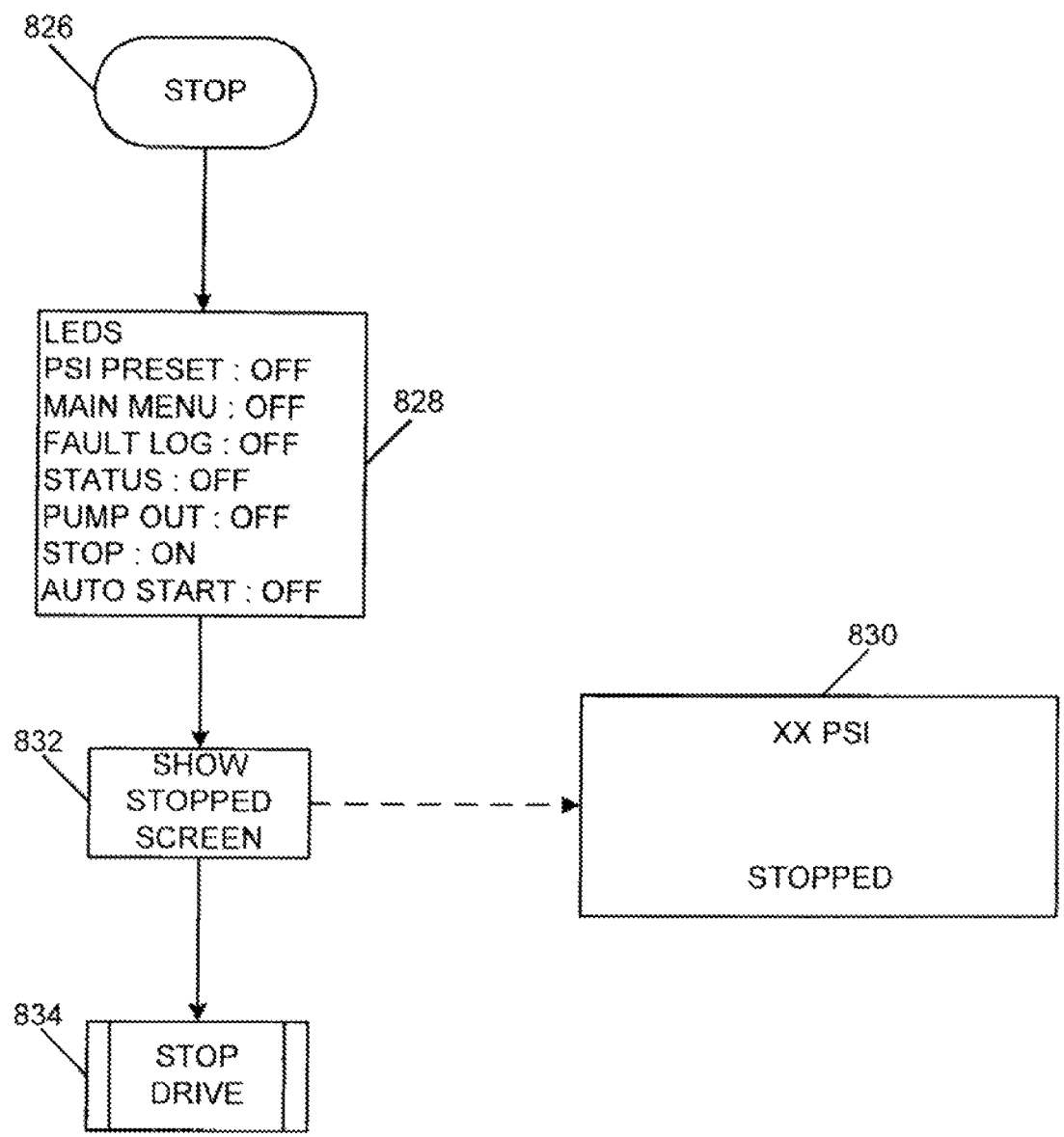
FIG. 59 is a flow chart illustrating a stop button control operation.

FIG. 59 illustrates a stop button control operation, according to some embodiments. When the stop button 60 is pressed (step 826), the controller 75 sets the LED indicators 66 on or off accordingly (step 828) and a stopped status screen 830 is displayed (step 832). The controller 75 then stops the drive 10 (step 834), as described with reference to FIG. 10.

Figure 60:
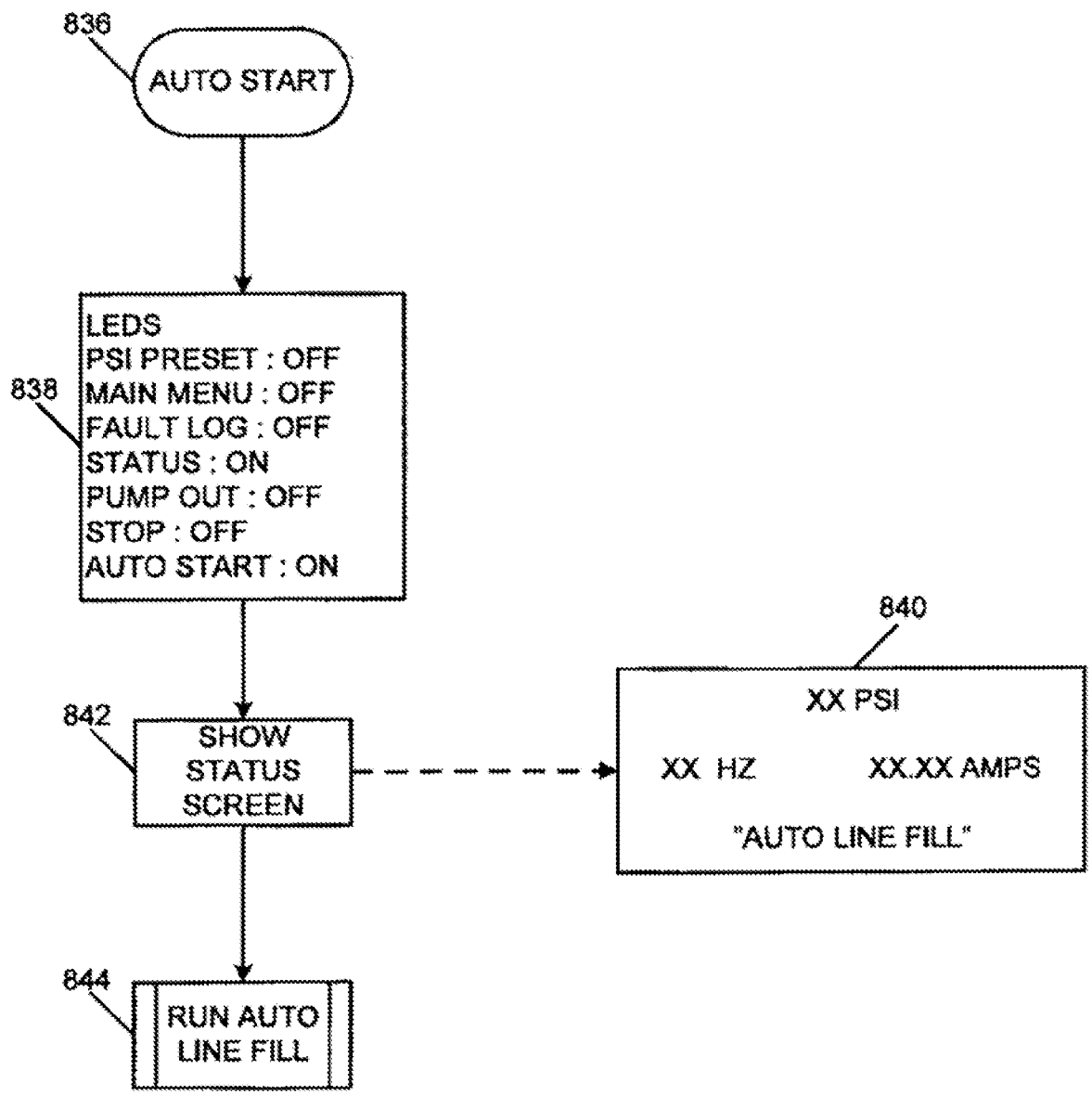
FIG. 60 is a flow chart illustrating an automatic start button control operation.

FIG. 60 illustrates an automatic start button control operation, according to some embodiments. When the automatic start button 62 is pressed (step 836), the controller 75 sets the LED indicators 66 on or off accordingly (step 838) and a status screen 840 is displayed (step 842). The controller 75 then runs the automatic line fill operation (step 844), as described with reference to FIG. 8.

Figure 61:
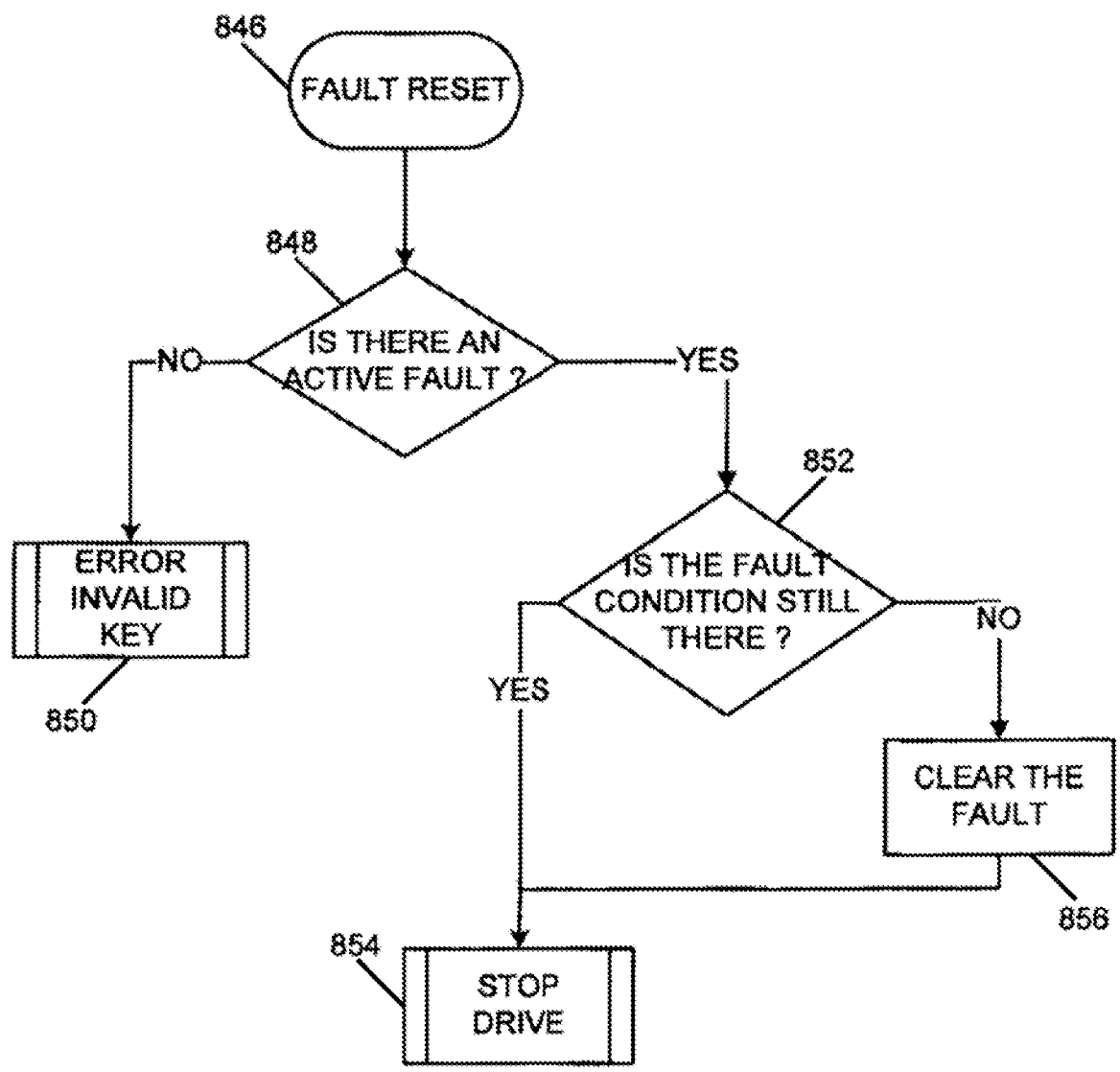
FIG. 61 is a flow chart illustrating a fault reset button control operation.

FIG. 61 illustrates a fault reset button control operation, according to some embodiments. When the fault reset button 64 is pressed (step 846), the controller 75 determines if there is an active fault (step 848). If not, the controller 75 executes an invalid key error operation (step 850). If there is an active fault, the controller 75 determines if the fault condition is still present (step 852). If so, the controller 75 stops the drive 10 (step 854), as described with reference to FIG. 10. If not, the controller 75 first clears the fault (step 856), then stops the drive 10 (step 854).

Figures 62A, 62B, 62C, 62D:
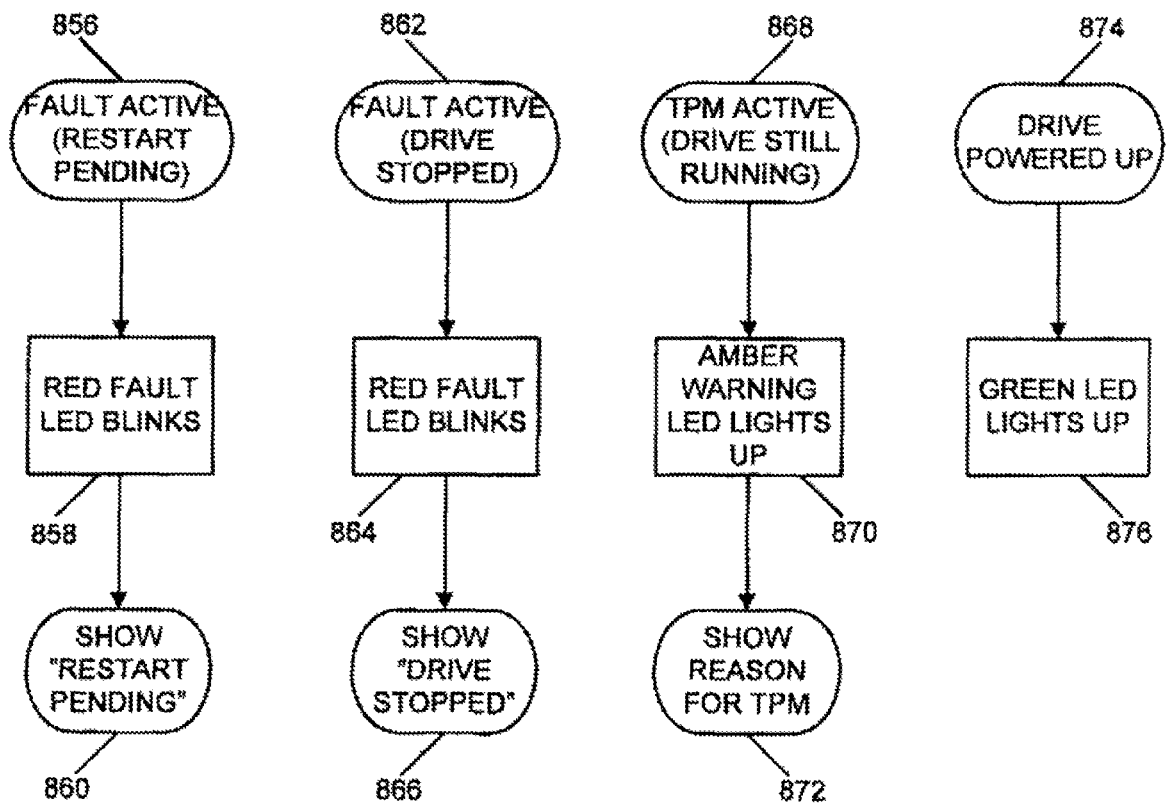
FIGS. 62A-62D are flow charts illustrating LED indicator control operations.

FIGS. 62A-62D illustrate LED indicator control operations, according to some embodiments. As shown in FIG. 62A, if a fault is active and a restart is pending (step 856), the Fault LED 72 blinks (step 858), and a "Restart Pending" message is displayed (step 860). As shown in FIG. 62B, if a fault is active and the drive 10 is stopped (step 862), the Fault LED 72 blinks (step 864), and a "Drive Stopped" message is displayed (step 866). As shown in FIG. 62C, if a TPM is active and the drive 10 is still running (step 868), the Warning LED 70 is lit (step 870), and a message is displayed describing the warning (step 872). As shown in FIG. 62D, when the drive 10 is powered up (step 874), the ON LED 68 is lit (step 876).

Figure 63A:
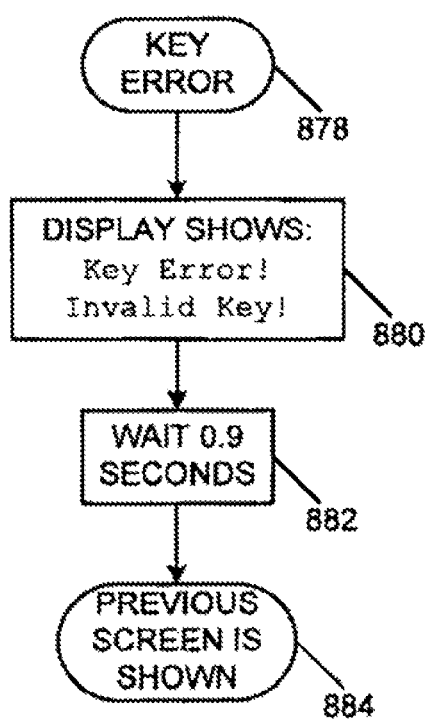
FIGS. 63A-63D are flow charts illustrating error display control operations.
Figure 63B:
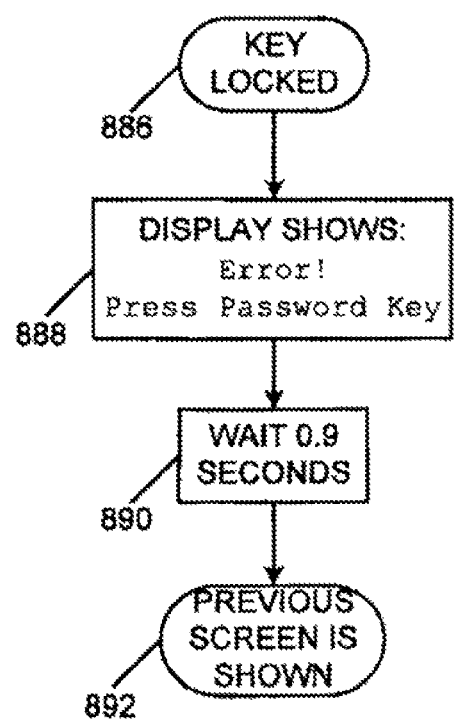
Figure 63C:
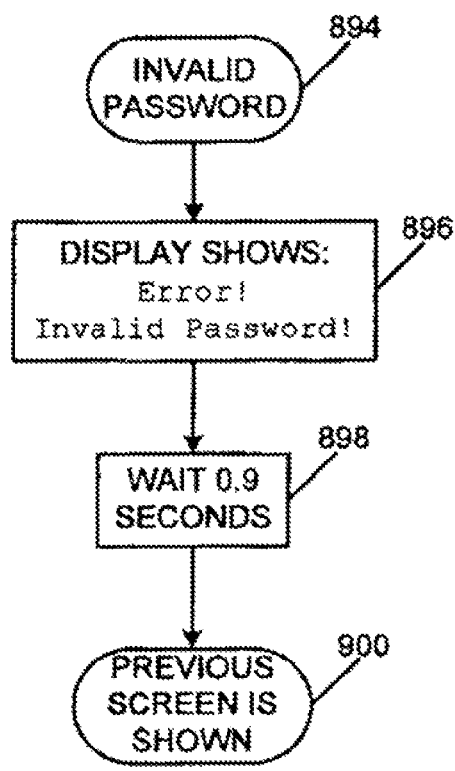
Figure 63D:
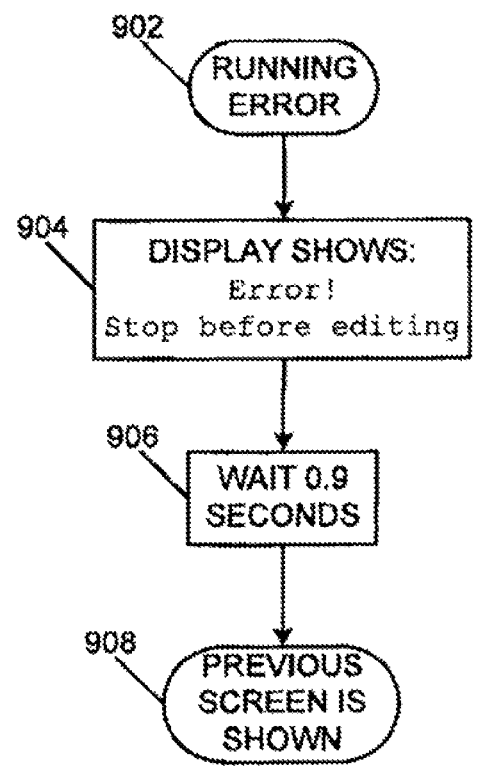

FIGS. 63A-63D illustrate error display control operations, according to some embodiments. As shown in FIG. 63A, for the invalid key error operation (step 878), a "Key Error!Invalid Key!" error screen can be displayed (step 880). The controller 75 can display the error screen for a time period, such as 0.9 seconds (step 882), then return the display to the previous screen (step 884). As shown in FIG. 63B, for the keys locked error operation (step 886), an "Error!Press Password Key" error screen can be displayed (step 888). The controller 75 can display the error screen for a time period, such as 0.9 seconds (step 890), then return the display to the previous screen (step 892). As shown in FIG. 63C, for the invalid password error operation (step 894), an "Error!Invalid Password!" error screen can be displayed (step 896). The controller 75 can display the error screen for a time period, such as 0.9 seconds (step 898), then return the display to the previous screen (step 900). As shown in FIG. 63D, for the running error operation (step 902), an "Error!Stop before editing" error screen can be displayed (step 904). The controller 75 can display the error screen for a time period, such as 0.9 seconds (step 906), then return the display to the previous screen (step 908).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of controlling, a pump driven by a motor, the pump and the motor installed in a well, the motor connected to a variable frequency drive, the method comprising:
    connecting the variable frequency drive to a previously-installed motor in order to retrofit the motor;
    selecting, via a control pad, a motor connection type for the previously-installed motor wherein the selecting of the motor connection type includes selecting a motor connection type from a plurality of different motor connection types including a two-wire, single phase motor or a three-wire, single phase motor;
    automatically setting a minimum frequency and a maximum frequency output from the variable frequency drive to the motor based on the motor connection type selected via the control pad; and
    generating with the drive a first waveform and a second waveform, the second waveform having a phase angle of about 90 degrees offset from the first waveform in order to control the three-wire, single-phase motor, where the motor is indicated to be the three-wire, single phase motor.

2. The method of claim 1 wherein the two-wire, single phase motor is a permanent split capacitor motor.

3. The method of claim 1, further including:
    entering a service factor current value using the control pad;
    entering a current time using the control pad;
    entering a current date using the control pad; and
    engaging one of a pump-out button and an automatic start button on the control pad.

4. The method of claim 1, further comprising:
    reducing electrical noise generated by the motor by adding an electromagnetic interference (EMI) filter to the drive such that the drive is simultaneously compatible with a Ground Fault Circuit Interrupter (GFCI).

5. The method of claim 1, further comprising:
    engaging a pump-out button of the control pad to enable the drive to enter a pump-out mode for discharging sand and dirt from the well.

6. The method of claim 1, further comprising:
    maintaining a constant water pressure by increasing or decreasing a speed of the motor, wherein the speed to be increased or decreased is determined by a controller of the variable frequency drive.

* * * * *